(12) United States Patent
Barachant et al.

(10) Patent No.: US 11,481,030 B2
(45) Date of Patent: Oct. 25, 2022

(54) METHODS AND APPARATUS FOR GESTURE DETECTION AND CLASSIFICATION

(71) Applicant: Meta Platforms Technologies, LLC, Menlo Park, CA (US)

(72) Inventors: Alexandre Barachant, Brooklyn, NY (US); Daniel Wetmore, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/833,307

(22) Filed: Mar. 27, 2020

(65) Prior Publication Data

US 2020/0310539 A1 Oct. 1, 2020

Related U.S. Application Data

(60) Provisional application No. 62/826,478, filed on Mar. 29, 2019.

(51) Int. Cl.
*G06F 3/01* (2006.01)
*G06K 9/62* (2022.01)

(52) U.S. Cl.
CPC .............. *G06F 3/015* (2013.01); *G06F 3/014* (2013.01); *G06F 3/017* (2013.01); *G06K 9/6257* (2013.01)

(58) Field of Classification Search
CPC .......... G06F 3/015; G06F 3/014; G06F 3/017; G06K 9/6255–6256
See application file for complete search history.

(56) References Cited

U.S. PATENT DOCUMENTS

| 1,411,995 | A | 4/1922 | Dull |
| 3,580,243 | A | 5/1971 | Johnson |
| 3,620,208 | A | 11/1971 | Wayne et al. |
| 3,735,425 | A | 5/1973 | Hoshall et al. |

(Continued)

FOREIGN PATENT DOCUMENTS

| CA | 2902045 A1 | 8/2014 |
| CA | 2921954 A1 | 2/2015 |

(Continued)

OTHER PUBLICATIONS

International Search Report and Written Opinion received for PCT Application Serial No. PCT/US2020/025772 dated Aug. 3, 2020, 13 pages.

(Continued)

*Primary Examiner* — Albert K Wong
(74) *Attorney, Agent, or Firm* — FisherBroyles, LLP

(57) ABSTRACT

Example systems may include a head-mounted device configured to present an artificial reality view to a user, a control device including a plurality of electromyography (EMG) sensors, and at least one physical processor programmed to receive EMG data based on signals detected by the EMG sensors, detect EMG signals corresponding to user gestures within the EMG data, classify the EMG signals to identify gesture types, and provide control signals based on the gesture types, wherein the control signal triggers the head-mounted device to modify the artificial reality view. Various other methods, systems, and computer-readable media are also disclosed.

20 Claims, 35 Drawing Sheets

(56) References Cited

U.S. PATENT DOCUMENTS

| | | |
|---|---|---|
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,482,051 A | 1/1996 | Reddy et al. |
| 5,605,059 A | 2/1997 | Woodward |
| 5,625,577 A | 4/1997 | Tosiyasu et al. |
| 5,683,404 A | 11/1997 | Johnson |
| 6,005,548 A | 12/1999 | Latypov et al. |
| 6,009,210 A | 12/1999 | Kang |
| 6,032,530 A | 3/2000 | Hock |
| 6,066,794 A | 5/2000 | Longo |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Winash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,761,390 B2 | 7/2010 | Ford |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| 7,870,211 B2 | 1/2011 | Pascal et al. |
| 7,901,368 B2 | 3/2011 | Flaherty et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,467,270 B2 | 6/2013 | Gossweiler, III et al. |
| 8,469,741 B2 | 6/2013 | Oster et al. |
| 8,484,022 B1 | 7/2013 | Vanhoucke |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |

(56) References Cited

U.S. PATENT DOCUMENTS

| | | |
|---|---|---|
| 9,341,659 B2 | 5/2016 | Poupyrev et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Margolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Christopher et al. |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0010210 A1 | 1/2004 | Avinash et al. |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0149338 A1 | 7/2006 | Flaherty et al. |
| 2006/0211956 A1 | 9/2006 | Sankai |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0132785 A1 | 6/2007 | Ebersole et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0285399 A1 | 12/2007 | Lund |
| 2008/0001735 A1 | 1/2008 | Tran |
| 2008/0051673 A1 | 2/2008 | Kong et al. |
| 2008/0052643 A1 | 2/2008 | Ike et al. |
| 2008/0058668 A1 | 3/2008 | Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |
| 2009/0124881 A1 | 5/2009 | Rytky |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | Mcnames et al. |
| 2009/0209878 A1 | 8/2009 | Sanger |
| 2009/0251407 A1 | 10/2009 | Flake et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Leuthardt et al. |
| 2010/0234696 A1 | 9/2010 | Li et al. |

(56) References Cited

U.S. PATENT DOCUMENTS

| | | |
|---|---|---|
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0066381 A1 | 3/2011 | Garudadr et al. |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0007821 A1 | 1/2012 | Zaliva |
| 2012/0029322 A1 | 2/2012 | Wartena et al. |
| 2012/0051005 A1 | 3/2012 | Vanfleteren et al. |
| 2012/0066163 A1 | 3/2012 | Balls et al. |
| 2012/0071780 A1 | 3/2012 | Barachant |
| 2012/0101357 A1 | 4/2012 | Hoskuldsson et al. |
| 2012/0117514 A1 | 5/2012 | Kim et al. |
| 2012/0157789 A1 | 6/2012 | Kangas et al. |
| 2012/0165695 A1 | 6/2012 | Kidmose et al. |
| 2012/0184838 A1 | 7/2012 | John et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0221996 A1 | 8/2013 | Poupyrev et al. |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le et al. |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0223462 A1 | 8/2014 | Aimone et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368428 A1 | 12/2014 | Pinault |
| 2014/0368474 A1 | 12/2014 | Kim et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |

(56) References Cited

U.S. PATENT DOCUMENTS

| | | |
|---|---|---|
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey et al. |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Aleem et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1* | 10/2015 | Connor .................. G06F 3/017 73/865.4 |
| 2015/0309582 A1 | 10/2015 | Gupta |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274732 A1 | 9/2016 | Bang et al. |
| 2016/0274758 A1 | 9/2016 | Bailey |
| 2016/0275726 A1 | 9/2016 | Mullins |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1* | 10/2016 | Wagner .................. G09B 21/02 |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0342227 A1 | 11/2016 | Natzke et al. |
| 2016/0350973 A1 | 12/2016 | Shapira et al. |
| 2017/0031502 A1 | 2/2017 | Rosenberg et al. |
| 2017/0035313 A1 | 2/2017 | Hong et al. |
| 2017/0061817 A1 | 3/2017 | Mettler |
| 2017/0068445 A1 | 3/2017 | Lee et al. |
| 2017/0075426 A1 | 3/2017 | Camacho et al. |
| 2017/0079828 A1 | 3/2017 | Pedtke et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0147077 A1 | 5/2017 | Park et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0209055 A1 | 7/2017 | Pantelopoulos et al. |
| 2017/0220923 A1 | 8/2017 | Bae et al. |
| 2017/0237789 A1 | 8/2017 | Harner et al. |
| 2017/0237901 A1 | 8/2017 | Lee et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |

(56) References Cited

U.S. PATENT DOCUMENTS

| | | |
|---|---|---|
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1* | 6/2018 | Bouton .............. A61B 5/1127 |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0076716 A1 | 3/2019 | Chiou et al. |
| 2019/0089898 A1 | 3/2019 | Kim et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1* | 6/2019 | Laszlo ................ A61B 5/375 |
| 2019/0196586 A1* | 6/2019 | Laszlo ................ G06N 20/00 |
| 2019/0197778 A1 | 6/2019 | Sachdeva et al. |
| 2019/0209034 A1 | 7/2019 | Deno et al. |
| 2019/0212817 A1 | 7/2019 | Kaifosh et al. |
| 2019/0216619 A1 | 7/2019 | McDonnall et al. |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1* | 8/2019 | Tran .................. A61N 1/3625 |
| 2019/0279407 A1 | 9/2019 | McHugh et al. |
| 2019/0294243 A1* | 9/2019 | Laszlo ................ G06N 20/00 |
| 2019/0056422 A1 | 10/2019 | Park et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1* | 2/2020 | Ang .................... G06F 3/167 |
| 2020/0057661 A1* | 2/2020 | Bendfeldt ............ G06N 20/00 |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0077955 A1 | 3/2020 | Shui et al. |
| 2020/0097081 A1 | 3/2020 | Stone et al. |
| 2020/0111260 A1 | 4/2020 | Osborn et al. |
| 2020/0142490 A1 | 5/2020 | Xiong et al. |
| 2020/0143795 A1 | 5/2020 | Park et al. |
| 2020/0163562 A1 | 5/2020 | Neaves |
| 2020/0205932 A1 | 7/2020 | Zar et al. |
| 2020/0225320 A1 | 7/2020 | Belskikh et al. |
| 2020/0245873 A1 | 8/2020 | Frank et al. |
| 2020/0275895 A1 | 9/2020 | Barachant |
| 2020/0301509 A1 | 9/2020 | Liu et al. |
| 2020/0305795 A1 | 10/2020 | Floyd et al. |
| 2020/0320335 A1* | 10/2020 | Shamun ................ G06N 3/08 |
| 2021/0109598 A1* | 4/2021 | Zhang ................ G06F 3/16 |
| 2021/0117523 A1 | 4/2021 | Kim et al. |
| 2021/0290159 A1 | 9/2021 | Bruinsma et al. |
| 2022/0256706 A1 | 8/2022 | Xiong et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105009031 A | 10/2015 |
| CN | 105190477 A | 12/2015 |
| CN | 105190578 A | 12/2015 |
| CN | 106102504 A | 11/2016 |
| CN | 110300542 A | 10/2019 |
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |
| EP | 1345210 A2 | 9/2003 |
| EP | 2198521 B1 | 6/2012 |
| EP | 2541763 A1 | 1/2013 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 2959394 B1 | 5/2021 |
| JP | H05277080 A | 10/1993 |
| JP | 3103427 B2 | 10/2000 |
| JP | 2002287869 A | 10/2002 |
| JP | 2005095561 A | 4/2005 |
| JP | 2009050679 A | 3/2009 |
| JP | 2010520561 A | 6/2010 |
| JP | 2016507851 A | 3/2016 |
| JP | 2017509386 A | 4/2017 |
| JP | 2019023941 A | 2/2019 |
| JP | 2021072136 A | 5/2021 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 10-1790147 B1 | 10/2017 |
| WO | 9527341 A1 | 10/1995 |
| WO | 2006086504 A2 | 8/2006 |
| WO | 2008109248 A2 | 9/2008 |
| WO | 2009042313 A1 | 4/2009 |
| WO | 2010104879 A2 | 9/2010 |
| WO | 2011070554 A2 | 6/2011 |
| WO | 2012155157 A1 | 11/2012 |
| WO | 2014130871 A1 | 8/2014 |
| WO | 2014186370 A1 | 11/2014 |
| WO | 2014194257 A1 | 12/2014 |
| WO | 2014197443 A1 | 12/2014 |
| WO | 2015027089 A1 | 2/2015 |

(56) References Cited

FOREIGN PATENT DOCUMENTS

| | | | |
|---|---|---|---|
| WO | 2015/073713 A1 | 5/2015 |
| WO | 2015081113 A1 | 6/2015 |
| WO | 2015100172 A1 | 7/2015 |
| WO | 2015123445 A1 | 8/2015 |
| WO | 2015184760 A1 | 12/2015 |
| WO | 2015192117 A1 | 12/2015 |
| WO | 2015199747 A1 | 12/2015 |
| WO | 2016/041088 A1 | 3/2016 |
| WO | 2017062544 A1 | 4/2017 |
| WO | 2017075611 A1 | 5/2017 |
| WO | 2017092225 A1 | 6/2017 |
| WO | 2017120669 A1 | 7/2017 |
| WO | 2017172185 A1 | 10/2017 |
| WO | 2017208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020047429 A1 | 3/2020 |
| WO | 2020061440 A1 | 3/2020 |
| WO | 2020061451 A1 | 3/2020 |
| WO | 2020072915 A1 | 4/2020 |

OTHER PUBLICATIONS

Cote-Allard et al., "Deep Learning for Electromyographic Hand Gesture Signal Classification Using Transfer Learning", vol. 27, No. 4, Jan. 26, 2019, pp. 1-18.
Extended European Search Report for European Application No. 19806723.3, dated Jul. 7, 2021, 13 pages.
Extended European Search Report for European Application No. 19810524.9, dated Mar. 17, 2021, 11 pages.
Extended European Search Report for European Application No. 19850130.6, dated Sep. 1, 2021, 14 Pages.
Extended European Search Report for European Application No. 19855191.3, dated Dec. 6, 2021, 11 pages.
Extended European Search Report for European Application No. 19883839.3, dated Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Final Office Action dated Jun. 2, 2020 for U.S. Appl. No. 15/882,858, filed Jan. 29, 2018,127 Pages.
Final Office Action dated Jun. 2, 2020 for U.S. Appl. No. 16/557,383, filed Aug. 30, 2019, 66 Pages.
Final Office Action dated Nov. 3, 2020 for U.S. Appl. No. 15/974,430, filed May 8, 2018, 27 Pages.
Final Office Action dated Feb. 4, 2020 for U.S. Appl. No. 16/577,207, filed Sep. 20, 2019, 76 Pages.
Final Office Action dated Feb. 4, 2021 for U.S. Appl. No. 15/882,858, filed Jan. 29, 2018, 42 Pages.
Final Office Action dated Jun. 5, 2020 for U.S. Appl. No. 16/557,427, filed Aug. 30, 2019, 95 Pages.
Final Office Action dated Oct. 8, 2020 for U.S. Appl. No. 16/557,342, filed Aug. 30, 2019, 73 Pages.
Final Office Action dated Apr. 9, 2020 for U.S. Appl. No. 15/974,454, filed May 8, 2018, 19 Pages.
Final Office Action dated Dec. 11, 2019 for U.S. Appl. No. 15/974,430, filed May 8, 2018, 30 Pages.
Final Office Action dated Jan. 13, 2021 for U.S. Appl. No. 16/577,207, filed Sep. 20, 2019, 91 Pages.
Final Office Action dated Dec. 18, 2019 for U.S. Appl. No. 16/258,279, filed Jan. 25, 2019, 45 Pages.
Final Office Action dated Feb. 19, 2021 for U.S. Appl. No. 16/258,279, filed Jan. 25, 2019, 58 Pages.
Final Office Action dated Sep. 23, 2020 for U.S. Appl. No. 15/816,435, filed Nov. 17, 2017, 70 Pages.
Final Office Action dated Jan. 28, 2020 for U.S. Appl. No. 16/557,342, filed Aug. 30, 2019, 15 Pages.
Final Office Action dated Jul. 28, 2017 for U.S. Appl. No. 14/505,836, filed Oct. 3, 2014, 52 Pages.
Final Office Action dated Jun. 28, 2021 for U.S. Appl. No. 16/557,342, filed Aug. 30, 2019, 11 Pages.
Final Office Action dated Nov. 29, 2019 for U.S. Appl. No. 15/659,072, filed Jul. 25, 2017, 36 Pages.
Final Office Action dated Nov. 29, 2019 for U.S. Appl. No. 16/353,998, filed Mar. 14, 2019, 33 Pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Ghasemzadeh H., et al., "A Body Sensor Network With Electromyogram and Inertial Sensors: Multimodal nterpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
International Search Report and Written Opinion for International Application No. PCT/US2014/017799, dated May 16, 2014, 9 pages.
International Search Report and Written Opinion for International Application No. PCT/US2014/037863, dated Aug. 21, 2014, 10 pages.
International Preliminary Report on Patentability for International Application No. PCT/US2017/043693, dated Feb. 7, 2019, 7 Pages.
International Preliminary Report on Patentability for International Application No. PCT/US2017/043791, dated Feb. 7, 2019, 9 Pages.
International Preliminary Report on Patentability for International Application No. PCT/US2019/031114, dated Nov. 19, 2020, 16 pages.
International Preliminary Report on Patentability for International Application No. PCT/US2019/049094, dated Mar. 11, 2021, 24 Pages.
International Preliminary Reporton Patentability for International Application No. PCT/US2019/052151, dated Apr. 1, 2021, 9 pages.
International Preliminary Report on Patentability for International Application No. PCT/US2014/017799, dated Sep. 3, 2015, 8 Pages.
International Preliminary Report on Patentability for International Application No. PCT/US2014/037863, dated Nov. 26, 2015, 8 pages.
International Preliminary Report on Patentability for International Application No. PCT/US2014/052143, dated Mar. 3, 2016, 7 pages.
International Preliminary Report on Patentability for International Application No. PCT/US2014/067443, dated Jun. 9, 2016, 7 pages.
International Preliminary Report on Patentability for International Application No. PCT/US2015/015675, dated Aug. 25, 2016, 8 Pages.
International Preliminary Report on Patentability for International Application No. PCT/US2017/043686, dated Feb. 7, 2019, 8 pages.

(56) References Cited

OTHER PUBLICATIONS

International Preliminary Report on Patentability for International Application No. PCT/US2017/043792, dated Feb. 7, 2019, 8 Pages.
International Preliminary Report on Patentability for International Application No. PCT/US2018/056768, dated Apr. 30, 2020, 7 pages.
International Preliminary Report on Patentability for International Application No. PCT/US2018/061409, dated May 28, 2020, 10 pages.
International Preliminary Report on Patentability for International Application No. PCT/US2019/015174, dated Aug. 6, 2020, 7 pages.
International Preliminary Report on Patentability for International Application No. PCT/US2019/015183, dated Aug. 6, 2020, 7 pages.
Notice of Allowance dated May 18, 2022 for U.S. Appl. No. 15/882,858, filed Jan. 29, 2018, 10 pages.
Al-Jumaily A., et al., "Electromyogram(EMG) Driven System based Virtual Reality for Prosthetic and Rehabilitation Devices," Proceedings Of the 11th Internationalconference On Information Integration Andweb-Based Applications & Services, Jan. 1, 2009, pp. 582-586.
Al-Mashhadany Y.I., "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages.
Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Benko H., et al., "Enhancing Input On and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Communication Pursuant to Rule 164(1) EPC, Partial Supplementary European Search Report for European Application No. 14753949. 8, dated Sep. 30, 2016, 7 pages.
Co-pending U.S. Appl. No. 15/659,072, inventors Patrick; Kaifosh et al., filed on Jul. 25, 2017.
Co-pending U.S. Appl. No. 15/816,435, inventors Ning; Guo et al., filed on Nov. 17, 2017.
Co-pending U.S. Appl. No. 15/882,858, inventors Stephen; Lake et al., filed on Jan. 29, 2018.
Co-Pending U.S. Appl. No. 15/974,430, inventors Adam; Berenzweig et al., filed on May 8, 2018.
Co-Pending U.S. Appl. No. 16/353,998, inventors Patrick; Kaifosh et al., filed on Mar. 14, 2019.
Co-Pending U.S. Appl. No. 16/557,383, inventors Adam; Berenzweig et al., filed on Aug. 30, 2019.
Co-Pending U.S. Appl. No. 16/557,427, inventors Adam; Berenzweig et al., filed on Aug. 30, 2019.
Co-Pending U.S. Appl. No. 15/974,430, filed May 8, 2018, 44 Pages.
Co-Pending U.S. Appl. No. 16/353,998, filed Mar. 14, 2019,43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Corazza S., et al.," A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages. Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Costanza E., et al., "EMG as a Subtle Input Interface for Mobile Computing," Mobile HCI, LNCS 3160, 2004, pp. 126-130.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Csapo A.B., et al., "Evaluation of Human-Myo Gesture Control Capabilities in Continuous Search and Select Dperations," 7th IEEE International Conference on Cognitive Infocommunications, Oct. 16-18, 2016, pp. 000415-000420.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.
Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
DING I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, dated May 9, 2022, 9 pages.
European Search Report for European Application No. 19890394.0, dated Apr. 29, 2022, 9 pages.
Extended European Search Report for European Application No. 18879156.0, dated Mar. 12, 2021, 11 pages.
Extended European Search Report for European Application No. 19743717.1, dated Mar. 3, 2021, 12 pages.
Extended European Search Report for European Application No. 19744404.5, dated Mar. 29, 2021, 11 pages.

(56) References Cited

OTHER PUBLICATIONS

Extended European Search Report for European Application No. 19799947.7, dated May 26, 2021, 10 pages.
Extended European Search Report for European Application No. 17835111.0, dated Nov. 21, 2019, 6 pages.
Extended European Search Report for European Application No. 17835112.8, dated Feb. 5, 2020, 17 pages.
Extended European Search Report for European Application No. 17835140.9, dated Nov. 26, 2019, 10 Pages.
Extended European Search Report for European Application No. 18869441.8, dated Nov. 17, 2020, 20 Pages.
Notice of Allowance dated Feb. 9, 2022 for U.S. Appl. No. 15/882,858, filed Jan. 29, 2018, 9 pages.
Notice of Allowance dated Nov. 10, 2021 for U.S. Appl. No. 15/882,858, filed Jan. 29, 2018, 6 pages.
Notice of Allowance dated Jul. 15, 2021 for U.S. Appl. No. 15/882,858, filed Jan. 29, 2018, 2 pages.
Notice of Allowance dated Dec. 16, 2020 for U.S. ApplicationNo. U.S. Appl. No. 16/593,446, filed Oct. 4, 2019, 44 pages.
Notice of Allowance dated May 18, 2020 for U.S. Appl. No. 16/258,279, filed Jan. 25, 2019, 42 Pages.
Notice of Allowance dated Aug. 19, 2020 for U.S. Appl. No. 16/557,427, filed Aug. 30, 2019, 22 Pages.
Notice of Allowance dated Jul. 19, 2019 for U.S. Appl. No. 16/258,409, filed Jan. 25, 2019, 36 Pages.
Notice of Allowance dated May 20, 2020 for U.S. Appl. No. 16/389,419, filed Apr. 19, 2019, 28 Pages.
Notice of Allowance dated Oct. 22, 2021 for U.S. Appl. No. 15/882,858, filed Jan. 29, 2018, 8 pages.
Notice of Allowance dated Aug. 23, 2021 for U.S. Appl. No. 15/974,430, filed May 8, 2018, 12 pages.
Notice of Allowance dated Dec. 23, 2020 for U.S. Appl. No. 15/659,072, filed Jul. 25, 2017, 26 Pages.
Notice of Allowance dated Jun. 28, 2021 for U.S. Appl. No. 15/882,858, filed Jan. 29, 2018, 18 pages.
Notice of Allowance dated Jul. 31, 2019 for U.S. Appl. No. 16/257,979, filed Jan. 25, 2019, 22 Pages.
Office action for European Application No. 17835112.8, dated Feb. 11, 2022, 11 Pages.
Office Action for European Patent Application No. 19743717.1, dated Apr. 11, 2022, 10 pages.
Partial Supplementary European Search Report for European Application No. 18879156.0, dated Dec. 7, 2020, 9 pages.
Picard R.W., et al., "Affective Wearables," Proceedings of the IEEE 1st International Symposium on Wearable Computers, ISWC, Cambridge, Ma, USA, Oct. 13-14, 1997, pp. 90-97.
Preinterview First Office Action dated Jun. 24, 2020 for U.S. Appl. No. 16/785,680, filed Feb. 10, 2020, 90 Pages.
Rekimoto J., "GestureWrist and GesturePad: Unobtrusive Wearable Interaction Devices," ISWC Proceedings of the 5th IEEE International Symposium on Wearable Computers, 2001, 7 pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Saponas T.S., et al., "Making Muscle-Computer Interfaces More Practical," CHI, Atlanta, Georgia, USA, Apr. 10-15, 2010, 4 pages.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sato M., et al., "Touche: Enhancing Touch Interaction on Humans, Screens, Liquids, and Everyday Objects," CHI, Austin, Texas, May 5-10, 2012, 10 pages.
Sauras-Perez P., et al., "A Voice and Pointing Gesture Interaction System for Supporting Human Spontaneous Decisions in Autonomous Cars," Clemson University, All Dissertations, May 2017, 174 pages.
Shen S., et al., "I Am a Smartwatch and I Can Track My User's Arm," University of Illinois at Urbana-Champaign, MobiSys, Jun. 25-30, 2016, 12 pages.
Son M., et al., "Evaluating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/10.1155/2014/740469.
Torres T., "Myo Gesture Control Armband," PCMag, Jun. 8, 2015, 9 pages, Retrieved from the Internet: URL https://www.pcmag.com/article2/0,2817,2485462,00.asp.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages. Retrieved from the Internet: URL: https://www.ncbi.nlm.nih.gov/pmc/articles/PMC3116649/.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 330, 13 Pages.
Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.
Zacharaki E.I., et al., "Spike Pattern Recognition by Supervised Classification in Low Dimensional Embedding Space," Brain Informatics, 2016, vol. 3, pp. 73-83.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved fom the Internet: URL: https://dialog.proquest.com/professional/docview/1931047627?accountid=153692.
Lee D.C., et al., "Motion and Force Estimation System of Human Fingers," Journal of Institute of Control, Robotics and Systems, 2011, vol. 17 (10), pp. 1014-1020.
Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.

(56) References Cited

OTHER PUBLICATIONS

Lopes J., et al., "Hand/Arm Gesture Segmentation by Motion Using IMU and EMG Sensing," ScienceDirect, Jun. 27-30, 2017, vol. 11, pp. 107-113.

Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.

Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.

McIntee S.S., "A Task Model of Free-Space Movement-Based Geastures," Dissertation, Graduate Faculty of North Carolina State University, Computer Science, 2016, 129 pages.

Mendes Jr.J.J.A., et al., "Sensor Fusion and Smart Sensor in Sports and Biomedical Applications," Sensors, 2016, vol. 16 (1569), pp. 1-31.

Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.

Morris D., et al., "Emerging Input Technologies for Always-Available Mobile Interaction," Foundations and Trends in Human-Computer Interaction, 2010, vol. 4 (4), pp. 245-316.

Naik G.R., et al., "Source Separation and Identification issues in Bio Signals: A Solution using Blind Source Separation," Chapter 4 of Recent Advances in Biomedical Engineering, Intech, 2009, 23 pages.

Naik G.R., et al., "Real-Time Hand Gesture Identification for Human Computer Interaction Based on ICA of Surface Electromyogram," IADIS International Conference Interfaces and Human Computer Interaction, 2007, pp. 83-90.

Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.

Negro F., et al., "Multi-Channel Intramuscular and Surface EMG Decomposition by Convolutive Blind Source Separation," Journal of Neural Engineering, Feb. 29, 2016, vol. 13, 18 Pages.

Non-Final Office Action dated Mar. 2, 2021 for U.S. Appl. No. 15/974,430, filed May 8, 2018, 32 Pages.

Non-Final Office Action dated Sep. 2, 2020 for U.S. Appl. No. 15/882,858, filed Jan. 29, 2018, 66 Pages.

Non-Final Office Action dated Aug. 3, 2020 for U.S. Appl. No. 16/593,446, filed Oct. 4, 2019, 44 pages.

Non-Final Office Action dated Jun. 3, 2021 for U.S. Appl. No. 15/816,435, filed Nov. 17, 2017, 32 Pages.

Non-Final Office Action dated Jun. 5, 2020 for U.S. Appl. No. 15/659,072, filed Jul. 25, 2017, 59 Pages.

Non-Final Office Action dated Sep. 6, 2019 for U.S. Appl. No. 16/424,144, filed May 28, 2019, 11 Pages.

Non-Final Office Action dated Feb. 8, 2021 for U.S. Appl. No. 16/557,342, filed Aug. 30, 2019, 11 Pages.

Non-Final Office Action dated Oct. 8, 2020 for U.S. Appl. No. 16/577,207, filed Sep. 20, 2019, 51 Pages.

Non-Final Office Action dated Apr. 9, 2019 for U.S. Appl. No. 16/258,409, filed Jan. 25, 2019, 71 Pages.

Non-Final Office Action dated Aug. 11, 2021 for U.S. Appl. No. 16/577,207, filed Sep. 20, 2019, 35 Pages.

Non-Final Office Action dated Jun. 13, 2019 for U.S. Appl. No. 16/258,279, filed Jan. 25, 2019, 38 Pages.

Non-Final Office Action dated Jun. 15, 2020 for U.S. Appl. No. 16/557,342, filed Aug. 30, 2019, 46 Pages.

Non-Final Office Action dated Jan. 16, 2020 for U.S. Appl. No. 16/389,419, filed Apr. 19, 2019, 26 Pages.

Non-Final Office Action dated May 16, 2019 for U.S. Appl. No. 15/974,384, filed May 8, 2018, 13 Pages.

Non-Final Office Action dated May 16, 2019 for U.S. Appl. No. 15/974,430, filed May 8, 2018, 12 Pages.

Non-Final Office Action dated Nov. 19, 2019 for U.S. Appl. No. 16/577,207, filed Sep. 20, 2019, 32 Pages.

Non-Final Office Action dated Aug. 20, 2020 for U.S. Appl. No. 15/974,454, filed May 8, 2018, 59 Pages.

Non-Final Office Action dated Dec. 20, 2019 for U.S. Appl. No. 15/974,454, filed May 8, 2018, 41 Pages.

Non-Final Office Action dated Jan. 22, 2020 for U.S. Appl. No. 15/816,435, filed Nov. 17, 2017, 35 Pages.

Non-Final Office Action dated Oct. 22, 2019 for U.S. Appl. No. 16/557,342, filed Aug. 30, 2019, 16 Pages.

Non-Final Office Action dated Dec. 23, 2019 for U.S. Appl. No. 16/557,383, filed Aug. 30, 2019, 53 Pages.

Non-Final Office Action dated Dec. 23, 2019 for U.S. Appl. No. 16/557,427, filed Aug. 30, 2019, 52 Pages.

Non-Final Office Action dated Feb. 23, 2017 for U.S. Appl. No. 14/505,836, filed Oct. 3, 2014, 54 Pages.

Non-Final Office Action dated Jul. 23, 2020 for U.S. Appl. No. 16/593,446, filed Oct. 4, 2019, 28 pages.

Non-Final Office Action dated May 24, 2019 for U.S. Appl. No. 16/353,998, filed Mar. 14, 2019, 20 Pages.

Non-Final Office Action dated May 26, 2020 for U.S. Appl. No. 16/353,998, filed Mar. 14, 2019, 60 Pages.

Non-Final Office Action dated Nov. 27, 2020 for U.S. Appl. No. 16/258,279, filed Jan. 25, 2019, 44 Pages.

Non-Final Office Action dated Apr. 29, 2019 for U.S. Appl. No. 16/257,979, filed Jan. 25, 2019, 63 Pages.

Non-Final Office Action dated Apr. 30, 2019 for U.S. Appl. No. 15/659,072, filed Jul. 25, 2017, 99 Pages.

Non-Final Office Action dated Apr. 30, 2020 for U.S. Appl. No. 15/974,430, filed May 8, 2018, 57 Pages.

Non-Final Office Action dated Dec. 30, 2019 for U.S. Appl. No. 16/593,446, filed Oct. 4, 2019, 43 pages.

Non-Final Office Action dated Jun. 30, 2016 for U.S. Appl. No. 14/505,836, filed Oct. 3, 2014, 37 Pages.

Non-Final Office Action dated Oct. 30, 2019 for U.S. Appl. No. 15/882,858, filed Jan. 29, 2018, 22 Pages.

Notice of Allowance dated Nov. 2, 2020 for U.S. Appl. No. 15/974,454, filed May 8, 2018, 24 Pages.

Notice of Allowance dated Nov. 4, 2019 for U.S. Appl. No. 15/974,384, filed May 8, 2018, 39 Pages.

Notice of Allowance dated Feb. 6, 2020 for U.S. Appl. No. 16/424,144, filed May 28, 2019, 28 Pages.

International Preliminary Report on Patentability for International Application No. PCT/US2019/015238, dated Aug. 6, 2020, 7 pages.

International Preliminary Report on Patentability for International Application No. PCT/US2019/028299, dated Dec. 10, 2020, 11 pages.

International Preliminary Report on Patentability for International Application No. PCT/US2019/034173, dated Dec. 10, 2020, 9 pages.

International Preliminary Report on Patentability for International Application No. PCT/US2019/046351, dated Feb. 25, 2021, 8 pages.

International Preliminary Report on Patentability for International Application No. PCT/US2019/052131, dated Apr. 1, 2021, 8 pages.

International Preliminary Report on Patentability for International Application No. PCT/US2019/054716, dated Apr. 15, 2021, 10 pages.

International Preliminary Report on Patentability for International Application No. PCT/US2019/061759, dated May 27, 2021, 12 pages.

International Preliminary Report on Patentability for International Application No. PCT/US2019/063587, dated Jun. 10, 2021, 13 pages.

International Preliminary Report on Patentability for International Application No. PCT/US2020/049274, dated Mar. 17, 2022, 14 pages.

International Search Report and Written Opinion for International Application No. PCT/US2014/052143, dated Nov. 21, 2014, 8 Pages.

International Search Report and Written Opinion for International Application No. PCT/US2014/067443, dated Feb. 27, 2015, 8 pages.

(56) References Cited

OTHER PUBLICATIONS

International Search Report and Written Opinion for International Application No. PCT/US2015/015675, dated May 27, 2015, 9 Pages.
International Search Report and Written Opinion for International Application No. PCT/US2017/043686, dated Oct. 6, 2017, 9 Pages.
International Search Report and Written Opinion for International Application No. PCT/US2017/043693, dated Oct. 6, 2017, 7 Pages.
International Search Report and Written Opinion for International Application No. PCT/US2017/043791, dated Oct. 5, 2017, 10 Pages.
International Search Report and Written Opinion for International Application No. PCT/US2018/056768, dated Jan. 15, 2019, 8 pages.
International Search Report and Written Opinion for International Application No. PCT/US2018/061409, dated Mar. 12, 2019, 11 pages.
International Search Report and Written Opinion for International Application No. PCT/US2018/063215, dated Mar. 21, 2019, 17 Pages.
International Search Report and Written Opinion for International Application No. PCT/US2019/015167, dated May 21, 2019, 7 Pages.
International Search Report and Written Opinion for International Application No. PCT/US2019/015174, dated May 21, 2019, 8 pages.
International Search Report and Written Opinion for International Application No. PCT/US2019/015244, dated May 16, 2019, 8 Pages.
International Search Report and Written Opinion for International Application No. PCT/US2019/020065, dated May 16, 2019, 10 Pages.
International Search Report and Written Opinion for International Application No. PCT/US2019/028299, dated Aug. 9, 2019, 12 pages.
International Search Report and Written Opinion for International Application No. PCT/US2019/031114, dated Dec. 20, 2019, 18 Pages.
International Search Report and Written Opinion for International Application No. PCT/US2019/034173, dated Sep. 18, 2019, 10 Pages.
International Search Report and Written Opinion for International Application No. PCT/US2019/037302, dated Oct. 11, 2019, 13 Pages.
International Search Report and Written Opinion for International Application No. PCT/US2019/042579, dated Oct. 31, 2019, 8 Pages.
International Search Report and Written Opinion for International Application No. PCT/US2019/046351, dated Nov. 7, 2019, 9 pages.
International Search Report and Written Opinion for International Application No. PCT/US2019/049094, dated Jan. 9, 2020, 27 Pages.
International Search Report and Written Opinion for International Application No. PCT/US2019/052131, dated Dec. 6, 2019, 8 pages.
International Search Report and Written Opinion for International Application No. PCT/US2019/052151, dated Jan. 15, 2020, 10 pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2019/063587, dated Mar. 25, 2020, 16 pages.
International Search Report and Written Opinion for International Application No. PCT/US2020/025735, dated Jun. 22, 2020, 10 pages.
International Search Report and Written Opinion for International Application No. PCT/US2020/025797, dated Jul. 9, 2020, 10 pages.
International Search Report and Written Opinion for International Application No. PCT/US2020/049274, dated Feb. 1, 2021, 17 pages.
International Search Report and Written Opinion for International Application No. PCT/US2020/061392, dated Mar. 12, 2021, 12 pages.
International Search Report and Written Opinion for International Application No. PCT/US2017/043792, dated Oct. 5, 2017, 9 Pages.
International Search Report and Written Opinion for International Application No. PCT/US2019/015134, dated May 15, 2019, 11 Pages.
International Search Report and Written Opinion for International Application No. PCT/US2019/015180, dated May 28, 2019, 10 Pages.
International Search Report and Written Opinion for International Application No. PCT/US2019/015183, dated May 3, 2019, 8 Pages.
International Search Report and Written Opinion for International Application No. PCT/US2019/015238, dated May 16, 2019, 8 Pages.
Invitation to Pay Additional Fees for International Application No. PCT/US2019/031114, dated Aug. 6, 2019, 7 pages.
Invitation to Pay Additional Fees for International Application No. PCT/US2019/049094, dated Oct. 24, 2019, 2 Pages.
Jiang H., "Effective and Interactive Interpretation of Gestures by Individuals with Mobility Impairments," Thesis/Dissertation Acceptance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," Acta Informatica Pragensia, vol. 3, Jan. 1, 2014, pp. 104-112, Retrieved from the Internet URL: https://aip.vse.cz/pdfs/aip/2014/01/08.pdf.
Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
Kim H., et al., "Real-Time Human Pose Estimation and Gesture Recognition from Depth Images Using Superpixels and SVM Classifier," Sensors, 2015, vol. 15, pp. 12410-12427.
Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages. Retrieved on Oct. 7, 2019 [Jul. 10, 2019] Retrieved from the Internet: URL: https://www.ece.uvic.ca/-bctill/papers/neurimp/Kipke_etal_2003_01214707.pdf.

\* cited by examiner

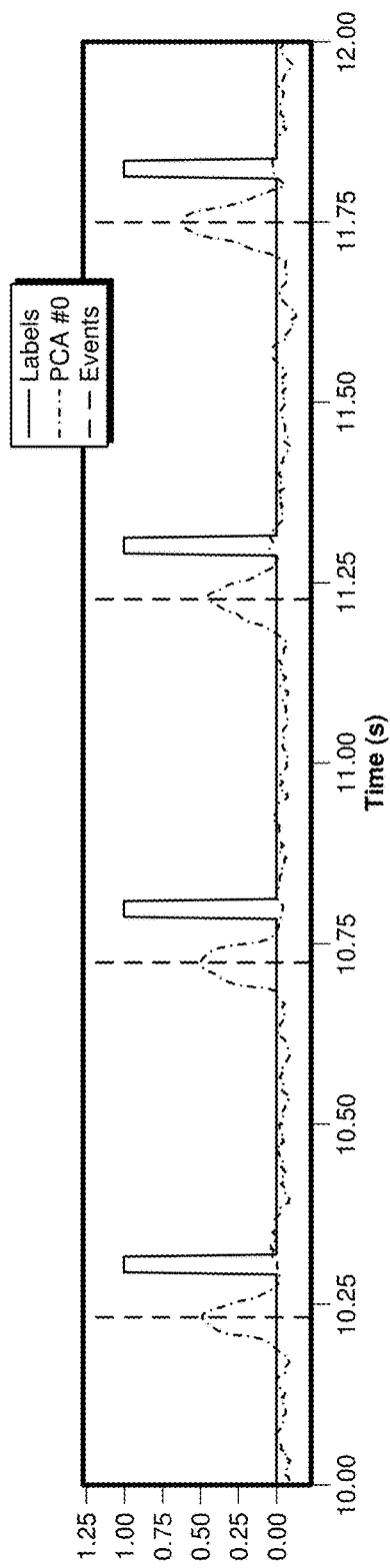
FIG. 7
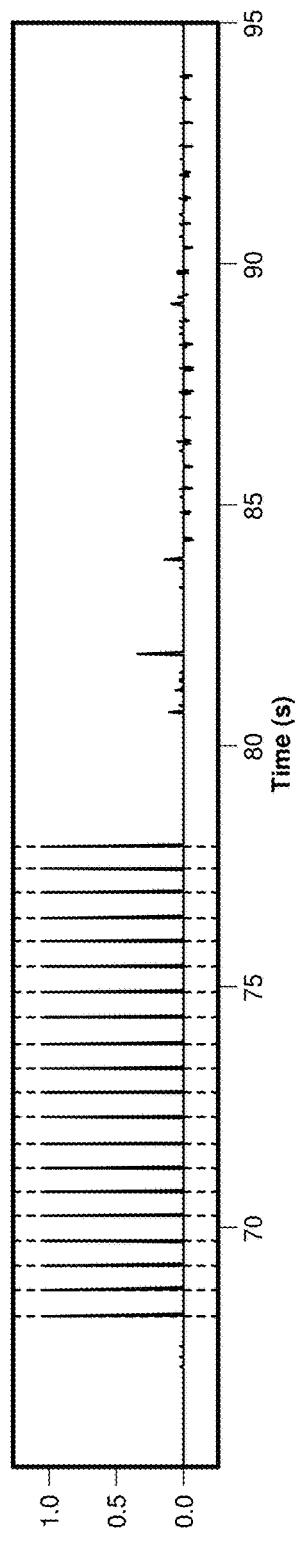
FIG. 8
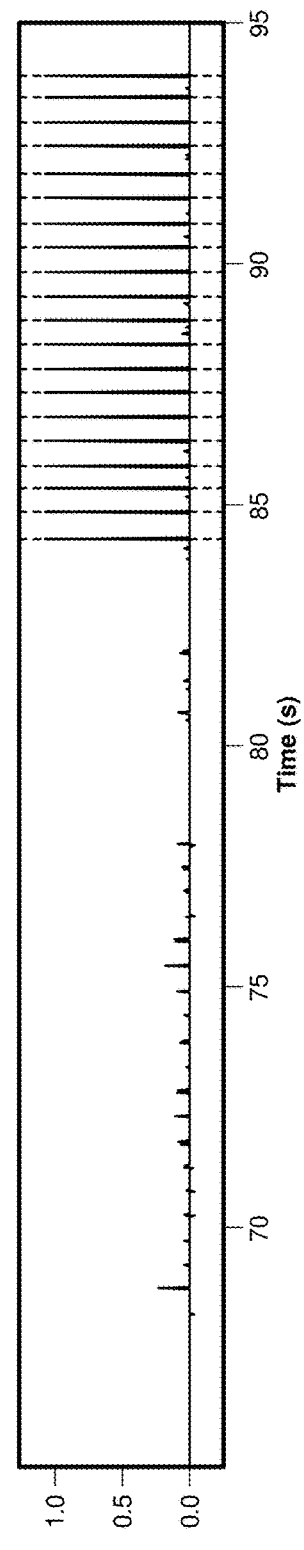

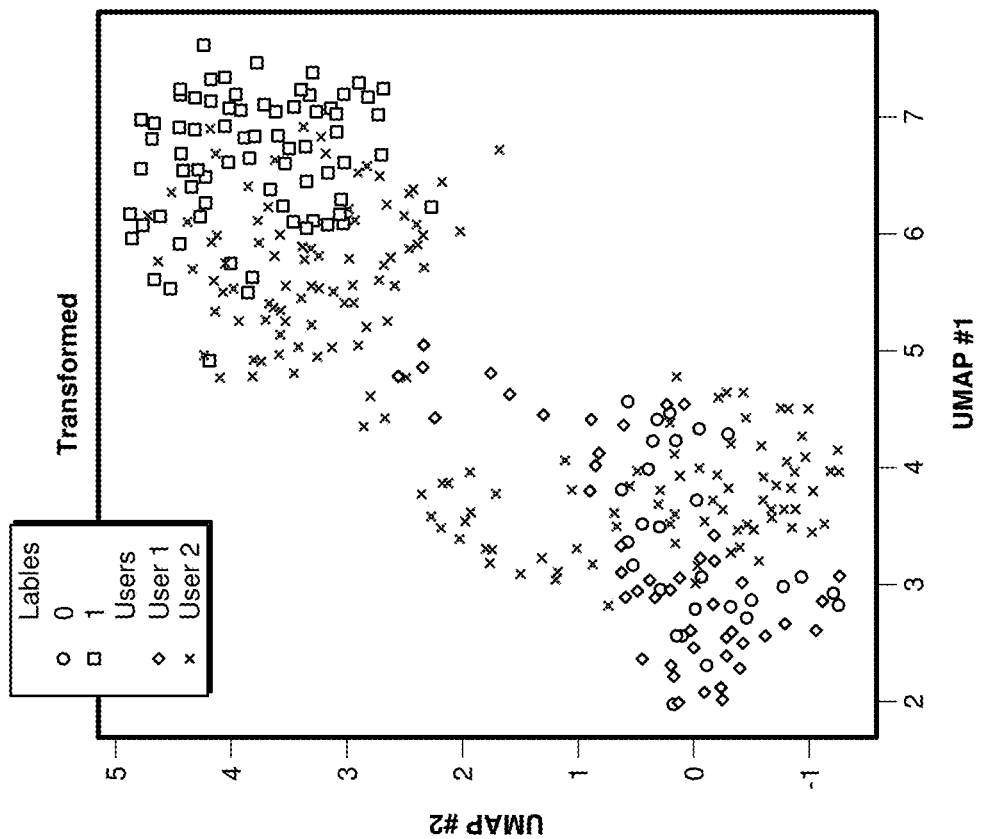
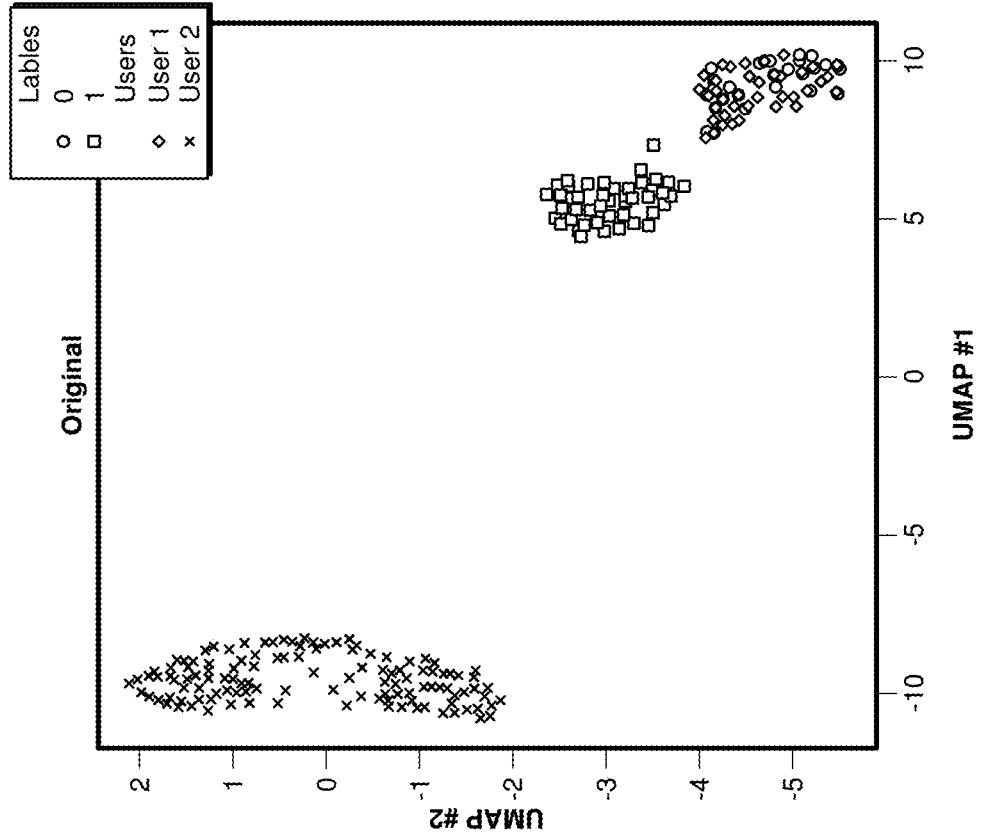
FIG. 24B
FIG. 24A

METHODS AND APPARATUS FOR GESTURE DETECTION AND CLASSIFICATION

CROSS REFERENCE TO RELATED APPLICATION

This application claims the benefit of U.S. Provisional Application No. 62/826,478, filed Mar. 29, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 7 shows example detected events on the first PCA component and respective labels generated from two seconds of data.

FIG. 8 shows an example of detection of discrete events using a testing set.

FIGS. 24A-24B show example data before and after transformation, respectively.

FIG. 27A illustrates a schematic of a control device of the computer-based system and FIG. 27B illustrates an example dongle portion that may be connected to a computer, where the dongle portion is configured to communicate with the control device (and a similar configuration may be used within a head-mounted device in communication with the control device).

Figure 1:
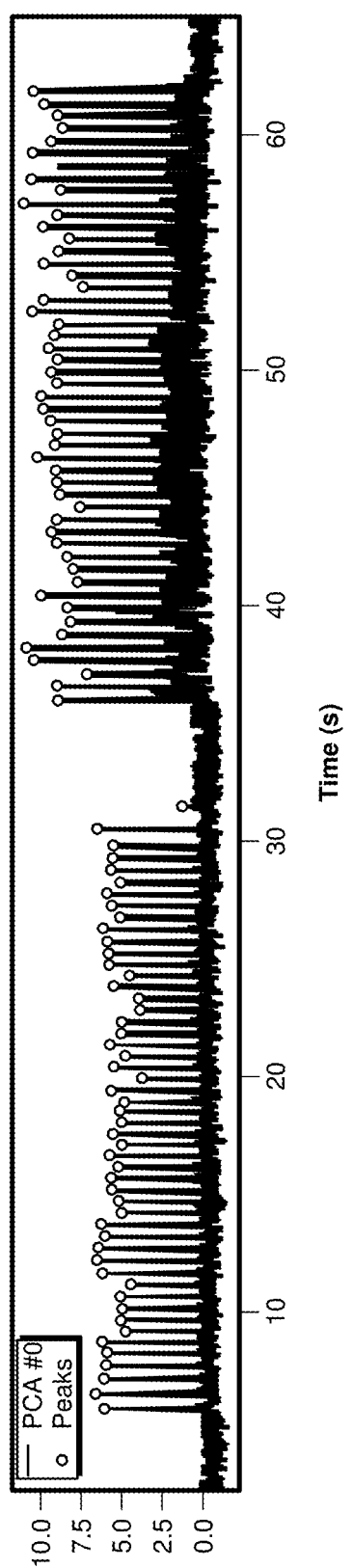
FIG. 1 shows an example of a first component extracted from the application of the PCA.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Examples of the present disclosure are directed to detection of signals from a user and control of an artificial reality device based on the detected signals. As is explained in greater detail below, embodiments of the present disclosure may include systems having a head-mounted device configured to present an artificial reality view to a user and a control device including a plurality of electromyography (EMG) sensors. One or more processors, that may be located in any system component, may be programmed to detect EMG signals corresponding to user gestures associated with the EMG data received from the sensors and to classify the EMG signals to identify gesture types. The control signal may trigger the head-mounted device to modify the artificial reality view, for example, based on the gesture type(s).

Accurate control of objects (real or virtual) within an artificial reality environment may be useful to maintain an immersive experience. Gestures may be a useful way of controlling objects and need not require interaction with any real physical object. For example, actions such as pressing the key of a keyboard, turning a dial, pressing a button, selecting an item from a menu (among many other actions) may be simulated by a user gesture. A tapping gesture may simulate a key press. Furthermore, identification of which body part (e.g., which finger) has been used to perform a gesture allows further control of an artificial reality environment.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 26A:
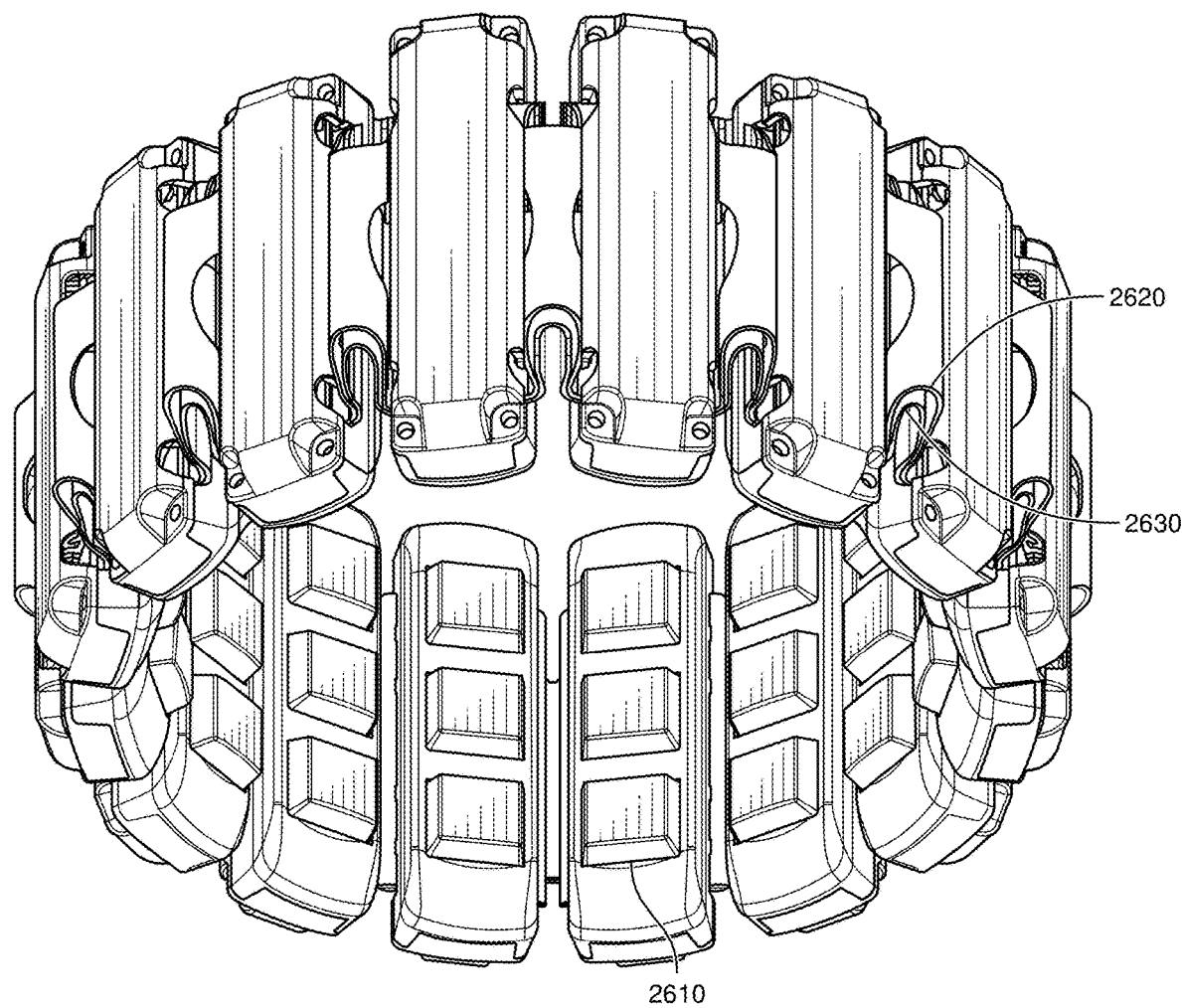
FIG. 26A illustrates a wearable system with EMG sensors arranged circumferentially around an elastic band configured to be worn around a user's lower arm or wrist, in accordance with some embodiments.
Figure 26B:
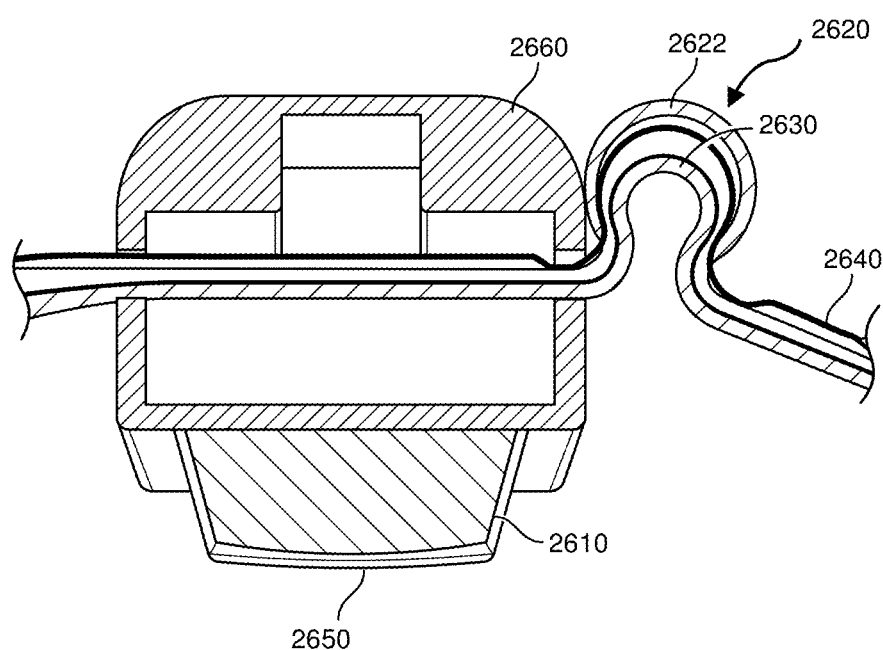
FIG. 26B is a cross-sectional view through one of the EMG sensors illustrated in FIG. 2A.
Figure 27A:
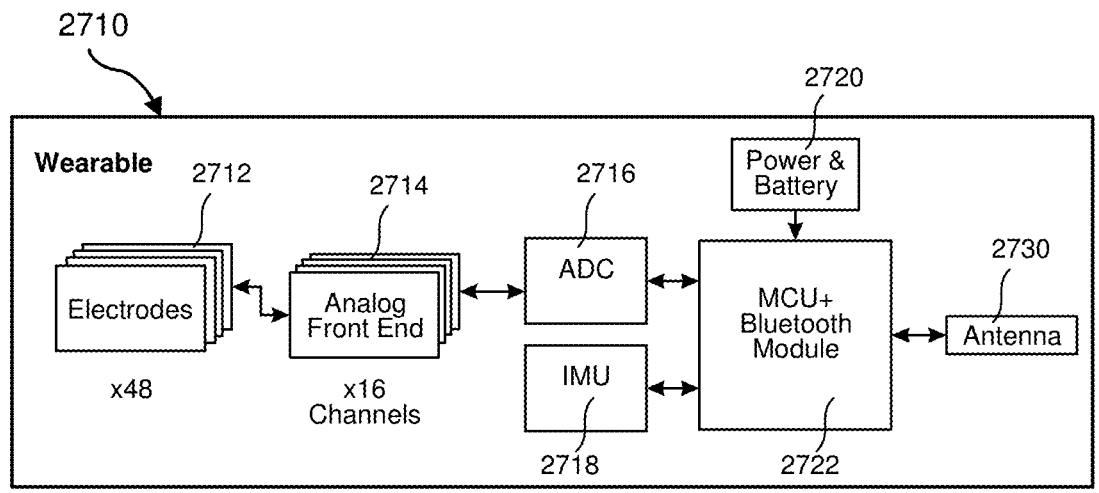
FIGS. 27A and 27B schematically illustrate components of a computer-based system on which some embodiments are implemented.
Figure 27B:
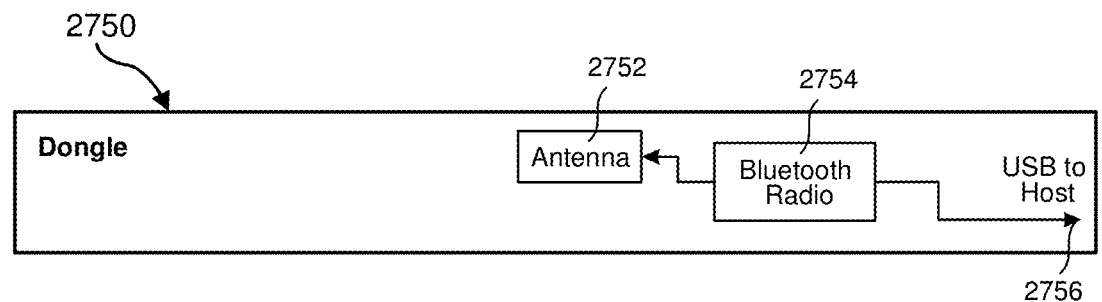
Figure 28:
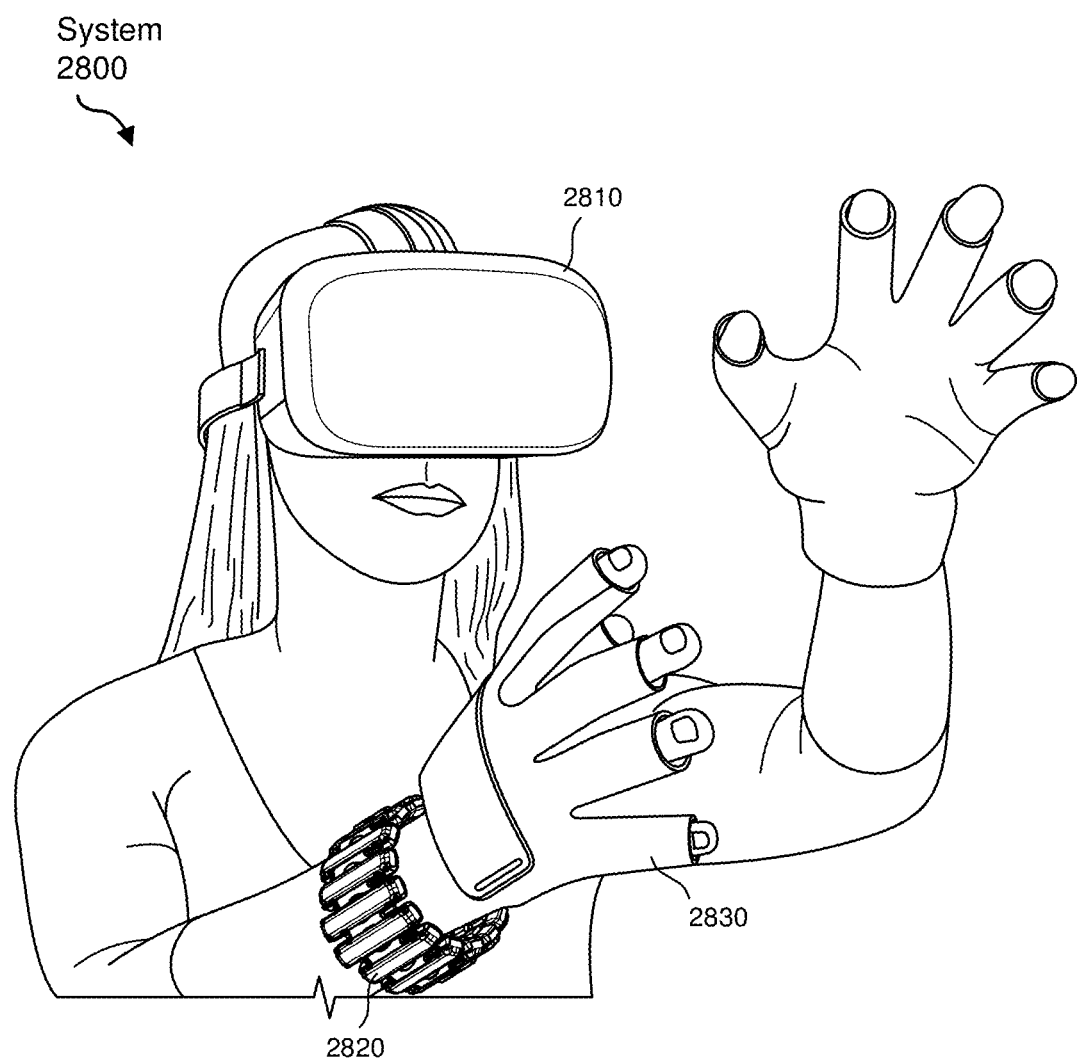
FIG. 28 shows an example implementation wherein a wearable device interfaces with a head-mounted wearable display.
Figure 29:
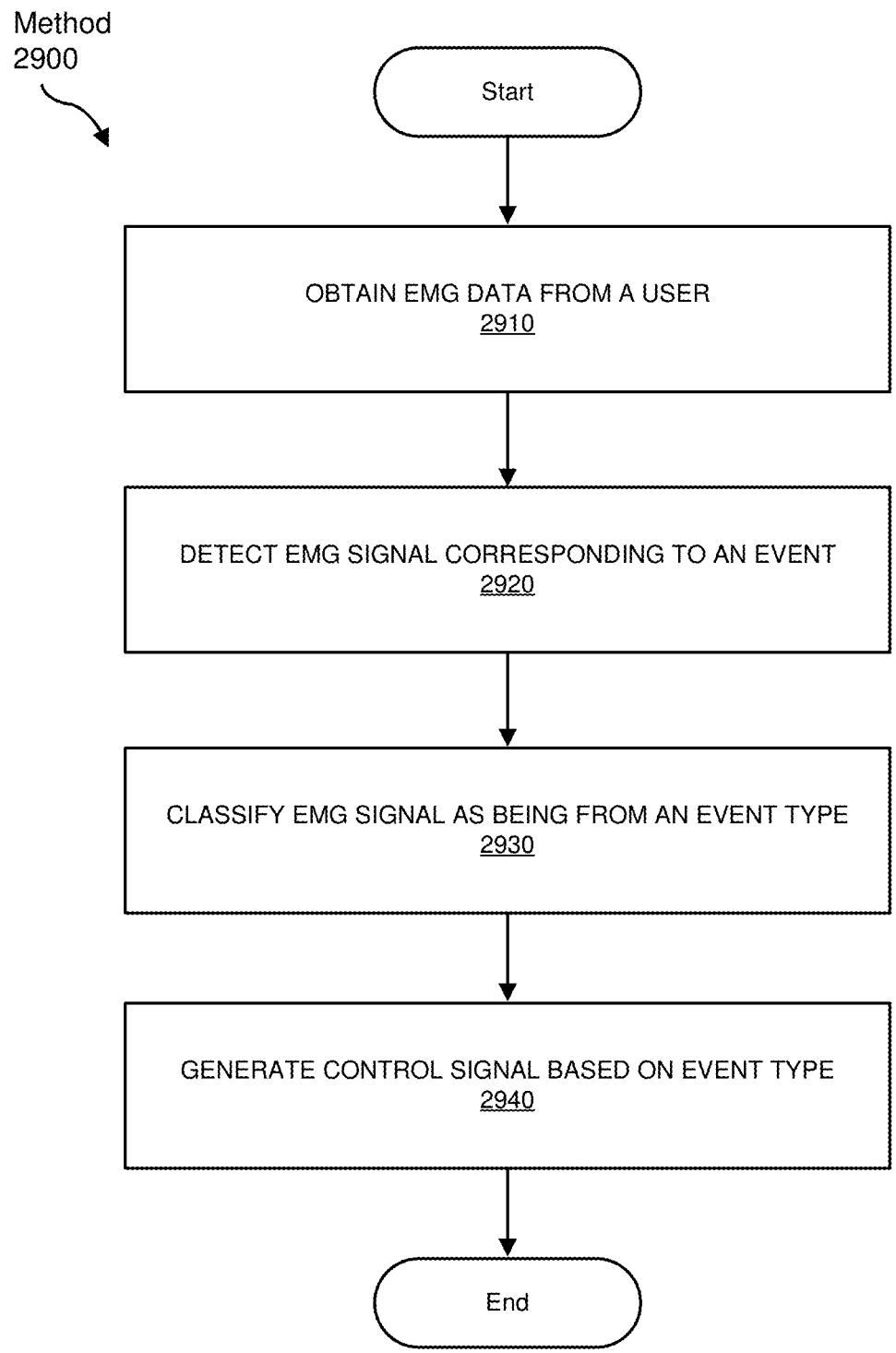
FIG. 29 and FIG. 30 illustrate example methods.
Figure 30:
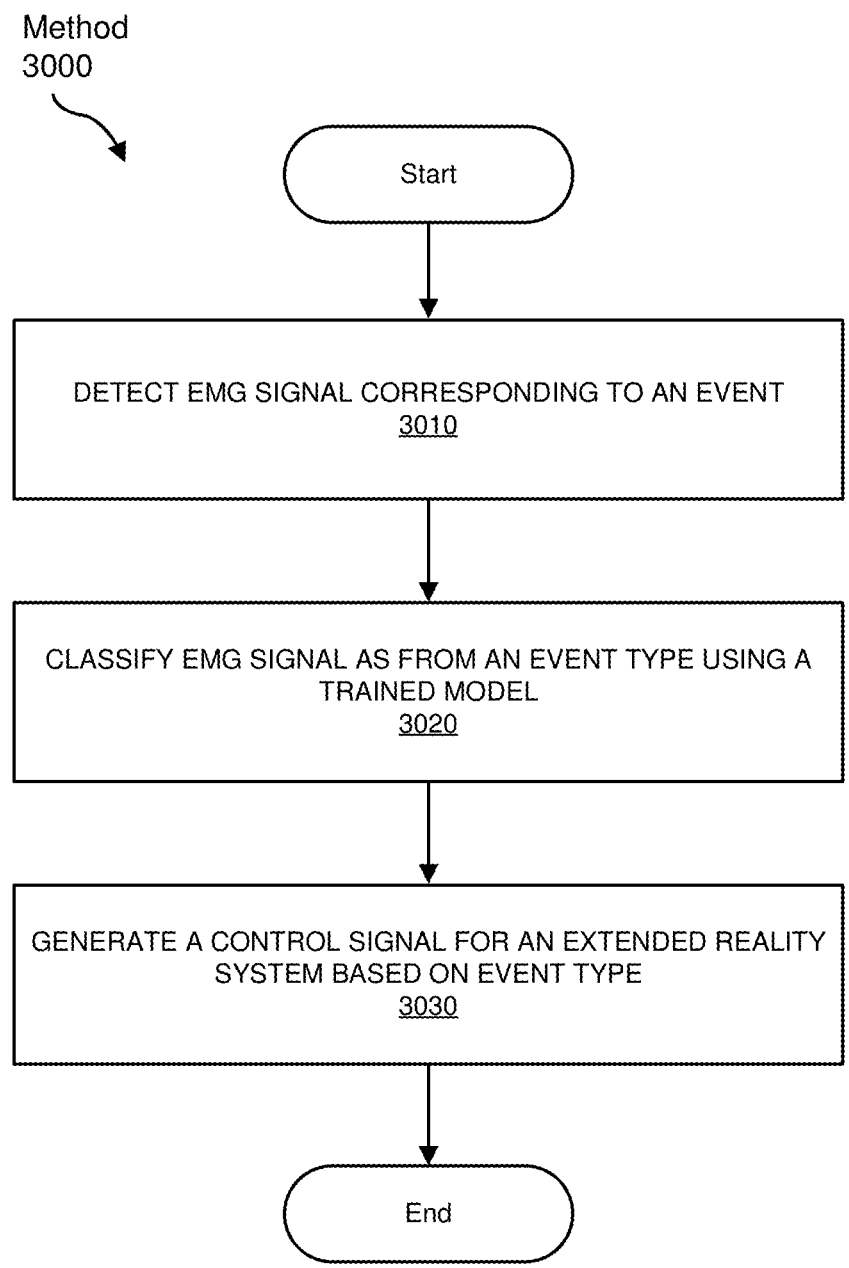
Figure 31:
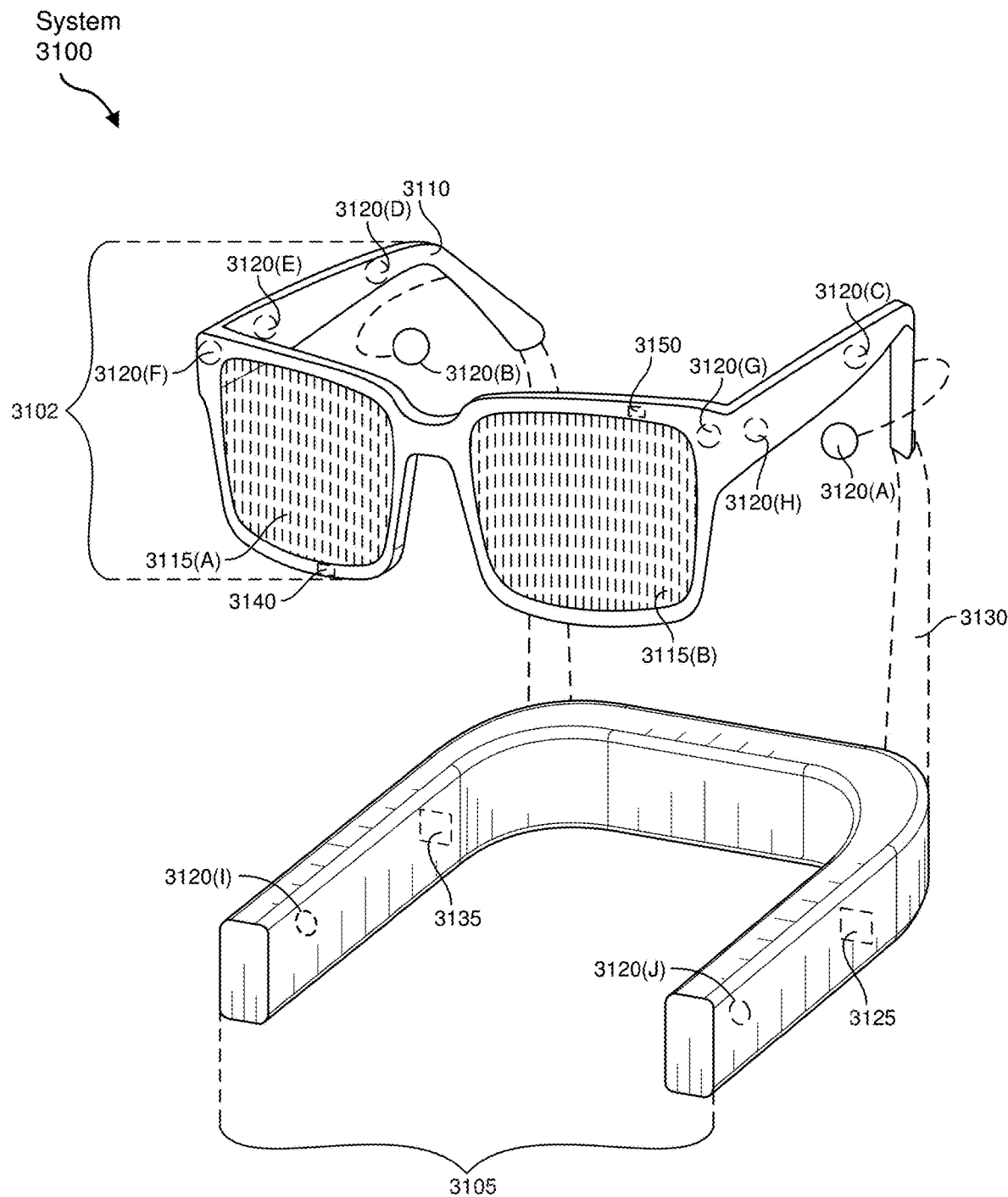
FIG. 31 is an illustration of exemplary augmented-reality glasses that may be used in connection with embodiments of this disclosure.
Figure 32:
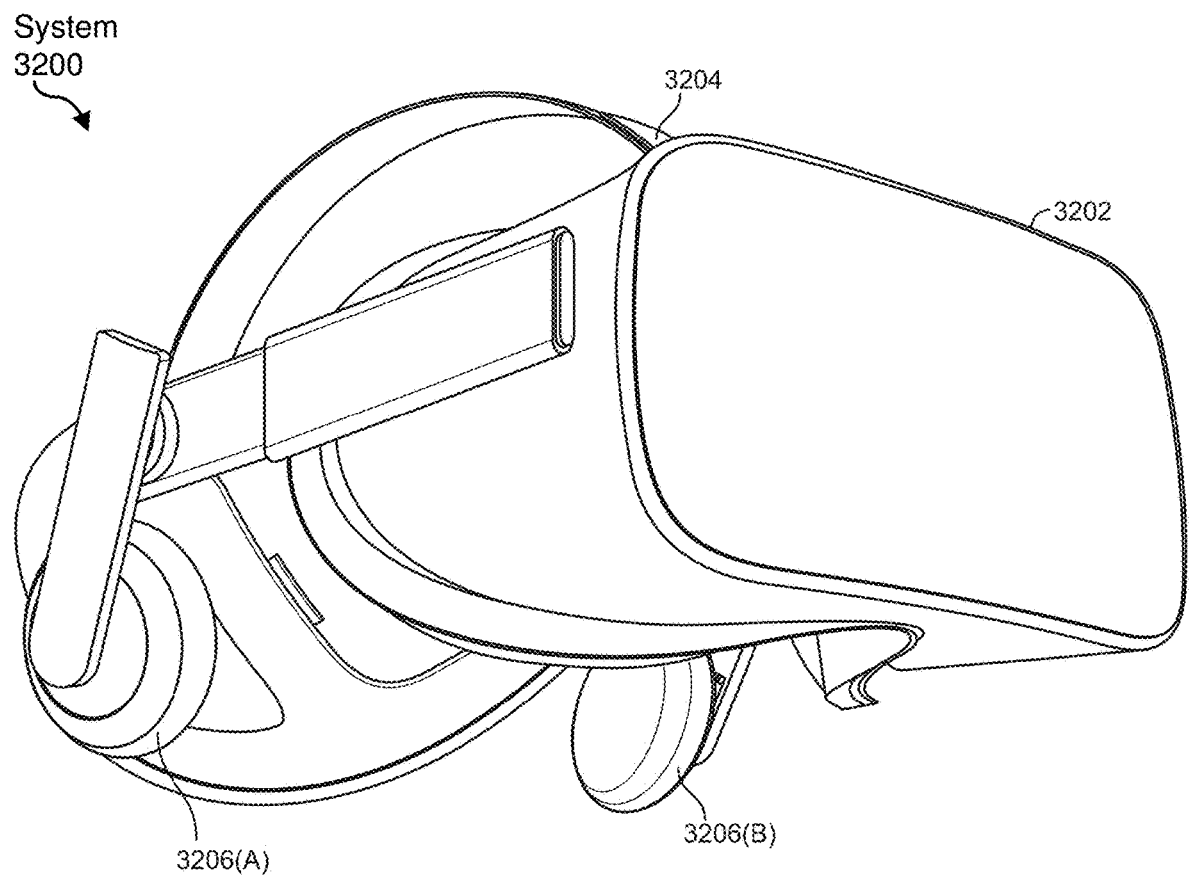
FIG. 32 is an illustration of an exemplary virtual-reality headset that may be used in connection with embodiments of this disclosure.

The following provides, with reference to FIGS. 1-30, detailed descriptions of gesture-identification models, including unsupervised and self-supervised models. FIGS. 1-13B illustrate event detection and classification, where the term "events" may include gestures such as finger taps. FIGS. 14-25B further illustrate time-dependence, clustering, training, and accuracy of various models. FIGS. 26A-26B illustrate an example control device. FIG. 27A-27B illustrate a schematic of a control device. FIG. 28 illustrates an example system including a head-mounted device. FIGS. 29-30 illustrate example computerized methods, and FIGS. 31 and 32 illustrate example AR/VR applications.

This disclosure is directed to event detector models that may be used to detect user gestures. Such detector models may involve recording a series of EMG signals (datasets) while one or more users perform different gestures. In some examples, example gestures may include finger taps (e.g., simulated keypresses), but other types of gestures may analogously be used to implement example event detector models.

Gestures may include discrete events that span a finite period of time and may be characterized, in some embodiments, by one or more electromyography signals (including electromyography wavelets) representing muscle activations. Configuring systems to detect and classify such gestures using machine learning techniques may involve a significant amount of labeled training samples. Hence, systems that may rapidly learn gestures from few samples and capture and interpret meaningful features from human gestures in an unsupervised or self-supervised way are highly desirable. Examples described herein provide such unsupervised and/or self-supervised models.

FIG. 1 shows a first component that may be extracted from the application of a principal component analysis (PCA, vertical lines), and detected peaks (dots). Multiple events are shown, divided into two groups separated by a rest period. The illustrated events may be detected using a peak detection process, which may also detect peaks registered during the resting period, corresponding to local maxima during rest.

The dataset may include EMG signals corresponding to index and middle finger taps. The dataset may be divided into a training set including 50 consecutive finger taps for each finger, recorded at approximately 2 Hz, and a test set including 20 consecutive finger taps for each finger, recorded at approximately 2 Hz. The above datasets may represent less than 2 minutes of recorded data. Any other suitable data sets may also be used as a training set.

A covariance mapped to the tangent space may be selected as a feature. A short time window (30 ms) and a stride of 5 samples, corresponding to a data rate of 400 Hz, may be used for the feature extraction. The dimensionality of the feature space may be reduced to find events in the dataset through the application of a Principal Component Analysis (PCA) on 5 components. Thereafter, the data may be centered (e.g., by removing the median) and finally, the local maximum (peak) may be identified on the first component.

Figure 2:
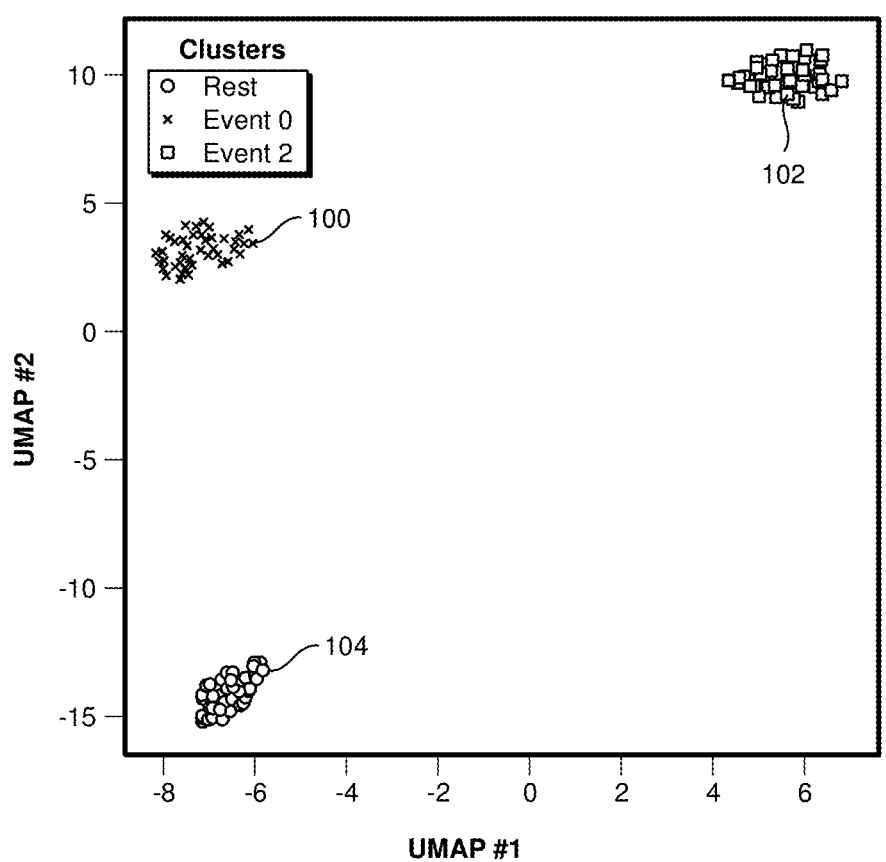
FIG. 2 shows example clusters produced from the detected events.

FIG. 2 shows clusters that may be produced from the detected events (including detected events registered during the resting period). Three clusters are shown, one for each type of finger tap (data groups 100 and 102, corresponding to index and middle finger taps). An extra cluster may arise for those events registered during the resting period (that may not be considered to be useful events). This extra cluster 104 may be located in the lower left corner, indicating a cluster with low energy samples. This cluster may be removed by dropping all corresponding events below, for example, a predetermined energy level threshold.

Data around each event may be sliced in epochs in preparation for the cluster analysis. In one example, a window of 150 ms may be centered around each event to slice the data, and any other suitable window size may be used in a similar manner. Thereafter, each of the epochs may be vectorized and subjected to a K-Means clustering process to extract the three clusters. For visualization purposes, a dimensionality reduction process based on Uniform Manifold Approximation and Projection (UMAP) may be applied to plot the clusters shown in FIG. 2, including approximately fifty events for each class of event.

Figure 3:
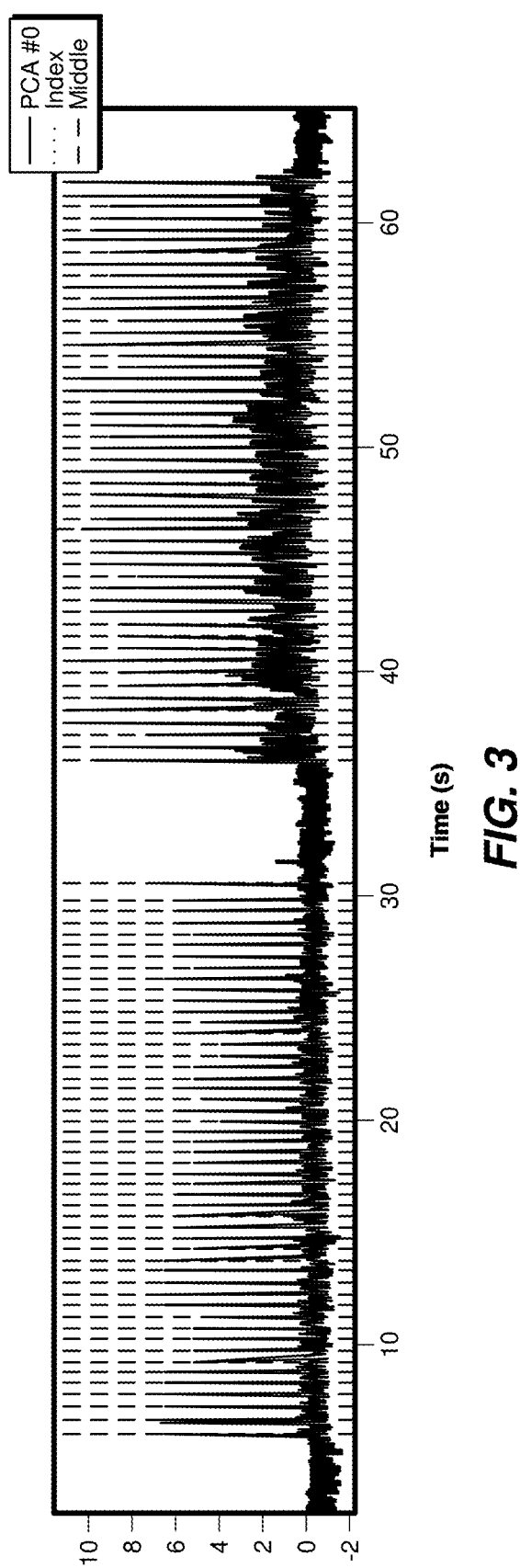
FIG. 3 shows an example plot of the first component from a PCA performed over the detected discrete events.

FIG. 3 shows a plot of the first component from a Principal Component Analysis (PCA), which may be performed over the detected discrete events. The data may be plotted with respect to the first component resulting from a Principal Component Analysis. In this example, index finger events are shown first (on the left), followed by the resting period, and then the middle finger events on the right.

In some examples, timing adjustments may be performed on the registered events. The timing of each event may be associated with the local maxima on the first component identified using the execution of a PCA analysis. The ground truth may then be generated from the acquired samples to train an event detection model.

Figure 4A:
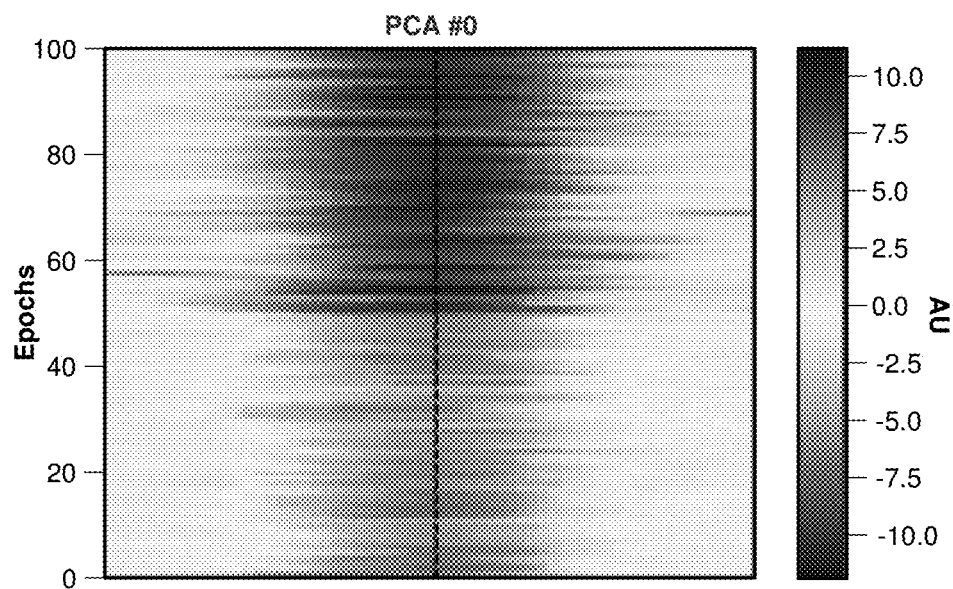
FIGS. 4A-4B illustrate epochs corresponding to discrete events showing synchronization quality aspects.
Figure 4B:
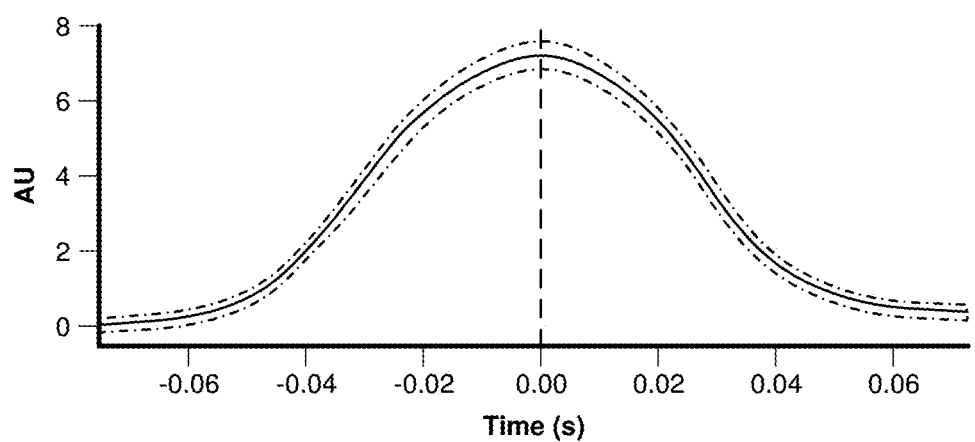

FIGS. 4A and 4B illustrate epochs corresponding to discrete events showing synchronization quality aspects. Some jitter and misalignment of the different epochs may be present.

In some examples, jitter and misalignments may be reduced or eliminated by finding an optimal offset for each epoch by analyzing the autocorrelation between the epoch and the average across all the event. Accordingly, different offsets (−10 to 10 samples) may be tested, and the timing that maximizes the correlation may then be selected. The testing process may be executed iteratively until all epochs are properly aligned.

Figure 5A:
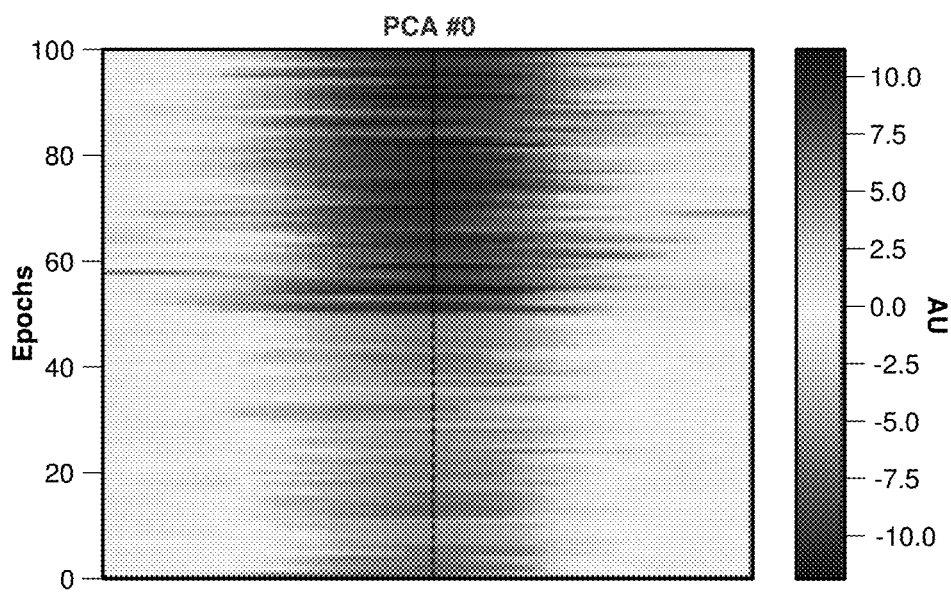
FIGS. 5A-5B show aligned epochs corresponding to detected discrete events.
Figure 5B:
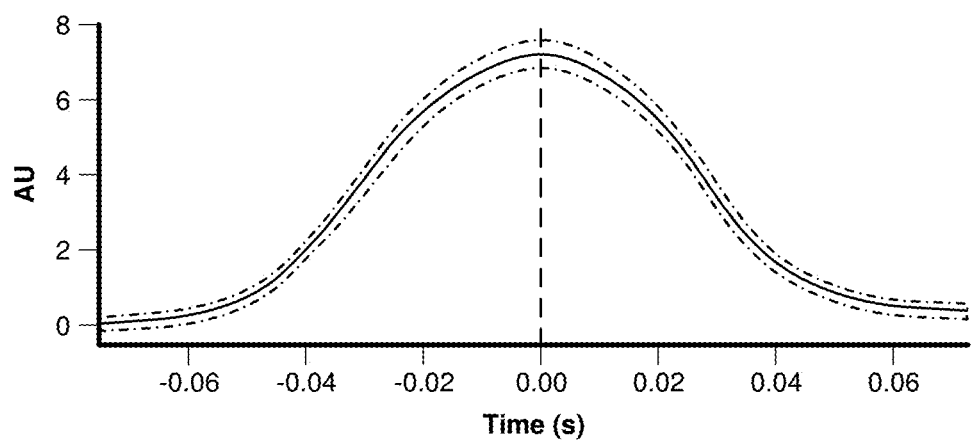

FIG. 5A and 5B show aligned epochs corresponding to detected discrete events.

Figure 6A:
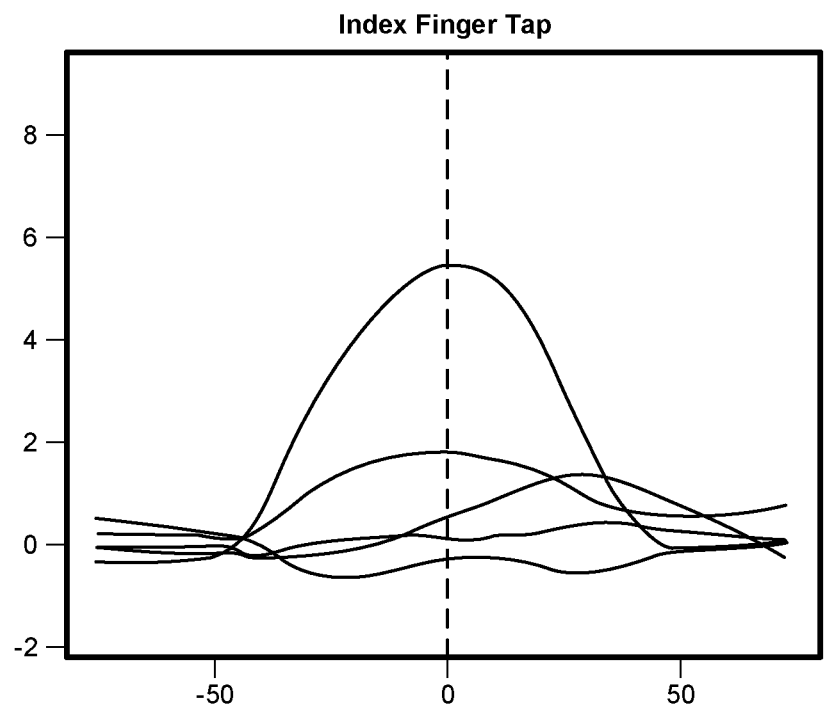
FIGS. 6A-6B show templates corresponding to a PCA analysis performed over the average of two different gestures.
Figure 6B:
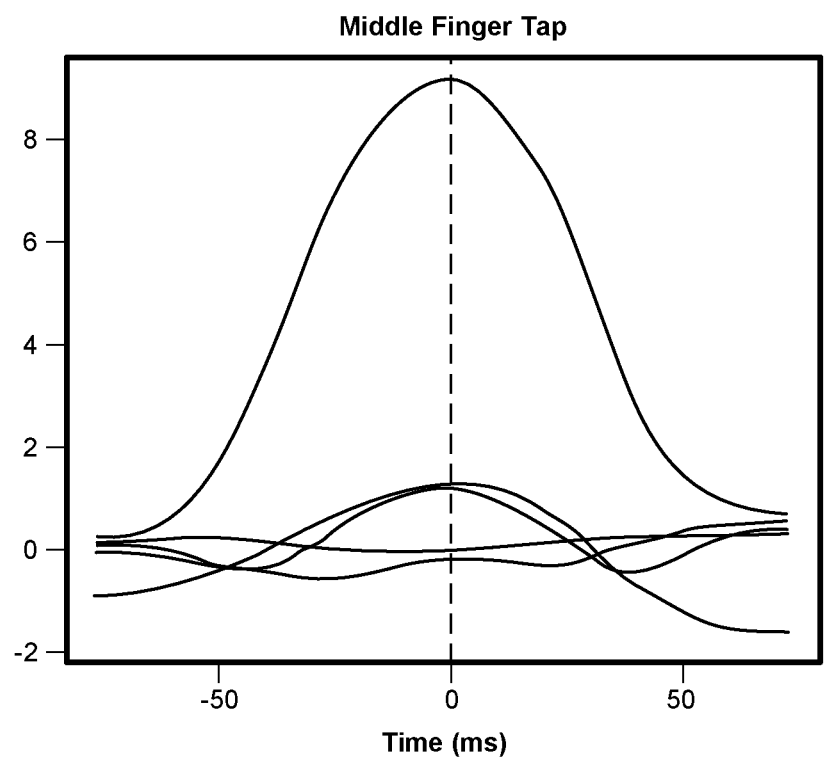

FIGS. 6A and 6B show plots of two templates corresponding to a PCA analysis which may be performed over the average of two different gestures. FIG. 6A corresponds to index finger tap data, and FIG. 6B corresponds to middle finger tap data. The templates may be based on the average energy of each event's epoch obtained after synchronization. The first PCA component (from five components of a PCA) may significantly differ in amplitude between the two finger taps (index vs. middle), and the other components may have different signal forms.

A binary time series may be labeled with a value of one when an event is detected (the event occurred) and a zero when the event is not detected (e.g., the event may not have occurred). A model to predict such a time series may be trained based on the labeled samples. The output of the model then may be compared against a predetermined energy threshold and debounced to configure the event detector.

Exemplary parameters may be configured for the model's ground truth. After re-synchronization, the events may be centered around the peak of the first PCA component. The model may rely on the full event time course, and the model may predict the event once a user finished its execution. Accordingly, the labels may be shifted or offset based on the event timing. This parameter may be referred to as "offset."

In some examples, the model may not perfectly predict the right single time sample corresponding to an event. Accordingly, the model may be configured to predict a value, such as 1, on several consecutive time samples surrounding the center of the event. This parameter may be referred to as a "pulse width."

In some examples, the offset may be set at 75 ms after the event peak (approximately 30 samples after the event's peak) and the pulse width may be set as 25 ms. These examples, and other examples, are non-limiting, and other parameter values may be used depending of particularities of the signals used during the training of the event detector model.

FIG. 7 illustrates events that may be detected using the first PCA component, with respective labels, that may be generated for 2 seconds of data. The event detector model may be implemented as a multilayer perceptron (MLP) model or other suitable machine learning model. Features may be collected from a 150 ms (approximately 60 samples) sliding window over the PCA features (e.g., for each time sample a vector with a vectorization of the previous 60 time samples of the five PCA components (i.e., 300 dimensions) may be generated).

The model may be trained to predict the labels used. The model may be applied on a test set, and the inferenced outputs may be compared to a predetermined threshold and debounced to elicit the identification of discrete events.

FIG. 8 illustrates detection of discrete events on a test set, including two outputs from the model (solid lines), as well as discrete events (dashed lines) that may be produced from the test set.

Figure 9:
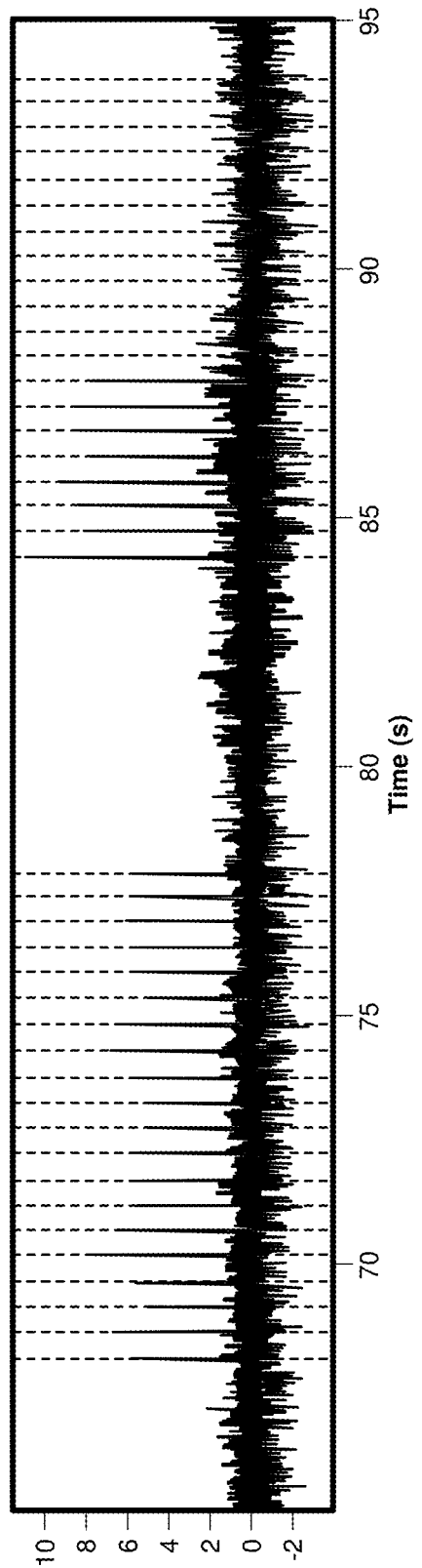
FIG. 9 shows an example of discrete events detected in a testing dataset.

FIG. 9 illustrates that discrete events may be detected in a test dataset, including, for example, five components produced using a PCA analysis conducted over the test set, and events that may be detected in the same set. All possible events may be detected by the model, and there may be clear disambiguation between the two types of discrete events.

In some examples, events may be classified from snapshots taken from the EMG signals. Snapshots taken around the time events may be detected or registered by the event detector. The event classifier model may be trained to distinguish between different types or classes of events. Such a classification is possible in part because each event is associated with a class or type of event corresponding to a characteristic or stereotypical signal associated with specific muscle activations synchronized with the occurrence of the event. Eighteen datasets may be used, and each dataset may be gathered from a different user. The datasets include recordings of EMG signals capture from key down, key up, and tap events. The total number of events used per user may be approximately 160 (80 for each finger index and middle).

The covariance may be estimated using a 40 ms time window and a stride of 2.5 ms, resulting from a feature sampling frequency of 400 Hz. The covariances may be then projected in the tangent space, and the dimension may be reduced by selecting the diagonal and two adjacent channels (represented in the matrix by the values located above and below the diagonal). A feature space of a dimension size of 48 is produced by the application of the above operations.

A window of signal ranging from −100 ms to +125 ms around each key press event may be extracted (e.g., sliced and buffered). Such windows may include approximately 90 EMG sample values. At the end of the aforementioned operations, a dataset of size 160×90×48 (N_events×N_time_samples×N_features) may be obtained for each user.

Figure 10A:
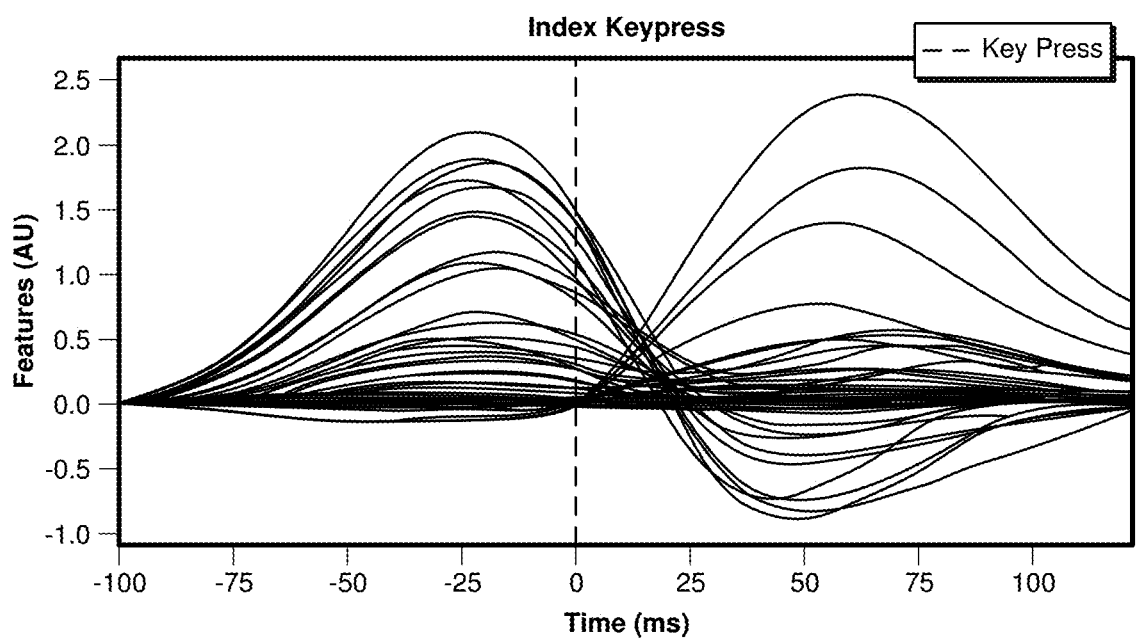
FIGS. 10A-10B show examples of an index finger tap event model and a middle finger tap event model.
Figure 10B:
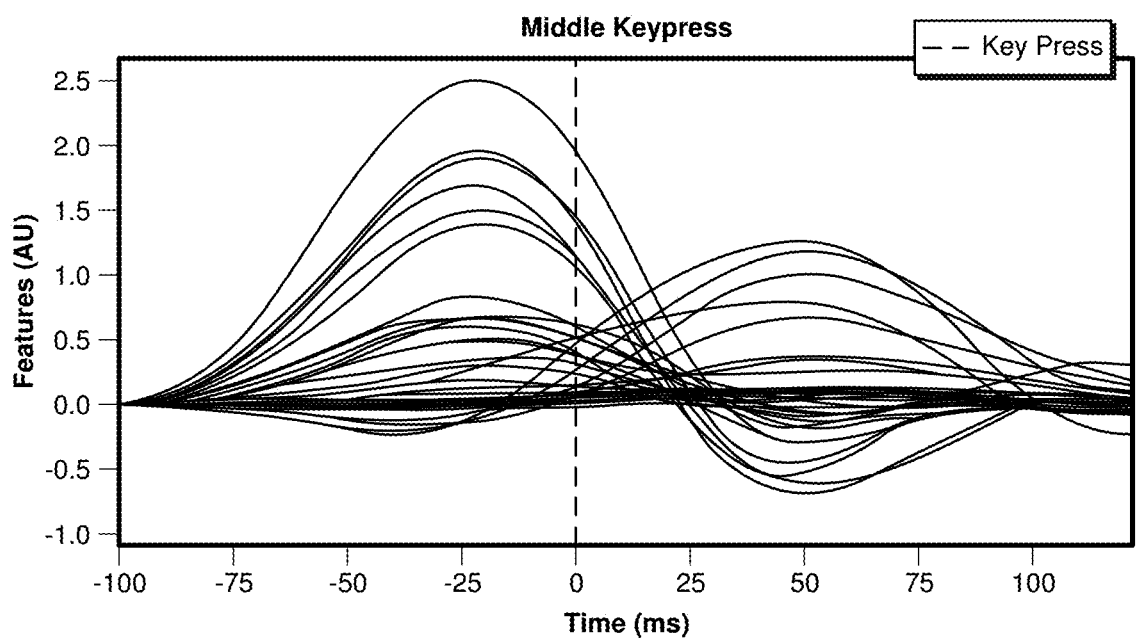

FIGS. 10A and 10B show examples of an index finger tap event model and a middle finger tap event model, respectively. Models of each event may be produced by averaging the EMG values of each event class (e.g., index tap and middle tap) for all occurrences of such events. Examples of the tap events are shown in FIGS. 10A and 10B.

In the event models shown in FIGS. 10A and 10B, two signals may be identified, one corresponding to the key press and one for the key release. The same features may appear to be active in both the index finger key press class and the middle finger key press class, but their respective amplitudes vary appreciably and provide a good basis for discrimination.

Figure 11A:
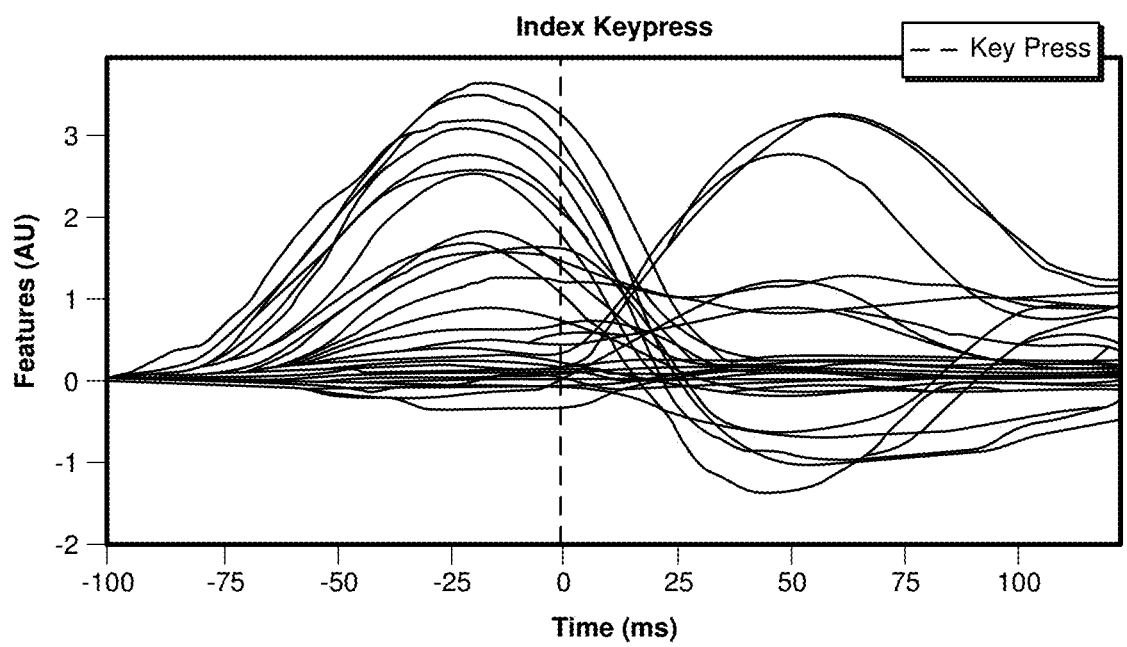
FIGS. 11A-11F show examples of user-specific event models for two classes of events.
Figure 11B:
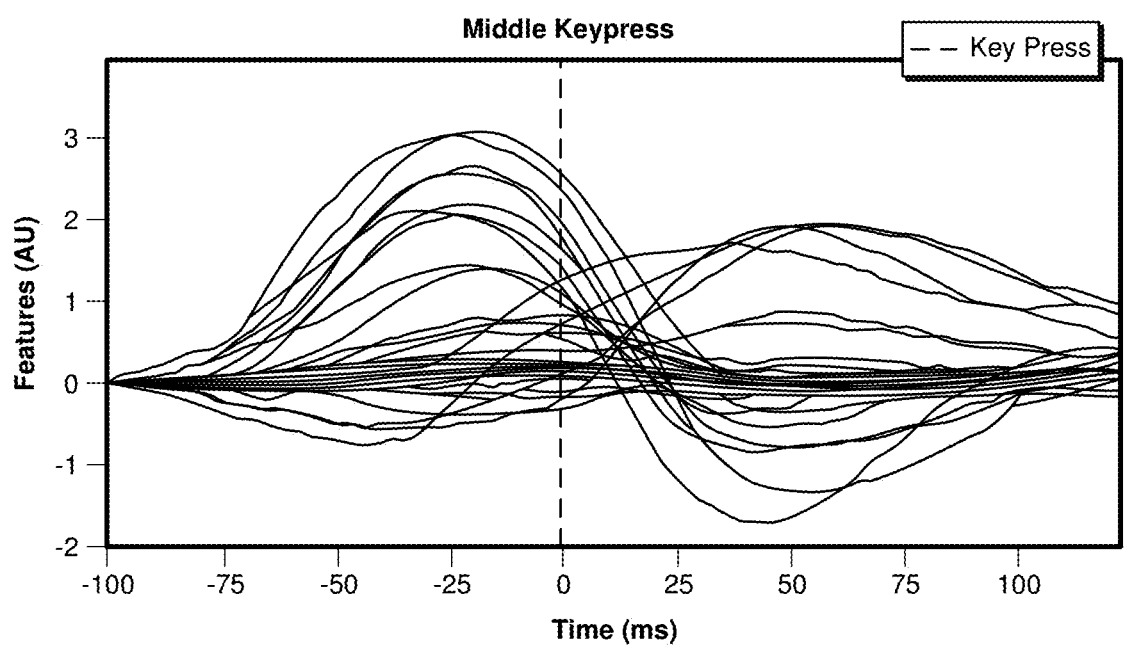
Figure 11C:
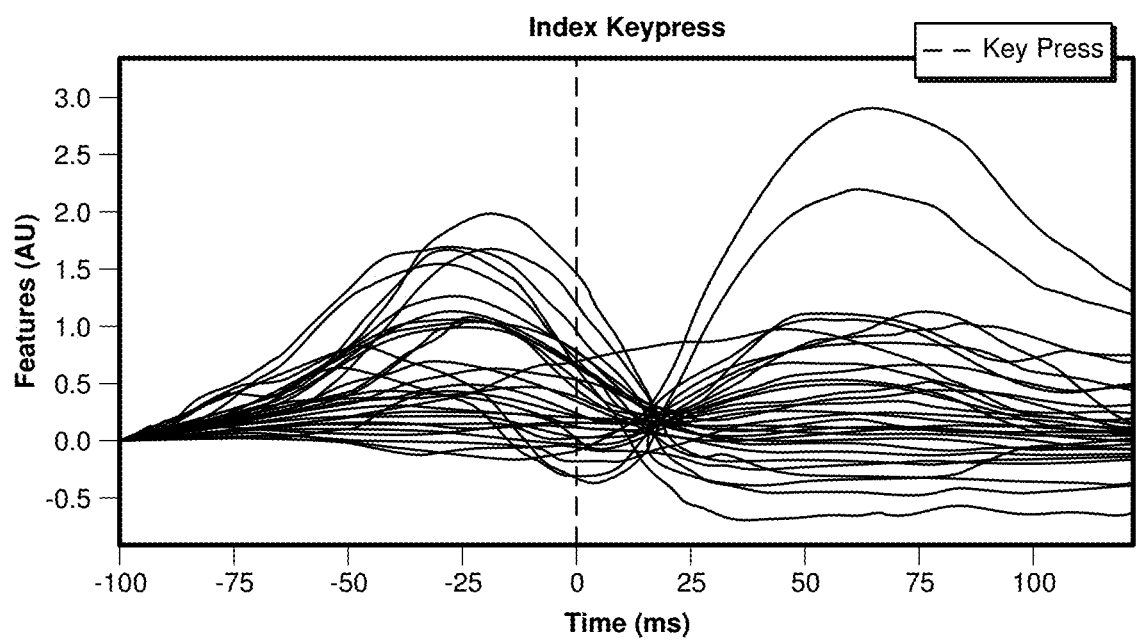
Figure 11D:
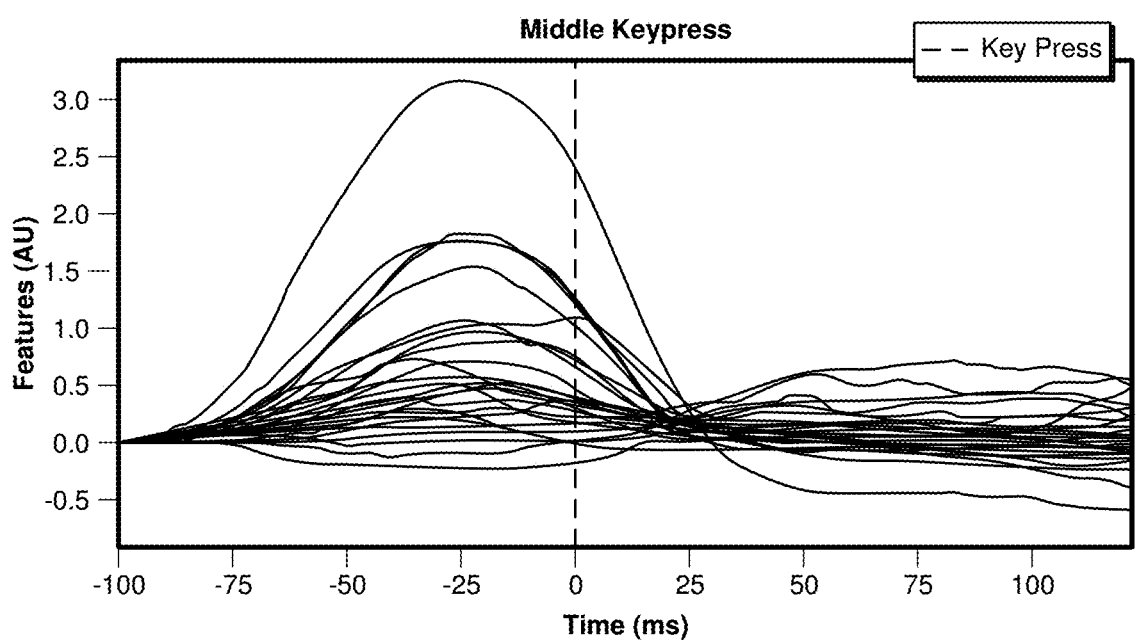
Figure 11E:
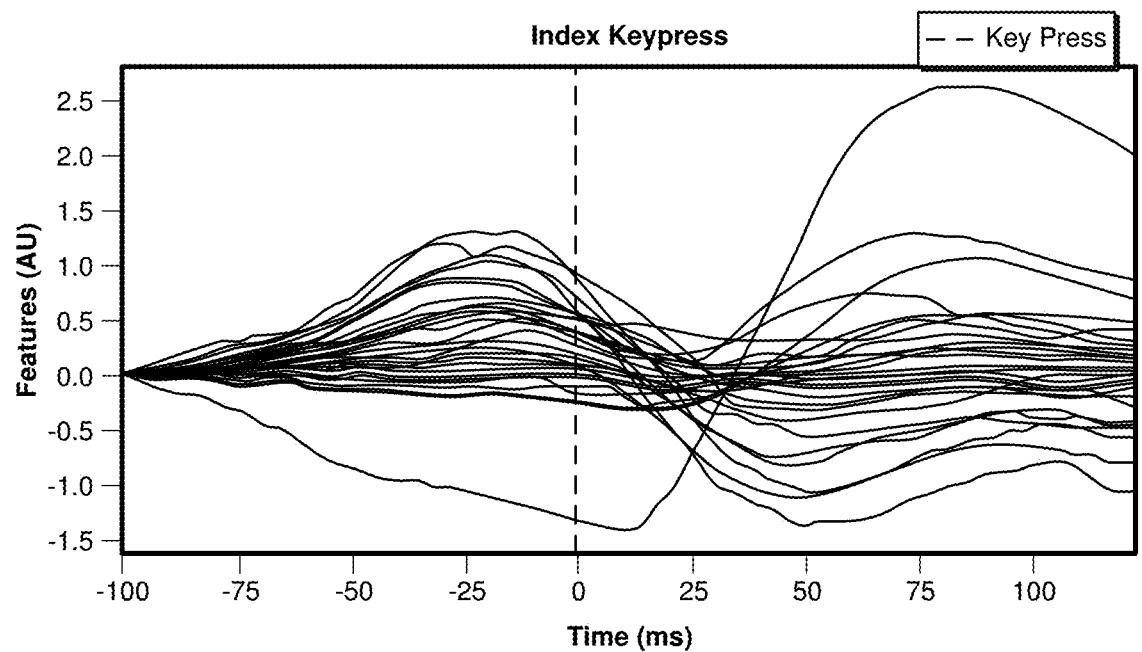
Figure 11F:
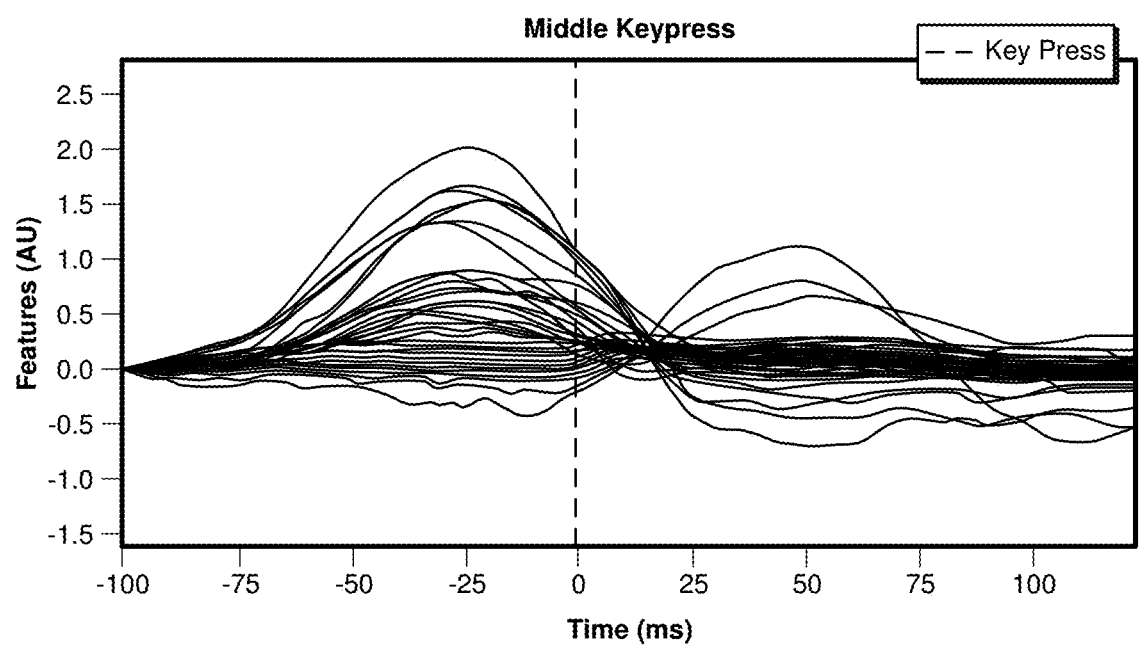

FIGS. 11A-11F illustrate examples of user-specific event models for two classes of events. FIGS. 11A, 11C, and 11E correspond to index keypresses, and FIGS. 11B, 11D, and 11F correspond to middle finger keypresses. Each user may show different patterns for each event class. While the timing is generally the same, great differences in amplitude may be observed among signals.

Several classification models may be used to implement single user event classification models. In some examples, each trial may be vectorized into a large vector (with dimensions corresponding to number of times points×features). Once such large vectors are generated, a classifier may be produced based on logistic regression, random forest, or multilayer perceptron, and may be implemented in a gesture classification model.

In some examples, the dimensionality of the data (on the feature dimension) may be reduced by applying a spatial filter then, vectorizing the result and using a classifier. Examples of spatial filters may be based, for example, on extraction of Common Spatial Patterns (CSP), or xDawn enhancement of evoked potentials in ensemble with a Linear Discriminant Analysis (LDA). Through the application of CSP, a subspace that maximizes the difference in variance of the sources may be determined. In an xDawn approach, spatial filters may be estimated from class averages rather than raw data (which may increase the signal-to-noise ratio (SNR)).

In some examples, a model may be developed by a method including one or more of the following approaches: concatenating an event model of each class (e.g., middle finger keypress and index finger key press) to each trial; estimating the covariance matrix; tangent space mapping, and applying LDA. Such approaches may produce a compact representation of the signal, and may be effective with low SNR.

A stratified random split with 90% training and 10% test may be used in part to conserve class balance. A random split may also be used. A 99% accuracy in average across users may be achieved using the linear regression classifier, with 95% for the worst user.

Figure 12:
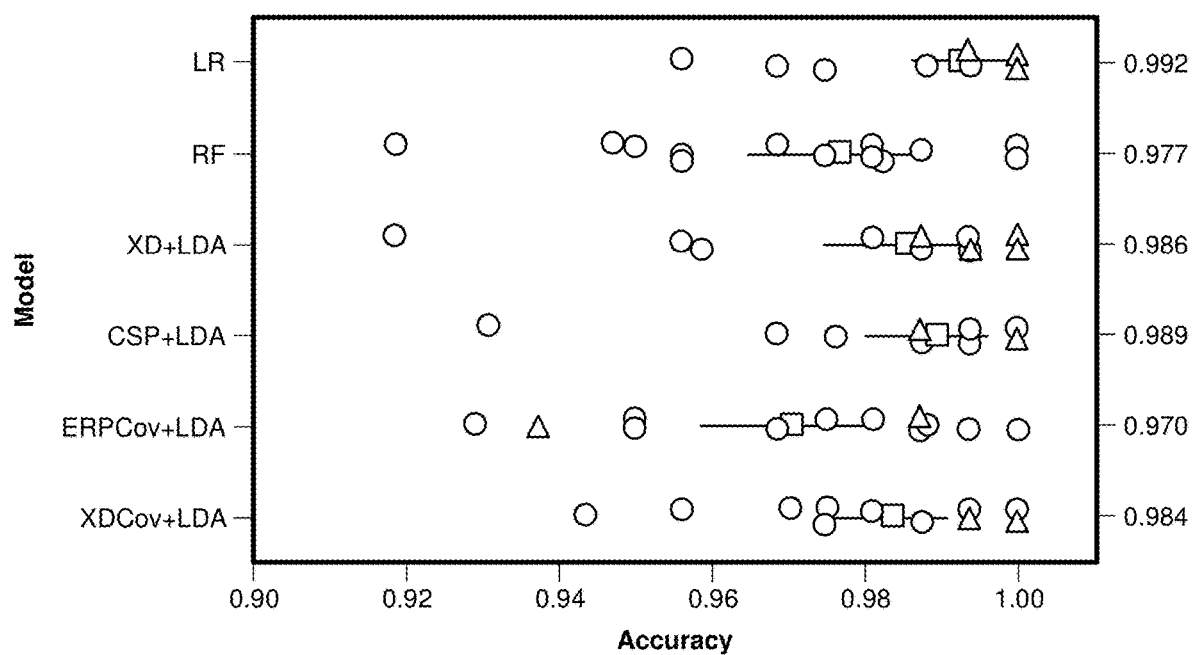
FIG. 12 shows example accuracy levels achieved by various single user event classification models.

FIG. 12 shows accuracy levels achieved by each of the tested models for single user event classification. Each dot in the plot represents a single user. The classifiers may generally perform at analogous accuracy levels to those shown in FIG. 12.

Training set size may be modified. The size of the training set may be changed in the split, from 5% to 90%. The amount of test data may remain fixed at 10%. Two classifiers may be used, LR and XDCov+LDA. Ten stratified random splits with 10% test and variable train size may be used for cross validation.

A plateau of accuracy may be reached at around 80 events. Twenty events may be used to achieve an accuracy of 95% with a classifier based on logistic regression. The classifier based on XDCov+LDA may take a greater number of events to converge.

Figure 13A:
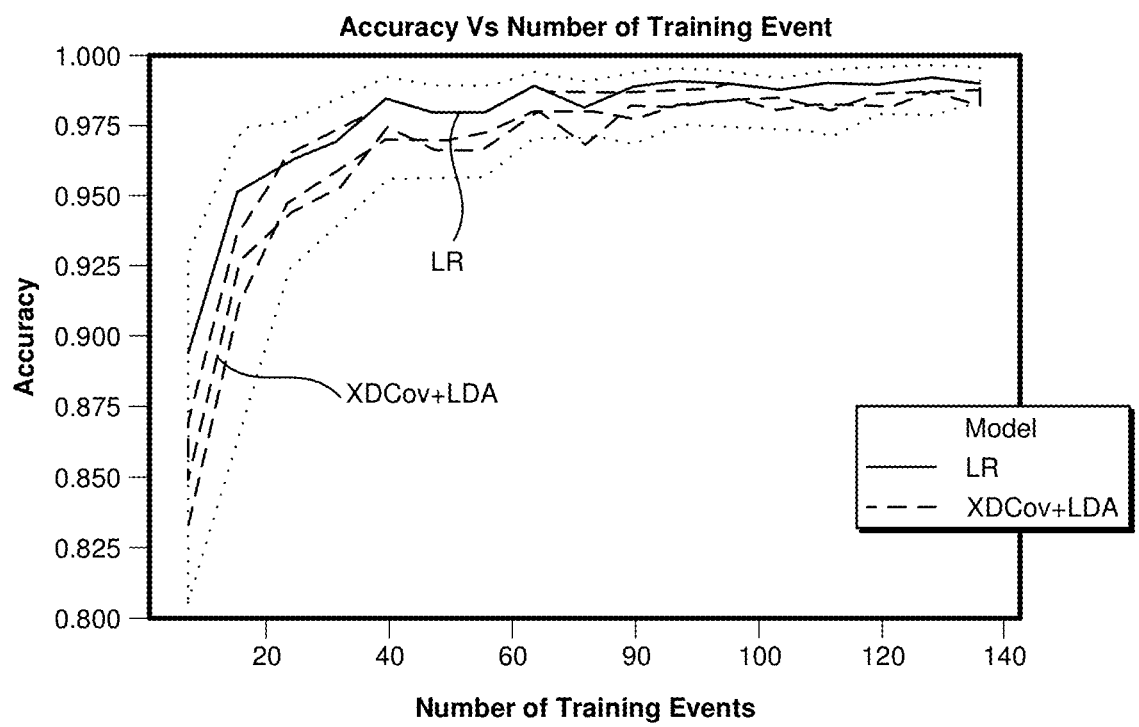
FIG. 13A shows example accuracy levels achieved by two single user event classification models.

FIG. 13A shows example accuracy levels that may be achieved by two different implementations of single user event classification models, as a function of the number of training events. Results are shown for LR (solid line) and XDCov+LDA (dashed line) approaches. The remaining dashed and dotted lines give a qualitative indication of possible uncertainties for the LR results (upper dotted line and generally lower middle dashed line) and XDCov+LDA results (remaining dashed line and lower dotted line).

Window size may also be adjusted. The size of the window used to classify the event may impact the latency of the event detection. Accordingly, the model's performance may vary depending on the window size parameter, which may be adjusted accordingly.

In some implementations, a single time point for the classification may be used to uncover which time point contains information. Alternatively, an increasing window size (containing all past time points), from, for example, −100 ms to +125 ms after the keypress event may be used. For each time point or window size, a user specific model may be trained, and the performance of the resulting classifier(s) or mode(s) may then be evaluated. A logistic regression model or other suitable model, as discussed above, may be used to implement a classifier. Cross validation may be achieved using 10 stratified random splits with 10% reserved for testing purposes and 90% used for of training purposes. These numerical values, and other values discussed herein, are exemplary and not limiting.

Figure 13B:
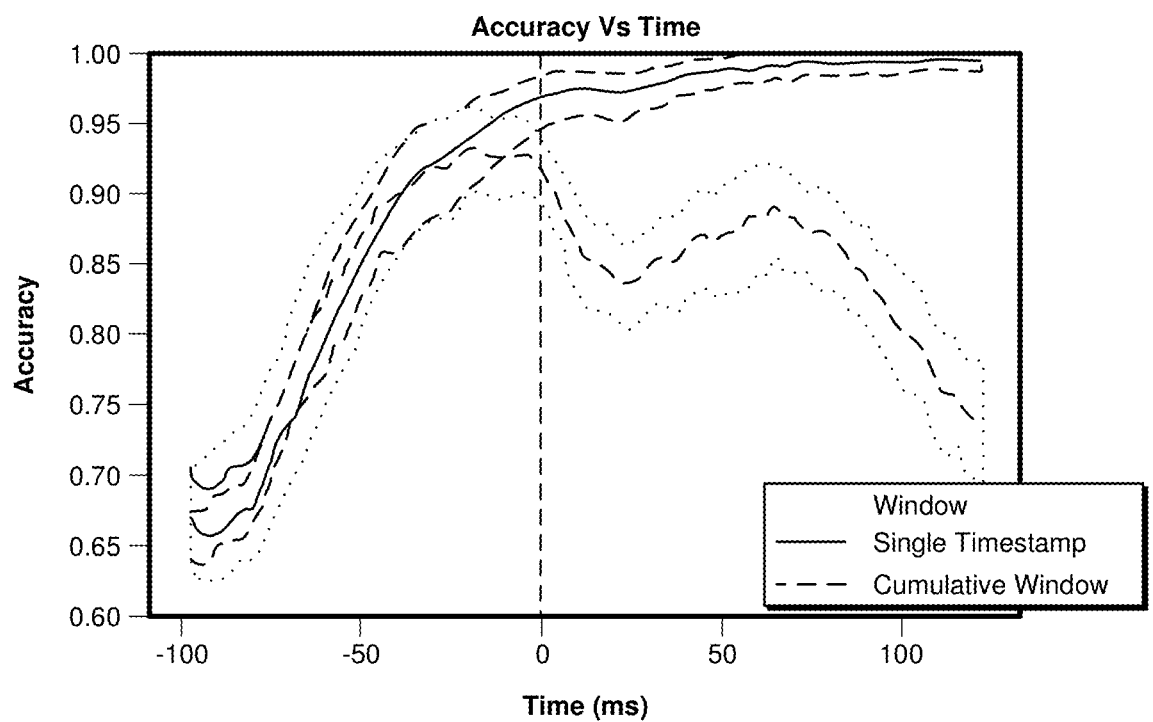
FIG. 13B shows example accuracy levels versus time for two single user event classification models (single stamp and cumulative window size).

FIG. 13B shows example accuracy levels that may be achieved by a single time stamp and a cumulative window size. The results indicate that most time points in the window may contain information that allow the model to classify them above the chance level (with, e.g., approx. 50% accuracy). Maximum accuracy may be reached at −25 ms for a key press, and around +70 ms for key release. Using a cumulative window including all past time samples, a maximum accuracy level may be reached at the end of the window. An average accuracy level of 95% may be reached using all timestamps before the key press event. Waiting for the release wave may boost the accuracy by providing complementary information. The remaining dashed and dotted lines represent a qualitative indication of possible uncertainties.

A generalization across time may be used to determine how independent time samples. As part of the generalization across time, a classifier may be trained at a single time point, and then the classifier may be tested at another time point. This approach may determine if the different processes involved in the event are stationary. If the same combination of source is similarly active across two different time points, then it may be implied that the single user model may be transferred or used to classify events produced by other users.

A classifier based on logistic regression may be trained for each user and each time point. The accuracy of each classifier may then be evaluated for every other time point (for the same user). The accuracy across all users may then be averaged, as well as the structure of the accuracy matrix.

Figure 14:
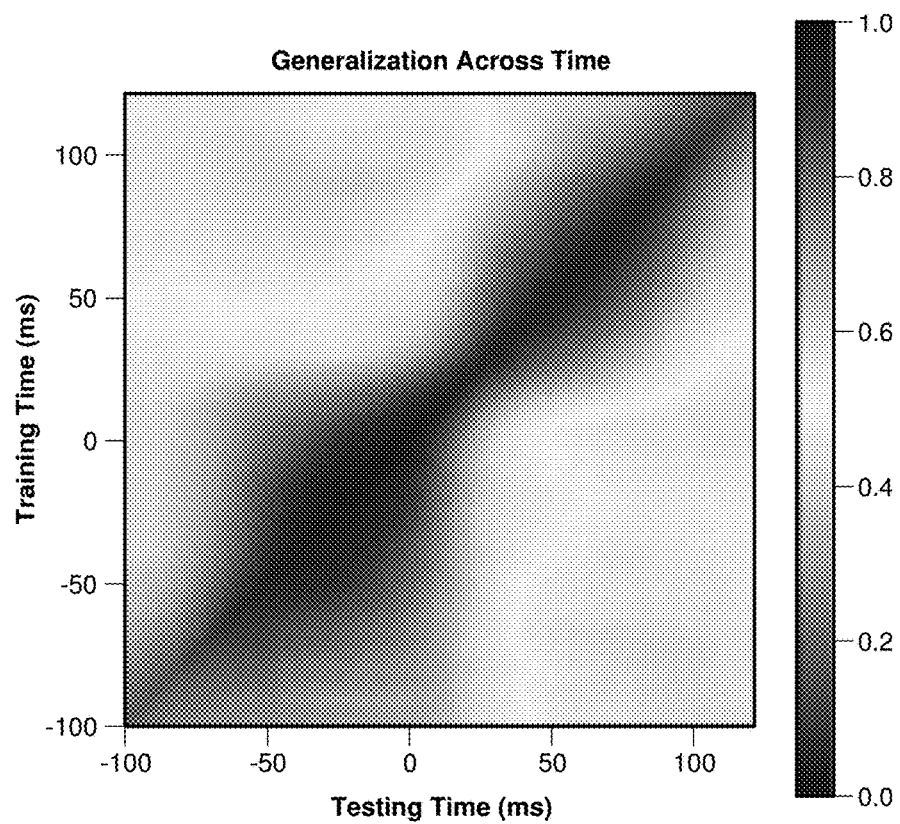
FIG. 14 shows a generalization across time executed to determine the independence of time samples.

FIG. 14 shows a generalization across time that may be executed to determine the independence of time samples. Two clusters may be observed in the accuracy matrix, one corresponding to the key press and another corresponding to the key release. From the observed transfer within each of the clusters, it may be implied that each time sample does not carry much complementary information, and that using a carefully selected subset of samples may be sufficient to achieve an optimal accuracy (or alternatively, compressing the feature space with Singular Value Decomposition SVD may be useful).

In some examples, generalized cross-user classification models may be used. A classifier may be trained with the data collected from several users, and the trained classifier obtained may be tested for its performance on a test user. As discussed above, several types of classifiers may be implemented to determine an optimal type of classifier. Data extracted from one user may be left out for cross validation purposes. On average, the accuracy achieved across the implemented models may be around 82%. A large variance across users may also be observed.

Figure 15:
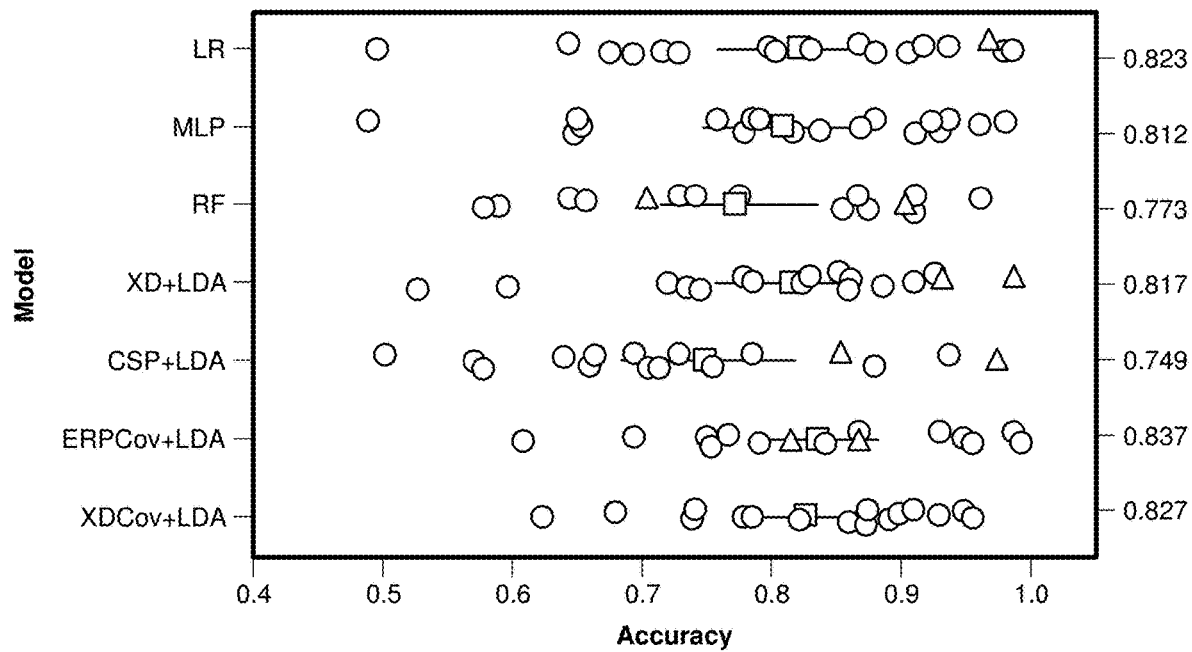
FIG. 15 shows example accuracy levels for generalized cross-user classification models.
Figure 16:
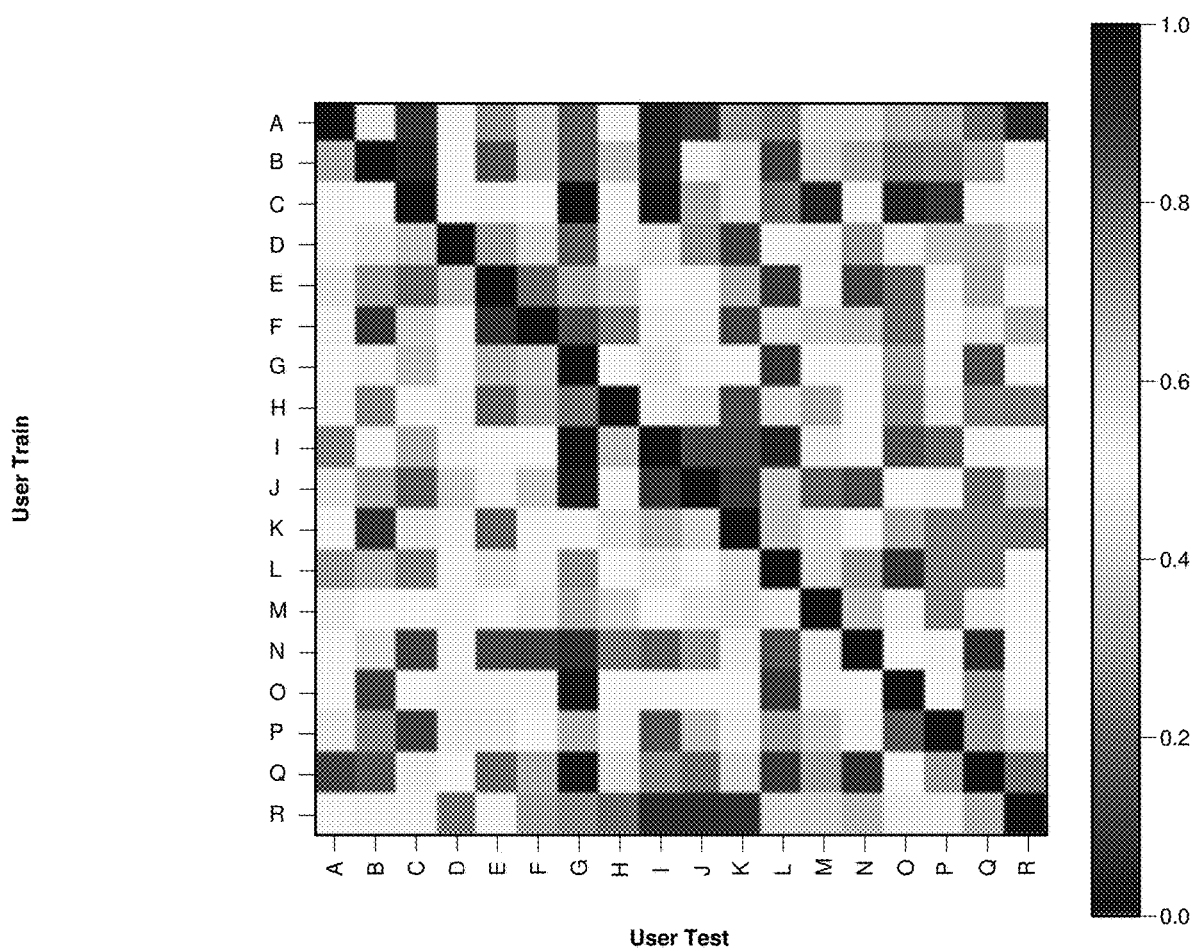
FIG. 16 shows an example of transferability of user specific classifiers based on linear regression.

FIG. 15 illustrates accuracy levels of generalized cross-user classification models, and shows that some classifiers may reach 100% accuracy, while others may only reach an accuracy below 60%. FIG. 16 also indicates that reasonable accuracy levels may be achieved using classifiers based on linear regression.

In some examples, model transfer across pairs of users may be used. A classifier model may be trained based on data extracted from one user, and then the accuracy of the model may then be evaluated in relation to the data for every other user. The classifier model may be based on logistic regression.

FIG. 16 illustrates transferability of user specific classifiers based on linear regression, showing that a large variability of transfer accuracy may be observed. Some user specific models may adequately be transferred to some other users. Some user specific models appear to be good recipients (e.g., the user model for "Alex" shown in FIG. 16) with good transfer to most other users, while other user specific models (e.g., the user model for "Rob") do not appear to have a good match with other users.

In some examples, user adaptation may also be used. Based on the investigation of single user event classification models, even classes derived from a single user may be separated, and a relatively small amount of labeled training data may be used to obtain a reasonably accurate single user event classification model.

From the generalized cross-user classification model results, it may be inferred that some user specific classification models transfer adequately to other users. Based on these initial results, the following examples follow. In some examples, models from other (different) users may be used get a good estimate of labels for a present user. Also, using this estimation of labels, a user specific model may be trained to obtain a performance close to that of a single user model trained with labeled data.

User embedding may also be used. An embedding space where the two event classes may be clustered may be generated. The user transfer matrix suggests that, for each test user, there are generally some (e.g., two) single user models that may adequately transfer. A user embedding space including the outputs of a collection of single user models may be constructed. Specifically, a simple nearest-centroid classifier over a covariance feature (XDCov+MDM) may be built. The advantage of the XDCov+MDM approach with respect to linear regression or other alternative probabilistic models is that an event may still contribute to cluster separability even if the model may be calibrated inappropriately.

The output of the XDCov+MDM model may be a function of the softmax applied over the distance to the centroid of each event class. In some examples (e.g., binary classifications), one dimension may be used for each user specific mode. The number of dimensions, however, may be extended depending on the classification type, such as a classification that may be made from a pool of more than two possible classes, for example, greater than a binary classification.

The embedding associated with a user may be trained with samples derived from all the users, minus one user, from a group of users. Thereafter, the samples associated with the user not used in the training of the embedding may be projected into the trained embedding. Thus, a space of X−1 dimensions may be produced, where X is the number of users from the group of users.

Figure 17A:
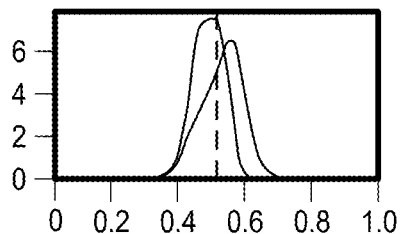
FIGS. 17A-17Q show example distributions of two classes of gestures.
Figure 17B:
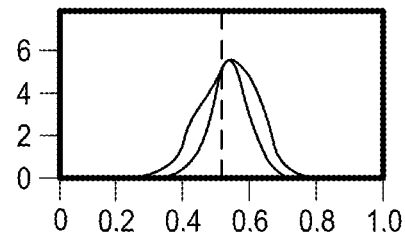
Figure 17C:
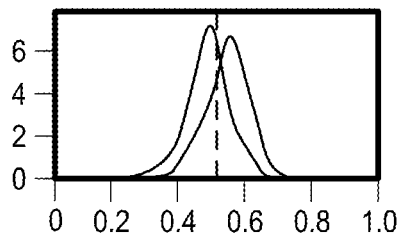
Figure 17D:
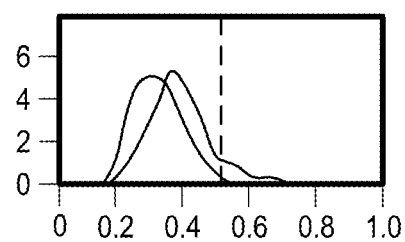
Figure 17E:
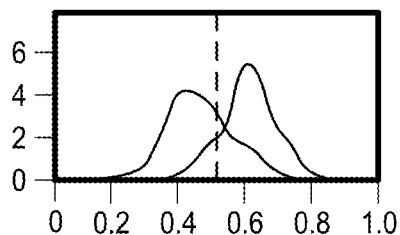
Figure 17F:
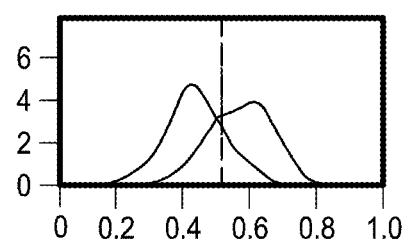
Figure 17G:
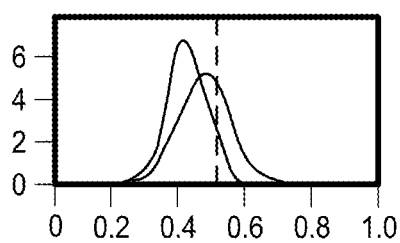
Figure 17H:
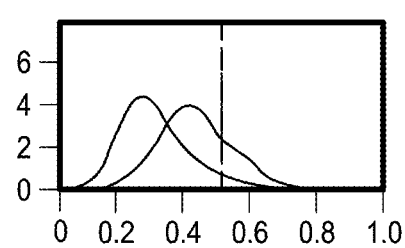
Figure 17I:
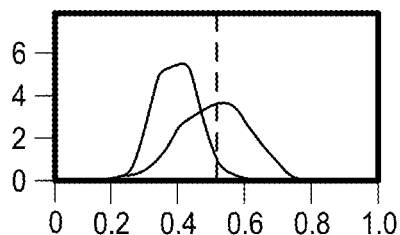
Figure 17J:
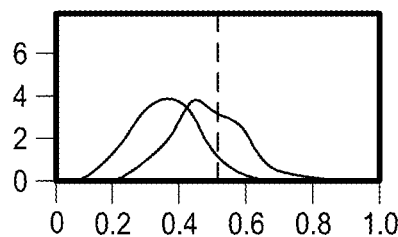
Figure 17K:
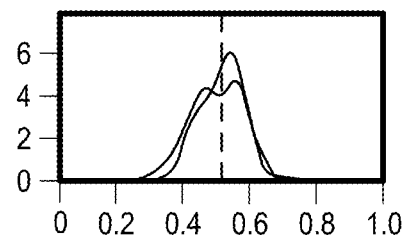
Figure 17L:
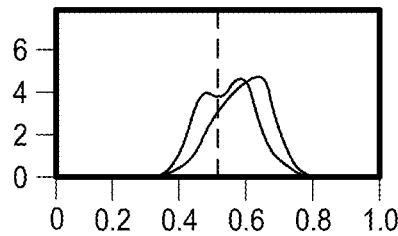
Figure 17M:
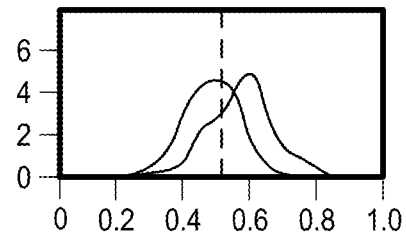
Figure 17N:
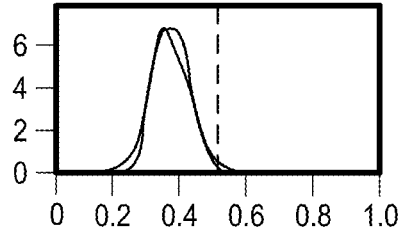
Figure 17O:
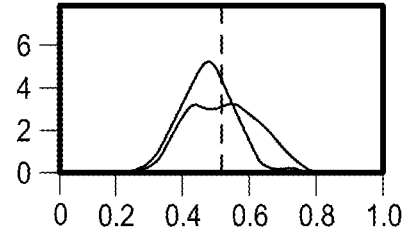
Figure 17P:
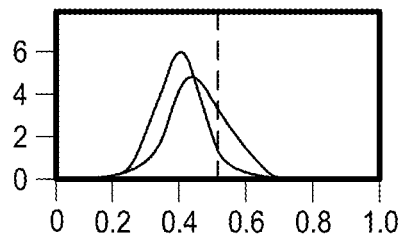
Figure 17Q:
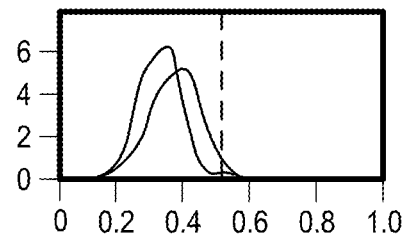

FIGS. 17A-17Q show example distributions of the two classes of gestures (index finger taps and middle finger taps), for each dimension. A separation of the two classes may be distinguished in some models, while other models show approximately identical distributions. In some examples, when the models are not optimally calibrated, (i.e. the optimal separation between the class may not be at 0.5), the model may still effectively separate the two classes.

After producing the embedding as discuss above, a clustering process may be executed to separate the clusters corresponding to the different types of event classes (such as index finger tap and middle finger tap or pinches or snaps or other gesture types to be separated). For example, a K-means process may be run on the set of data points produced using the embedding.

Figure 18B:
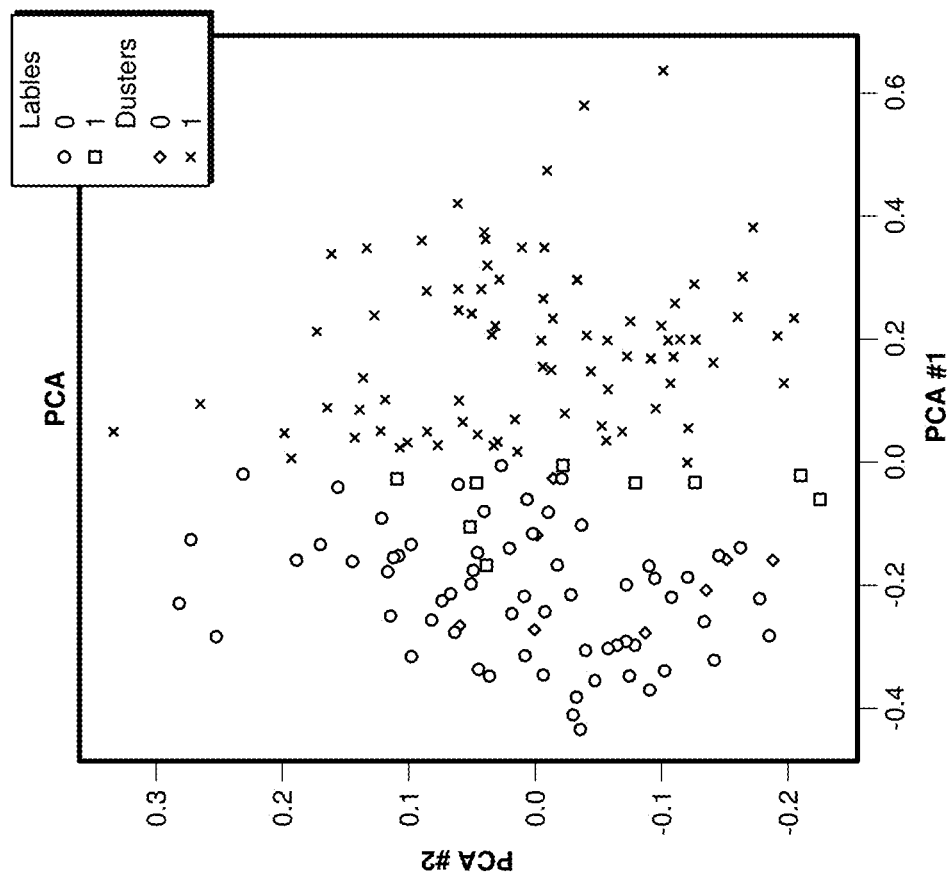
FIGS. 18A-18B show examples of separated clusters using UMAP and PCA.
Figure 18A:
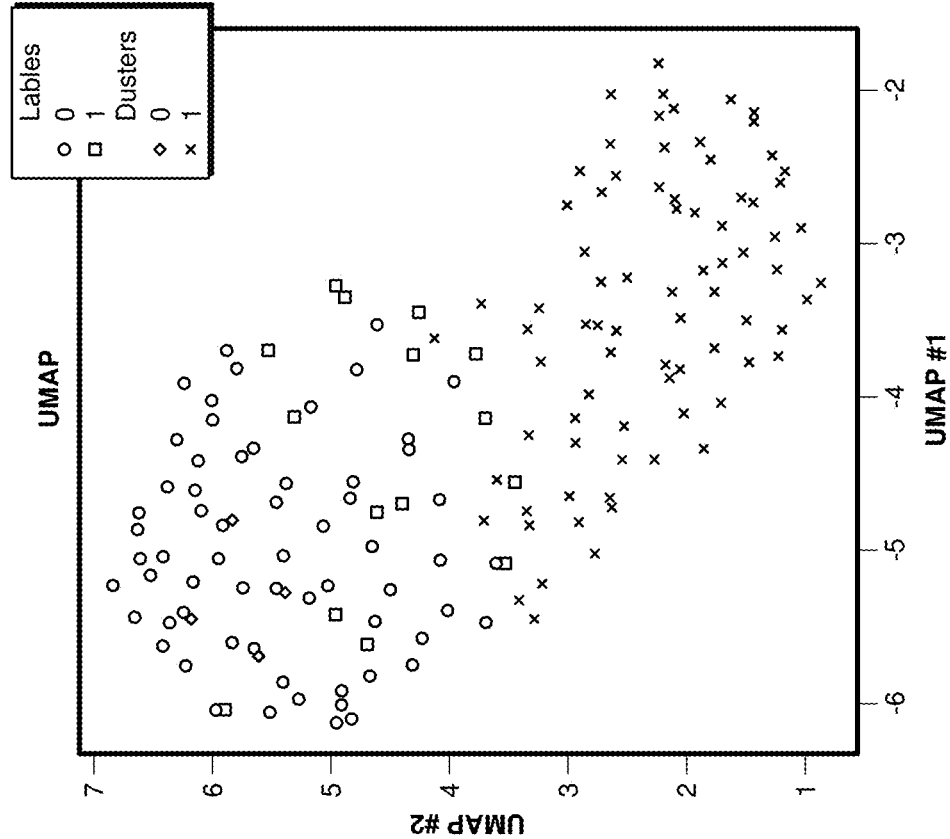

FIGS. 18A and 18B illustrate examples of separated clusters using UMAP and PCA, showing that such clusters may be plotted using either Uniform Manifold Approximation and Projection (UMAP), as in FIG. 18A, or Principal Component Analysis (PCA), as shown in FIG. 18B. A number of clusters (e.g., two clusters) may be seen, which may each correspond to a different event class (such as a gesture type) and a different label. As the embedding space conveys a meaning (which may be termed "proba"), each cluster may be associated with their corresponding class.

A self-supervised user model may also be developed. After a set of labels may be produced using, for example, the clustering technique, such labels may be used to train a user specific model from the original dataset. An XDCov and a linear displacement analysis, or other suitable classification model may be implemented, for example, if it is known that the chosen classification model does not overfit the model substantially and may be insensitive to noise included in the labeled data.

Figure 19:
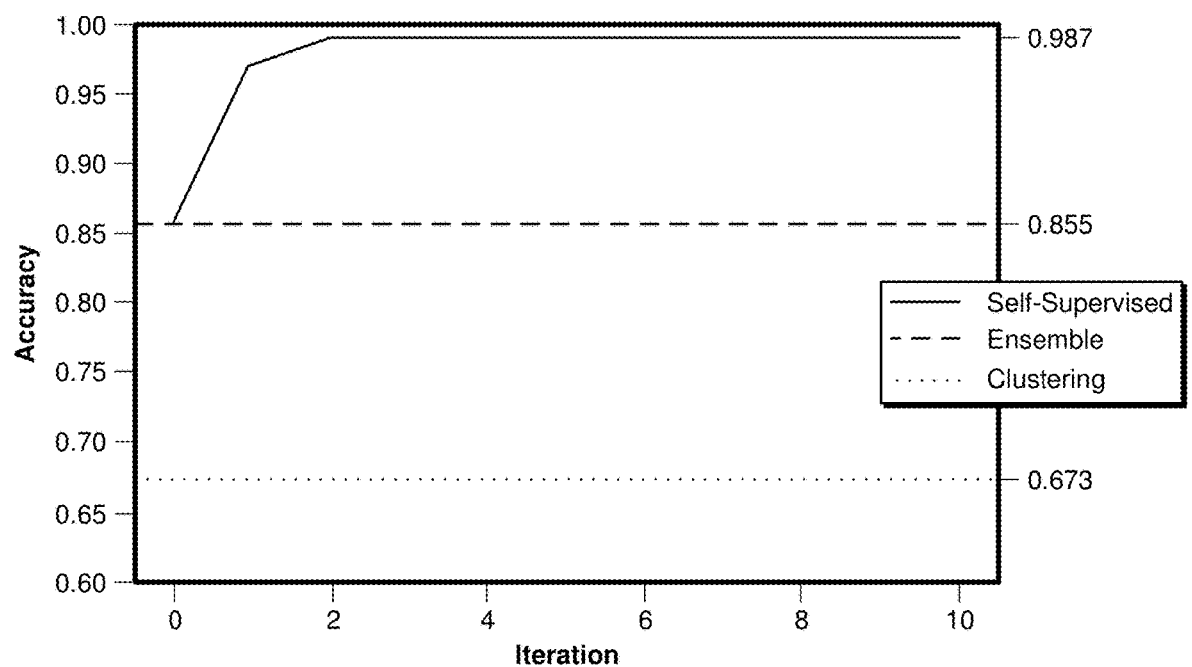
FIG. 19 shows an example of accuracy levels achieved using a self-supervised model.

FIG. 19 illustrates example accuracy levels achieved using a self-supervised model, showing that an approximately 99% accuracy on the estimation of labels or classification model may be achieved after training the self-supervised model. In this example, two training iterations may be sufficient.

An accuracy of 98% may be achieved using the full training set, which may include the data points of all the users from the group of users.

Figure 20:
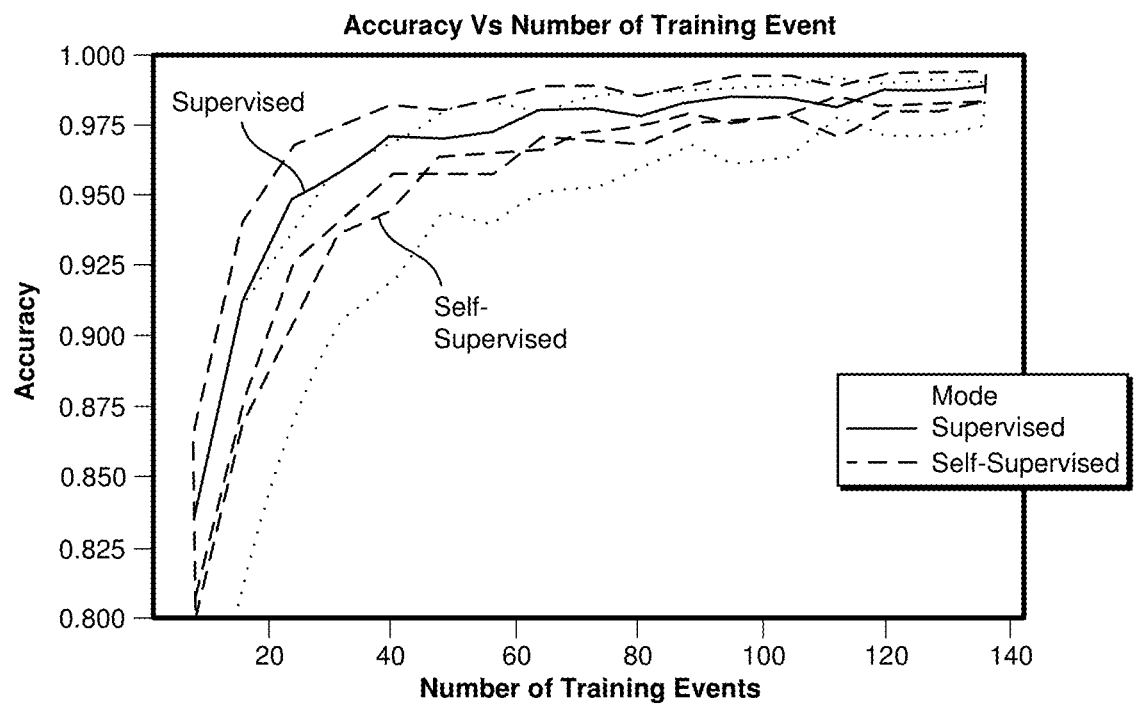
FIG. 20 shows an example of accuracy levels achieved using a supervised user specific models and a self-supervised user specific model, versus the number of training events.

FIG. 20 illustrates accuracy levels achieved using a supervised user specific model and a self-supervised user specific model, showing that the self-supervised model performs better than a user specific model trained with labeled data. The remaining dashed and dotted lines give a qualitative indication of possible uncertainties.

The window size may be adjusted to improve the performance of the self-supervised model. Observing the accuracy of the self-supervised model as the window size increases may be used to determine an optimal window size. Data from one user may be omitted for cross validation of the model. For the clustering and user specific model, a 10 fold random split with 10% of test data and 90% training data may be used. In this case, it may be determined that the self-supervised model performed better with a full window size. This may be explained by the observation that, in this instance, a small window size did not produce a separable cluster. Accordingly, a large window size may be used to obtain labeled data, then a user specific model may be trained using a relatively small window size, for example, using the labels.

Figure 21:
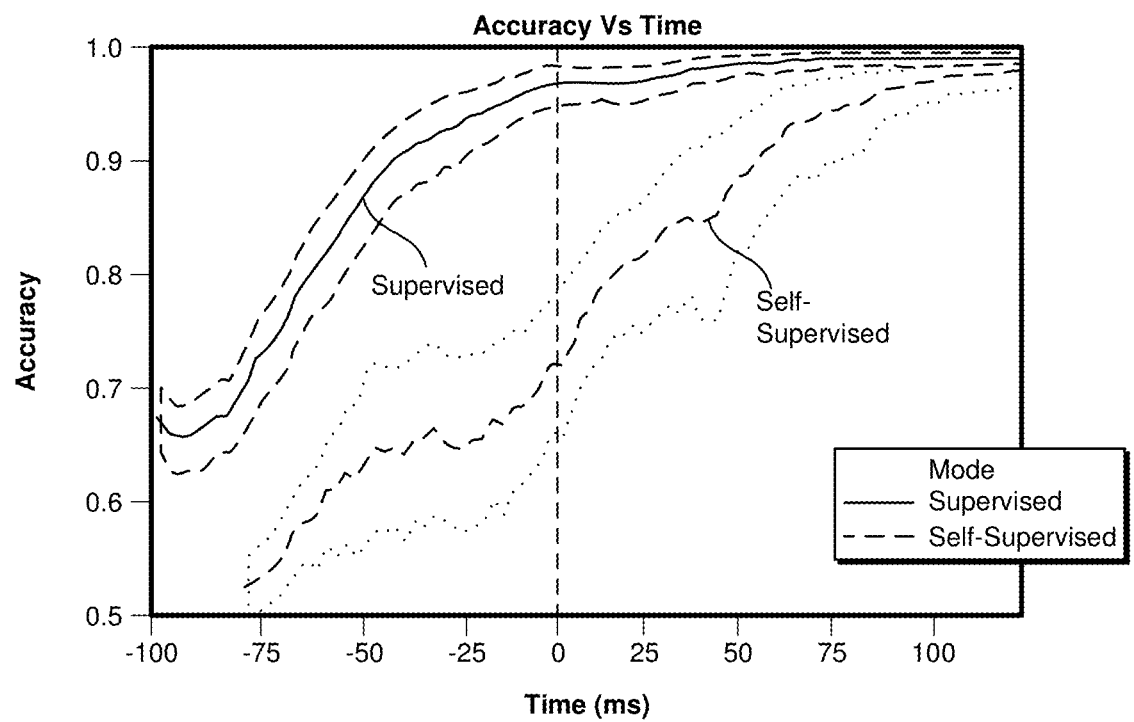
FIG. 21 shows an example of window size determination for user specific and self-supervised models.

FIG. 21 illustrates window size determination for a user specific (solid line) and a self-supervised model (lower dashed line). The remaining dashed and dotted lines give a qualitative indication of possible uncertainties.

A similar approach may be used to study data size effects. An ensemble of single user models may be used to evaluate performance. Cross validation may include leaving one user out for the alignment, then using the same 10 fold random split with 10% of test data and an increasing training size from 5 to 90%. The ensemble approach may reach an accuracy of 96% after 30 events, and then the accuracy may plateau after that for larger numbers of events.

Supervised domain adaptation may use a Canonical Partial Least Square (CPLS) model. In some examples, a method based on domain adaptation may be used instead of building a user specific model, for example, by determining a data transformation that may result in adequate transfer across users. A CPLS model may be used to perform the domain adaptation. A transformation function may be determined to align models of each event class (e.g., different gesture types such as index finger tap, middle finger tap, index finger to thumb pinch, middle finger to thumb pinch, finger snap, etc.) for one user with models for each event class of another user.

Figure 22A:
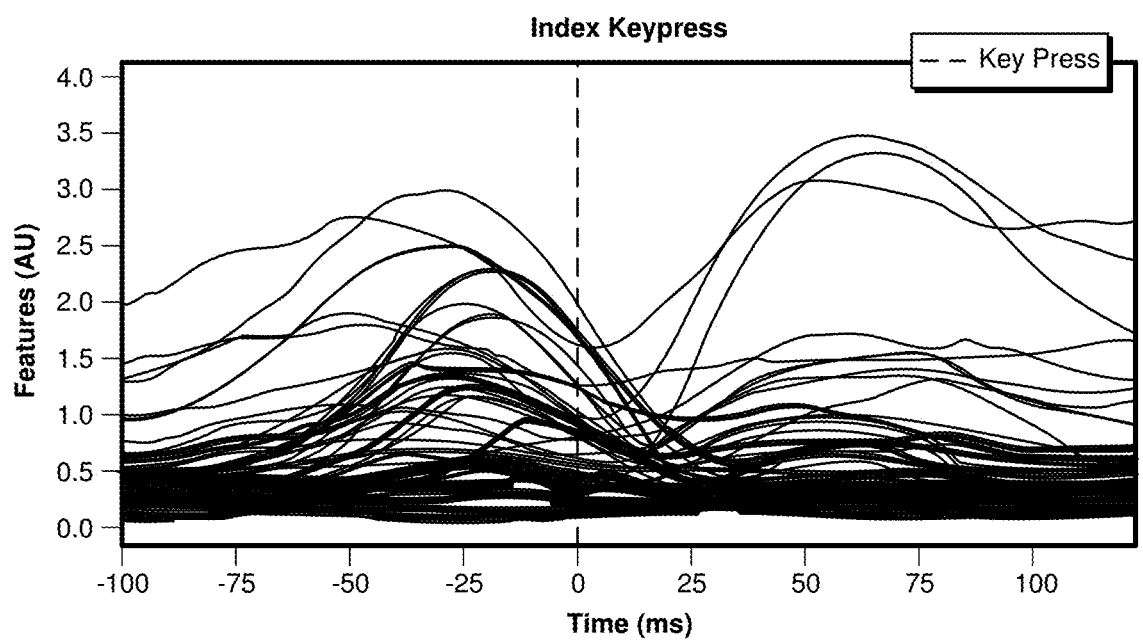
FIGS. 22A-22D show example models of each event class associated with a first user.
Figure 22B:
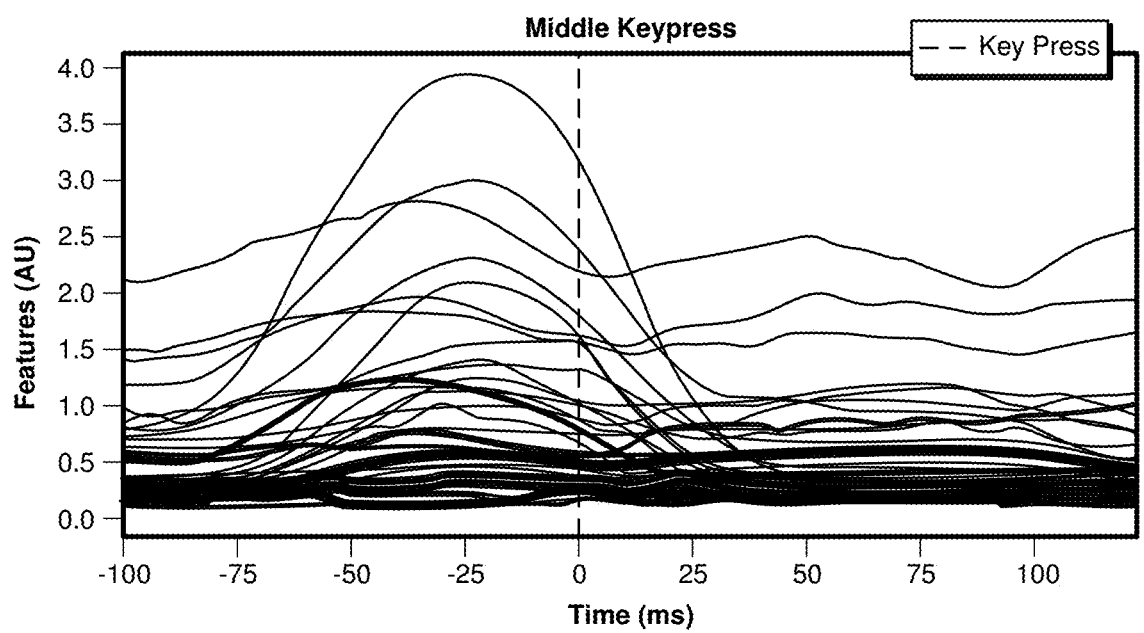

FIG. 22A-22B illustrate models of each event class associated with a first user.

Figure 22C:
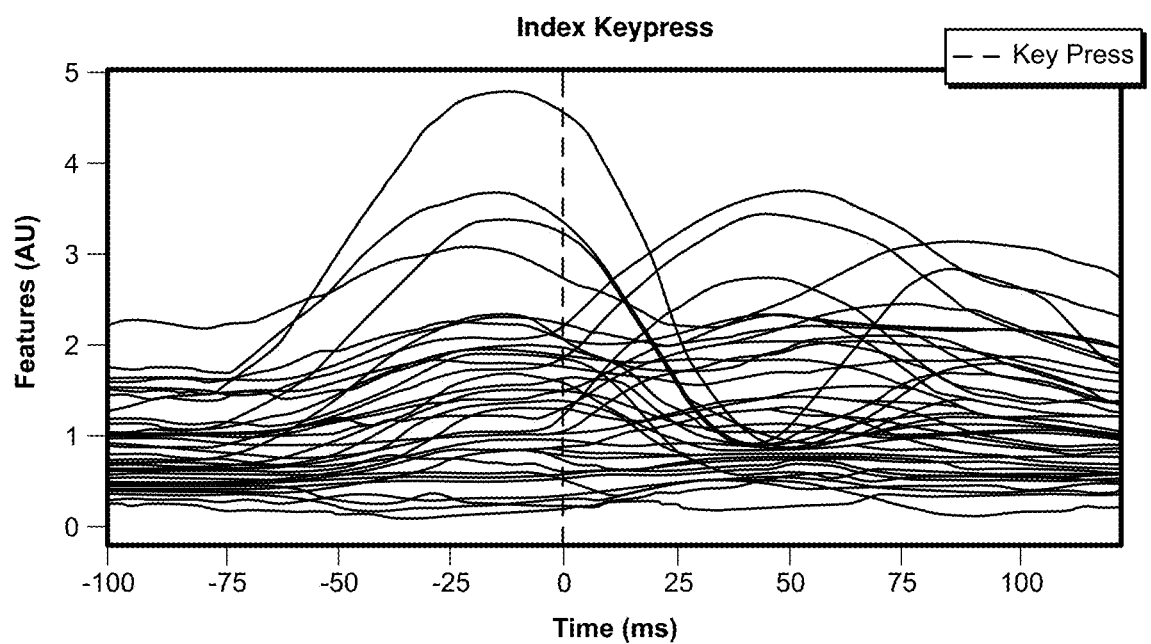
Figure 22D:
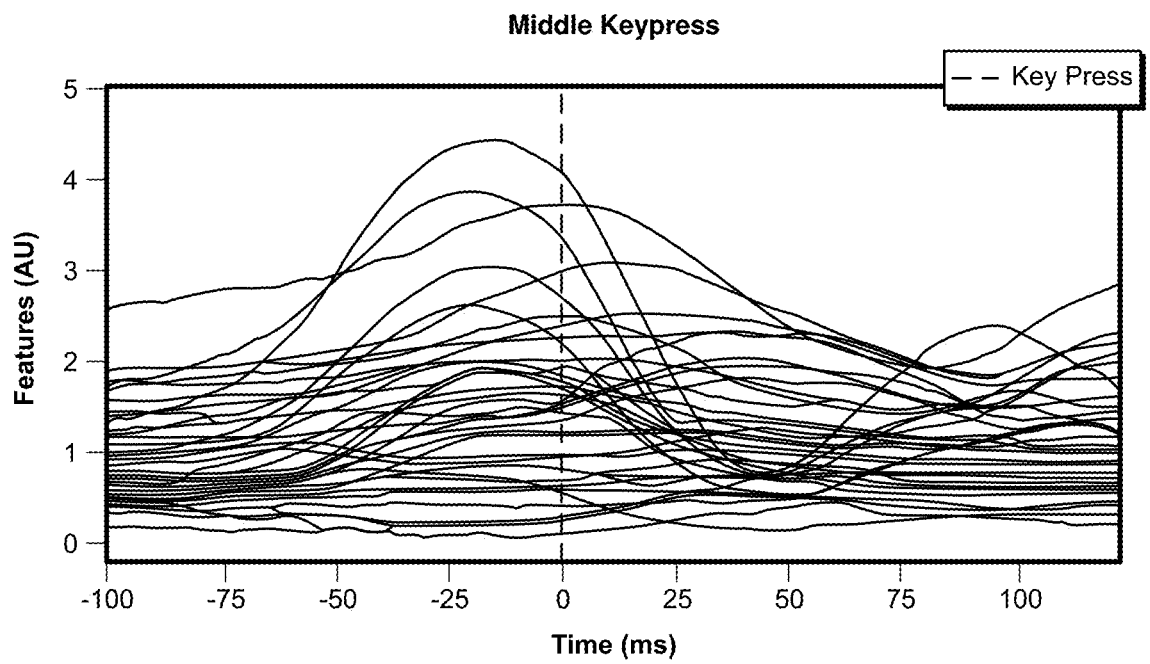

FIGS. 22C-22D illustrate models of each event class associated with a second user.

Figure 23A:
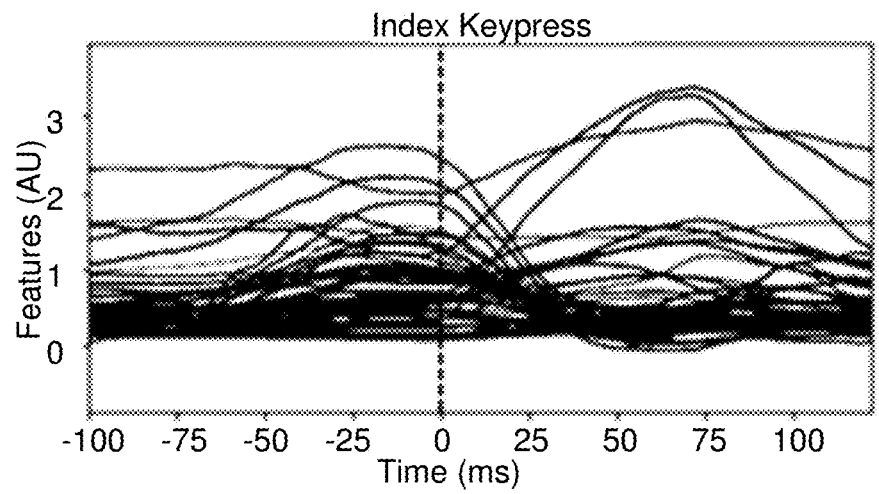
FIGS. 23A-23B show an example of aligned models of each event class associated with a first user and a second user.
Figure 23B:
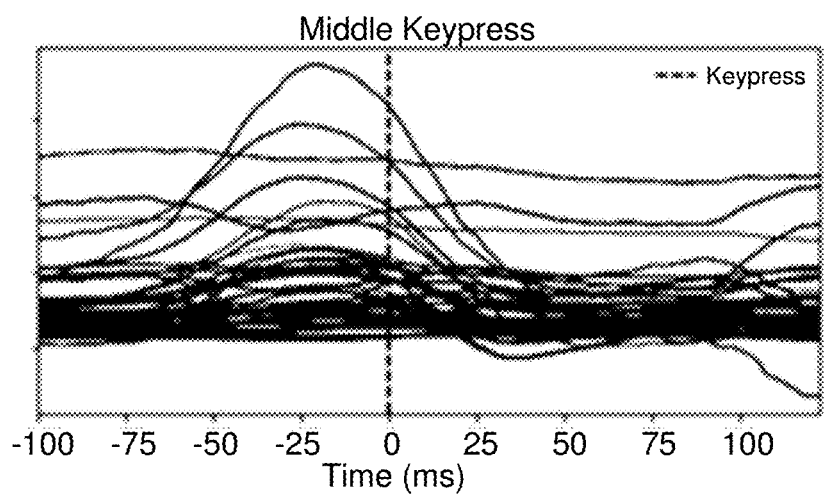

FIGS. 23A-23B show the alignment of models for event classes associated with the first user and the second user, showing that models of event classes for one user may be aligned with corresponding models of event classes for another user. The vertical dashed lines correspond to the key press. The alignment may be efficient, in part because the original models of each event classes of the two users may be substantially different, yet they may become nearly identical after alignment.

Data distribution after alignment may be studied by considering the UMAP embedding of the data before and after transformation.

FIGS. 24A-24B show example data before and after transformation. FIG. 24A shows that the original data may be unambiguously separated, and the largest variation may be seen across the two users. After transformation, the two event classes of events may match at a high degree of accuracy, for example, as shown in FIG. 24B.

The transformation process for each pair of users from the group of users may be studied. The user-to-user transfer matrix may be reproduced after performing the alignment. A single user model may be trained, and then for each test user, the data may be aligned, and the accuracy of the model may be tested on the transformed data. Cross validation may include, for a test user, estimating the event class model on the first 40 events (or other number of events), then performing domain adaptation, and finally testing the accuracy of the model on the remaining events (e.g., 120 events). Numerical values used in these (and other) examples are exemplary and not limiting.

Figure 25A:
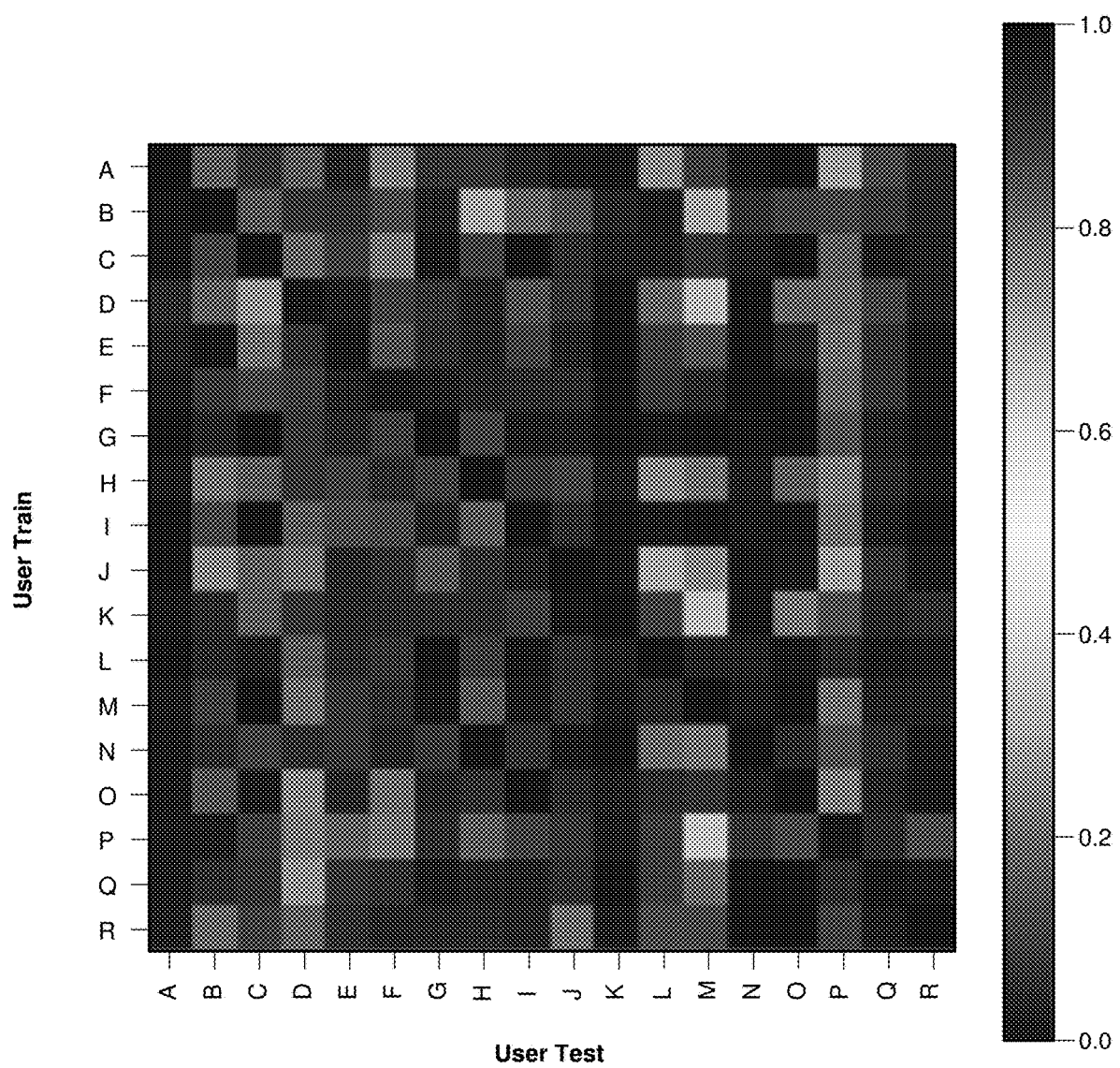
FIG. 25A shows an example transfer matrix across users from all users in a group of users.

FIG. 25A illustrates the transfer across users, from all users in a group of users, showing that the process may enhance the transfer of a single user model to any other users.

The amount of data needed to reach optimal adaptation may be determined. Performance evaluation may be made using an ensemble of a single user model, in part because it may be possible to adapt data between pairs of users. Cross validation may include leaving one user out of the alignment, and thereafter using a 10 fold random split with 10% of test data and increasing the training size from 5 to 90%. Numerical values are exemplary and not limiting.

Figure 25B:
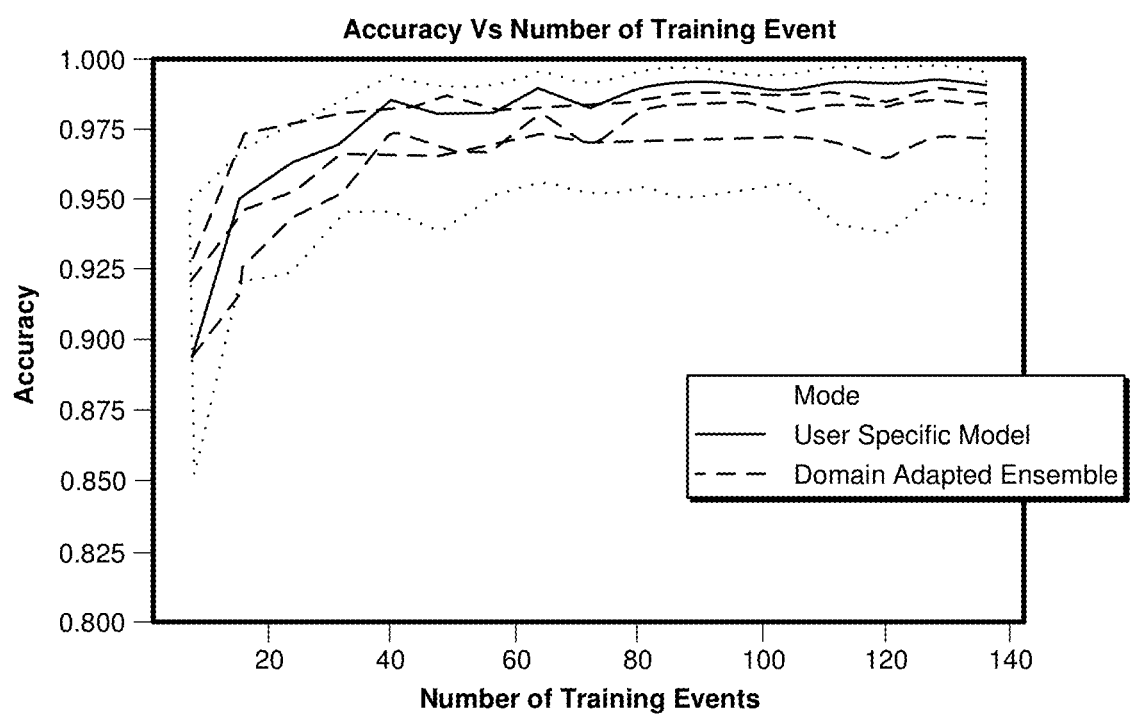
FIG. 25B shows determination of data size for a supervised domain adaptation based on a transfer function.

FIG. 25B illustrates determination of data size for a supervised domain adaptation based on a transfer function, showing accuracy versus the number of training events. The results show that the ensemble may reach an accuracy of 96% after 30 events, and may plateau after that. The remaining dashed and dotted lines give a qualitative indication of possible uncertainties.

FIGS. 26A-26B illustrate an example device, that may include one or more of the following: a human-machine interface, an interface device, a control device, and/or a control interface. In some examples, the device may include a control device 2600, which in this example (as shown in FIG. 26A) may include a number of (e.g., 16) neuromuscular sensors 2610 (e.g., EMG sensors) arranged circumferentially around an elastic band 2620 configured to be worn around a user's lower arm or wrist. In some examples, EMG sensors 2610 may be arranged circumferentially around elastic band 2620. The band may include a flexible electronic connection 2640 (shown in FIG. 26B), which may interconnect separate sensors and electronic circuitry that may, in some examples, be enclosed in one or more sensor housings 2660. Each sensor 2610 may have a skin contacting portion 2650, which may include one or more electrodes. Any suitable number of neuromuscular sensors 2610 may be used. The number and arrangement of neuromuscular sensors may depend on the particular application for which the control device is used. For example, a wearable control device configured as an armband, wristband, or chest-band may be used to generate control information for controlling an augmented reality system, controlling a robot, controlling a vehicle, scrolling through text, controlling a virtual avatar, or any other suitable control task. As shown, the sensors may be coupled together using flexible electronics incorporated into the wireless device.

FIG. 26B illustrates a cross-sectional view through one of the sensors 2610 of the control device 2600 shown in FIG. 26A. The sensor 2610 may include a plurality of electrodes located within a skin-contacting surface 2650. The elastic band 2620 may include an outer flexible layer 2622 and an inner flexible layer 2630, that may at least in part enclose a flexible electrical connector 2640.

In some embodiments, the output of one or more of the sensing components may be optionally processed using a hardware-based signal processing circuit (e.g., to perform amplification, filtering, rectification, and/or another suitable signal processing function). In some embodiments, at least some signal processing of the output of the sensing components may be performed in software. Thus, signal processing of signals sampled by the sensors may be performed in hardware, software, or by any suitable combination of hardware and software, as aspects of the technology described herein are not limited in this respect. A non-limiting example of an analog circuit used to process signal data from sensors 2610 is discussed in more detail below, with reference to FIGS. 27A and 27B.

FIGS. 27A and 27B illustrate a schematic diagram with internal components of an apparatus that may include one or more EMG sensors, such as, for example, 16 EMG sensors. The apparatus may include a wearable device, such as control device 2710 (shown schematically in FIG. 27A), and a dongle portion 2750 (shown schematically in FIG. 27B) that may be in communication with the control device 2710 (e.g., using BLUETOOTH or another suitable short range wireless communication technology). In some examples, the function of the dongle portion (e.g., a similar circuit as that shown in FIG. 27B) may be included within a head-mounted device, allowing the control device to communicate with the head-mounted device.

FIG. 27A shows that the control device 2710 may include one or more sensors 2712, for example, the sensors 2610 described above in connection with FIGS. 26A and 26B. The sensors may each include one or more electrodes. The sensor signals from the sensors 2712 may be provided to analog front end 2714, that may be configured to perform analog processing (e.g., noise reduction, filtering, etc.) of the sensor signals. The processed analog signals may then be provided to analog-to-digital converter (ADC) 2716, which may convert the processed analog signals to digital signals, that may then be further processed by one or more computer processors. An example computer processor, that may be used in accordance with some embodiments, may include a microcontroller (MCU), 2722. The MCU 2722 may also receive signals from other sensors (e.g., an inertial sensor such as inertial measurement unit (IMU) sensor 2718, or other suitable sensors). The control device 2710 may also include, or receive power from, a power supply 2720, that may include a battery module or other power source. The output of the processing performed by MCU 2722 may be provided to antenna 2730 for transmission to the dongle portion 2750 shown in FIG. 27B.

FIG. 27B shows that dongle portion 2750 may include an antenna 2752, that may be configured to communicate with antenna 2730 associated with control device 2710. Communication between antennas 2730 and 2752 may occur using any suitable wireless technology and protocol, non-limiting examples of which include radiofrequency signaling and BLUETOOTH. As shown, the signals received by antenna 2752 of dongle portion 2750 may be received by a BLUETOOTH radio (or other receiver circuit), and provided to a host computer through output 2756 (e.g., a USB output) for further processing, display, and/or for effecting control of a particular physical or virtual object or objects.

In some examples, the dongle may be inserted into a separate computer device, that may be located within the same environment as the user, but not carried by the user. This separate computer may receive control signals from the control device and further process these signals to provide a further control signal to the head-mounted device. The control signals may trigger the head-mounted device to modify the artificial reality view. In some examples, the dongle (or equivalent circuit in a head-mounted device or other device) may be network enabled, allowing communication with a remote computer through the network, and the remote computer may provide control signals to the head-mounted device, to trigger the head-mounted device to modify the artificial reality view. In some examples, a dongle may be inserted into a head-mounted device to provide improved communications functionality, and the head-mounted device may perform further processing (e.g., modification of the AR image) based on the control signal received from the control device 2710.

In some examples, the configuration of the dongle portion may be included in a head-mounted device, such as an artificial reality headset. In some examples, the circuit described above in FIG. 27B may be provided by (i.e., integrated within) components of the head-mounted device. In some examples, the control device may communicate with the head-mounted device using the described wireless communications, and/or a similar schematic circuit, or a circuit having similar functionality.

A head-mounted device may include an antenna similar to antenna 2752 described above in relation to FIG. 27B. The antenna of a head-mounted device may be configured to communicate with the antenna associated with the control device. Communication between antennas of the control device and the head-mounted device may occur using any suitable wireless technology and protocol, non-limiting examples of which include radiofrequency signaling and BLUETOOTH. Signals, such as control signals, received by an antenna of a head-mounted device may be received by a BLUETOOTH radio (or other receiver circuit) and provided to a processor within the head-mounted device, that may be programmed to modify an artificial reality view for the user in response to the control signals. The control signal may trigger the head-mounted device to modify the artificial reality view presented to the user, for example, in response to a detected gesture type.

An example device may include a control device and one or more devices (such as one or more dongle portions, headsets, remote computer devices, and the like) in communication with the control device (e.g., via BLUETOOTH or another suitable short-range wireless communication technology). The control device may include one or more sensors, which may include electrical sensors including one or more electrodes. The electrical outputs from the electrodes, which may be referred to as sensor signals, may be provided to an analog circuit configured to perform analog processing (e.g., filtering, etc.) of the sensor signals. The processed sensor signals may then be provided to an analog-to-digital converter (ADC), which may be configured to convert analog signals to digital signals that may be processed by one or more computer processors. Example computer processors may include one or more microcontrollers (MCU), such as the nRF52840 (manufactured by NORDIC SEMICONDUCOTR). The MCU may also receive inputs from one or more other sensors. The device may include one or more other sensors, such as an orientation sensor, which may be an absolute orientation sensor and may include an inertial measurement unit. An example orientation sensor may include a BN0055 inertial measurement unit (manufactured by BOSCH SENSORTEC). The device may also include a dedicated power supply, such as a power and battery module. The output of the processing performed by MCU may be provided to an antenna for transmission to the dongle portion or another device. Other sensors may include mechanomyography (MMG) sensors, sonomyography (SMG) sensors, electrical impedance tomography (EIT) sensors, and other suitable type of sensors.

A dongle portion, or other device such as a head-mounted device, may include one or more antennas configured to communicate with the control device and/or other devices. Communication between system components may use any suitable wireless protocol, such as radio-frequency signaling and BLUETOOTH. Signals received by the antenna of the dongle portion (or other device) may be provided to a computer through an output, such as a USB output, for further processing, display, and/or for effecting control of a particular physical or virtual object or objects.

Although the examples provided with reference to FIGS. 26A, 26B and FIGS. 27A, 27B are discussed in the context of interfaces with EMG sensors, examples may also be implemented in control devices, such as wearable interfaces, used with other types of sensors including, but not limited to, mechanomyography (MMG) sensors, sonomyography (SMG) sensors, and electrical impedance tomography (EIT) sensors. The approaches described herein may also be implemented in wearable interfaces that communicate with computer hosts through wires and cables (e.g., USB cables, optical fiber cables).

FIG. 28 illustrates an example system 2800 that may include a headset 2810 and a control device 2820 (that may represent a wearable control device). In some examples, the system 2800 may include a magnetic tracker. In these examples, the transmitter for the magnetic tracker may be mounted on the control device 2820, and the receiver for the magnetic tracker may be mounted on the headset 2810. In other examples, the transmitter for the magnetic tracker may be mounted on the headset or otherwise located within the environment. In some embodiments, the system 2800 may also include one or more optional control gloves 2830. In some examples, many or all functions of a control glove may be provided by the control device 2820. In some examples, the system may be an augmented reality and/or virtual reality system. In some examples, the control glove 2830 may include a plurality of magnetic tracker receivers, using which the orientation and/or location of various parts of the hand of a user may be determined. In some examples, the control device 2820 may be similar to that shown in FIGS. 26A and 26B. In some examples, the control device may include an electronic circuit similar to that shown in FIG. 27A (and/or FIG. 27B).

In some examples, the control glove 2830 (that may be more simply referred to as a glove) may include one or more magnetic tracker receivers. For example, a finger of the glove may include at least one receiver coil, and detection of a tracker signal from the at least one receiver coil induced by a magnetic tracker transmitter may be used to determine the position and/or orientation of at least portion of the finger. One or more receiver coils may be associated with each portion of a hand, such as a finger (such as the thumb), palm, and the like. The glove may also include other sensors providing sensor signals indicative of the position and/or configuration of the hand, such as electroactive sensors. Sensor signals, such as magnetic tracker receiver signals, may be transmitted to a control device, such as a wearable control device. In some examples, a control device (such as a wrist-mounted control device) may be in communication with a control glove, and receive sensor data from the control glove using wired and/or wireless communication. For example, a flexible electrical connector may extend between a control device (e.g., a wrist-mounted control device) and the glove. In some examples, the control device may include a glove, and/or may include a wrist-strap.

In some examples, the control device 2820 may include an EMG control interface similar to the device illustrated in FIGS. 26A and 26B. Locating the magnetic tracker transmitter on or near the control device 2820 may result in the introduction of noise into the signals recorded by the control device 2820 due to induced currents and/or voltages. In some embodiments, electromagnetic interference caused by the magnetic tracker transmitter may be reduced by locating the transmitter at a distance further away from the control device 2820. For example, the transmitter may be mounted on the headset 2810, and the magnetic tracker receiver may be mounted on the control device 2820. This configuration works well, for example, when the user keeps their arms away from their head, but may not work as well if the user moves their arms in close proximity to the headset. However, many applications do not require extensive proximity between the head and the hands of the user.

The control device, such as wearable control device 2820, may include an analog circuit including at least one amplifier configured to amplify analog electrical signals originating from a body of the user (e.g., from electrodes in contact with the skin, and/or one or more other sensors), and an analog-to-digital converter configured to convert the amplified analog electrical signals to digital signals that may be used to control the system, such as a virtual reality (VR) and/or augmented reality (AR) system.

In some examples, an augmented reality system may include a magnetic tracker. The magnetic tracker may include a transmitter positioned in the headset, or other location, and one or more receivers, that may be associated with tracked objects or body parts of a user (such as hands, or other limbs or portions thereof, or joints) of a user.

FIG. 29 shows an example method of classifying an event (2900), including obtaining electromyography (EMG) data from a user (2910), the EMG data including an EMG signal corresponding to an event, detecting the EMG signal corresponding the event (2920), classifying the EMG signal as being from an event type (2930), and generating a control signal based on the event type (2940). An example method may further include triggering the head-mounted device to modify the artificial reality view controlling an artificial reality environment based on the control signal.

FIG. 30 shows an example method of classifying an event (3000), including detecting an EMG signal corresponding to an event (3010), classifying the EMG signal as corresponding to an event type using a trained model (3020), and generating a control signal for an artificial reality environment based on the event type (3030). The control signal may trigger the head-mounted device to modify the artificial reality view.

In some examples, FIGS. 29 and 30 may represent flow diagram of exemplary computer-implemented methods for detecting at least one gesture, and using the at least one detected gesture type to control an artificial reality system, such as an augmented reality system or virtual reality system. One or more steps shown in the figures may be performed by any suitable computer-executable code and/or computer device, such as a control device, a head-mounted device, other computer device in communication with the control device, or a computer device in communication with a device providing sensor signals. In some examples, one or more of the steps shown in FIGS. 29 and/or 30 may represent an algorithm whose structure includes and/or is represented by multiple sub-steps, using approaches such as those described herein. In some examples, steps of a particular example method may be performed by different components of a system including, for example, a control device and a head-mounted device.

In some examples, event detection and classification may be performed by unsupervised or self-supervised models, and these approaches may be used to detect user gestures. Models may be trained for a particular user, or in some examples a model may be trained on a different user, and the training data for the different user adapted for use with a present user. In example training approaches, EMG data may be detected, and optionally recorded for analysis. A model may be trained using EMG data that may be obtained as one or more users perform one or more gestures. Example gestures include finger taps (e.g., simulated keypresses), other finger movements (such as finger curls, swipes, pointing gestures, and the like), or other types of gestures and/or sensor data may be analogously used to train example event detector models.

In some embodiments, by building an embedding space including a single user model, clearly separable clusters of events may be obtained. Clustering techniques may be implemented to determine labels for each event, and a user specific model may be then trained using the labeled data. By using at least one of these techniques, a very high accuracy rate (e.g., 98% accuracy rate) may be reached in a purely unsupervised fashion. For instance, using a relatively small number of samples (e.g., less than 40 event samples), a relatively high (e.g., 95% accuracy) may be achieved.

Further, in some embodiments, single-user event templates may be adapted to other users, reducing further the amount of additional data that may be needed for use of the models with the adapted users. For instance, domains may be adapted using PLS by aligning datasets across pairs of users. For instance, a PLS may be trained to align event templates across users. An ensemble of aligned user templates may lead to a high accuracy (e.g., 96% accuracy), requiring very few event data to be collected (e.g., less than 10 events).

Poses may be defined as body positions that are static over time and in theory may be maintained indefinitely. In contrast, in some examples, gestures may be defined as including dynamic body positions, that may have a start time and an end time, per occurrence. Accordingly, gestures may be defined as discrete events of a particular gesture type. Representative examples of gesture types include snaps, finger taps, finger curls or bends, pointing, swiping, turning, grasping, or other finger motions. In some examples, gestures may include movements of at least a portion of the arm, wrist, or hand, or other muscle activation. In some examples, visually perceptible movement of the user may not be required, and a gesture may be defined by a muscle activation pattern, independent of any visually perceptible movement of a portion of the user's body.

A generic event detector may generate an output signal when a gesture event is detected, for example, in a continuous stream of electromyography (EMG) data. A control signal for a computer device, such as an artificial reality system, may be based on the output signal of the generic event detector. The generic event detector may produce an output signal each time a user performs a gesture. In some examples, the output signal may be produced independently of the type of performed gesture. In some examples, an event classifier may execute when the event detector detects an event, such as a gesture. The event classifier may determine information related to the gesture, such as a gesture type, performed by the user. The gesture type may include one or more of the following: a physical action performed, the body part (such as a finger or other body part) used to perform the physical action, an intended action of the user, other physical action(s) performed the same or an approximately same time. A control signal may also be based on a combination of sensor data from one or more sensor types. A corresponding control signal may be sent to an augmented reality (AR) system, and the control signal may be based, at least in part, on the gesture type. The control signal may modify the artificial reality display by one or more of the following: selection of an item, performance of a task, movement of an object by a degree and/or direction that may be, at least in part, determined by the gesture type, interaction with a user interface of an object (e.g., a real or virtual object), or other action. In some embodiments, gestures may be classified as a particular gesture type based on one or more electromyography signals, such as electromyography wavelets.

In some examples, a method of detecting events, such as gestures, may include obtaining first set of electromyography (EMG) data including EMG signals corresponding to a gesture of a first user, training a first classifier by clustering event data determined from the obtained first set of EMG signals, labeling a second set of obtained EMG data using the first classifier, and training an event detector using the labeled second set of EMG data.

In some examples, a method for classifying events, such as gestures, may include one or more of the following steps; generating a plurality of single user event classifiers, generating a multi-user event classifier using the plurality of single user classifiers, labeling electromyography (EMG) data using the generated multi-user classifier, generating data transformations corresponding to a plurality of users, generating a single user classifier correlated with a first user of the plurality of users, labeling received EMG data for a second user of the plurality of users using the data transformation for the second user and the single user classifier for the first user, and training the event detector using the labeled EMG data.

In some examples, a method for training an event detector, such as a gesture detector, is provided. The method may include one or more of the following steps: obtaining electromyography (EMG) data including EMG signals corresponding to the gesture, generating feature data from the EMG data, detecting events in the feature data, generating epochs using the feature data, where each epoch may be centered around one of the detected events, clustering the epochs into types, where at least one the types may correspond to the gesture, aligning the epochs by type to generate aligned epochs, training a labeling model using the aligned epochs, labeling the feature data using the labeling model to generate labeled feature data, and training an event detector using the labeled feature data.

In some examples, a method for training an event classifier may include one or more of the following steps; obtaining electromyography (EMG) data including EMG signals corresponding to a plurality of gestures, generating feature data from the EMG data, detecting events in the feature data using an event detector, generating epochs using the feature data, each epoch centered around one of the detected events, generating a single-user event classification model using the epochs, labeling the EMG data using the single-user event classification model, and training an event classifier using the labeled EMG data.

In some examples, a method of generating a single-user event classification model using epochs may include one or more of the following steps; generating vectorized epochs using the epochs, and generating the single-user event classification model by training one or more of a logistic regression, random forest, or multilayer perceptron classifier using the vectorized epochs. In some examples, wherein generating a single-user event classification model using the epochs includes generating spatially-filtered, reduced-dimension epochs using the epochs, generating vectorized epochs using the spatially-filtered, reduced-dimension epochs, and generating the single-user event classification model by training one or more of a logistic regression, random forest, or multilayer perceptron classifier using the vectorized epochs. In some examples, wherein generating a single-user event classification model using the epochs includes generating one or more event models using the epochs, each event model corresponding to a gestures, generating combined epochs by combining each of the epochs with the one or more event models, and generating the single-user event classification model by training one or more of a logistic regression, random forest, or multilayer perceptron classifier using the combined epochs.

In some examples, a method for training an event classifier is provided. The method may include one or more of the following steps; obtaining electromyography (EMG) data including EMG signals corresponding to a plurality of gestures for a plurality of users, generating feature data from the EMG data, detecting events in the feature data using an event detector, generating epochs using the feature data, each epoch centered around one of the detected events, generating a cross-user event classification model using the epochs, labeling the EMG data using the cross-user event classification model, and training an event classifier using the labeled EMG data.

In some examples, a method for training an event classifier is provided. The method may include one or more of the following steps; generating an embedding model using a plurality of single user event classification models, generating embedded events using the embedding model and electromyography (EMG) data including EMG signals corresponding to a plurality of gestures for a user, clustering the embedded events into clusters corresponding to the plurality of gestures, associating labels with the EMG data based on the clustered embedded events, and training an event classifier for the user using the EMG data and associated labels.

In some examples, a method for training an event classifier is provided. The method may include one or more of the following steps; generating, for each of a plurality of users, an event template for each of a plurality of events, determining alignment transformations between the event templates for each of the plurality of events across the plurality of users, transforming EMG data for a first user using ones of the determined alignment transformations for a second user, associating labels with the EMG data using the transform EMG data and a single user event classification model of the second user, and training an event classifier for the user using the EMG data and associated labels.

In some examples, a system for gesture detection is provided. The system may include at least one processor, and at least one non-transitory memory including instructions that, when executed by the at least one processor, cause the system for gesture detection to perform operations including associating, using an event detector, an event label with a portion of electromyography data, in response to associating the event label with the portion of electromyography data associating, using an event classifier, a gesture label with the portion of electromyography data, and outputting an indication of at least one of the event label or the gesture label.

Examples described herein may include various suitable combinations of example aspects, provided such aspects are not incompatible.

Example systems and methods may include user-based models for detecting gestures in an accurate and unsupervised manner. Event detector models are provided that may be trained on a limited set of user data for a particular user, and using labels and clustering methods, the accuracy of the event detector may be increased while limiting the number of event data instances.

By building an embedding space including a single user model, clearly separable cluster of events may be obtained. Clustering techniques may be implemented to determine labels of each event and a user specific model may be then trained using the labeled data. In some examples, 98% accuracy may be reached by applying this process, in a purely unsupervised fashion. Also, 95% accuracy may be reached using a limited number (e.g., 40) of event samples.

Domain adaptation with PLS may include the one or more of the following. Dataset across pairs of users may be aligned by training a PLS to align the event templates. An ensemble of aligned single user may lead to 96% accuracy. The alignment requires very little data to be performed (such as less than 10 events).

A generic event detector may emit an output signal when a gesture event is detected in a continuous stream of electromyography (EMG) data. An example generic event detector may produce an output signal each time a user performs a gesture, and the output signal may be produced independently of the type of performed gesture.

An event classifier may execute when the event detector identifies a gesture event. The event classifier may then determine the gesture type performed by a user.

In some examples, a method for detecting events may include one or more of the following: obtaining first set of electromyography (EMG) data including EMG signals corresponding to a gesture of a first user; training a first classifier by clustering event data determined from the obtained first set of EMG signals; and labeling a second set of obtained EMG data using the first classifier; and training an event detector using the labeled second set of EMG data. Example approaches may include providing a general event detector.

In some examples, a method for classifying events may include one or more of the following: generating a plurality of single user event classifiers; generating a multi-user event classifier using the plurality of single user classifiers; labeling electromyography (EMG) data using the generated multi-user classifier; generating data transformations corresponding to a plurality of users; generating a single user classifier correlated with a first user of the plurality of users; labeling received EMG data for a second user of the plurality of users using the data transformation for the second user and the single user classifier for the first user; and training the event detector using the labeled EMG data. Example approaches may include providing a general event classifier.

In some examples, a method for training an event detector may include one or more of the following: obtaining electromyography (EMG) data including EMG signals corresponding to a gesture; generating feature data from the EMG data; detecting events in the feature data; generating epochs using the feature data, each epoch centered around one of the detected events; clustering the epochs into types, at least one the types corresponding to the gesture; aligning the epochs by type to generate aligned epochs; training a labeling model using the aligned epochs; labeling the feature data using the labeling model to generate labeled feature data; and training an event detector using the labeled feature data. Example approaches may include generating a classifier to label unlabeled data, and then generating an event detector using the labeled data.

In some examples, a method for training an event classifier may include one or more of the following: obtaining electromyography (EMG) data including EMG signals corresponding to a plurality of gestures; generating feature data from the EMG data; detecting events in the feature data using an event detector; generating epochs using the feature data, each epoch centered around one of the detected events; generating a single-user event classification model using the epochs; labeling the EMG data using the single-user event classification model; and training an event classifier using the labeled EMG data. Example approaches may include generating a single-user event classification model to label unlabeled data, then generating an event classifier using the labeled data.

In some examples, generating a single-user event classification model using the epochs may include one or more of the following: generating vectorized epochs using the epochs; and generating the single-user event classification model by training one or more of a logistic regression, random forest, or multilayer perceptron classifier using the vectorized epochs. Example approaches may include generating a single-user event classification model from vectorized trials.

In some examples, generating a single-user event classification model using the epochs may include one or more of the following: generating spatially-filtered, reduced-dimension epochs using the epochs; generating vectorized epochs using the spatially-filtered, reduced-dimension epochs; and generating the single-user event classification model by training one or more of a logistic regression, random forest, or multilayer perceptron classifier using the vectorized epochs. This approach may be used to generate a single-user event classification model from reduced dimension data generated by spatially filtering the trials.

In some examples, generating a single-user event classification model using the epochs may include one or more of the following: generating one or more event models using the epochs, each event model corresponding to a gesture; generating combined epochs by combining each of the epochs with the one or more event models; and generating the single-user event classification model by training one or more of a logistic regression, random forest, or multilayer perceptron classifier using the combined epochs. Example approaches may include generating a single-user event classification model by generating event templates and concatenating the event templates with the trials.

In some examples, a method for training an event classifier includes one or more of the following: obtaining electromyography (EMG) data including EMG signals corresponding to a plurality of gestures for a plurality of users; generating feature data from the EMG data; detecting events in the feature data using an event detector; generating epochs using the feature data, each epoch centered around one of the detected events; generating a cross-user event classification model using the epochs; and labeling the EMG data using the cross-user event classification model; and training an event classifier using the labeled EMG data. Example approaches may include generating a cross-user event classification model to label unlabeled data, and then generating an event classifier using the labeled data.

In some examples, a method for training an event classifier may include one or more of the following: generating an embedding model using a plurality of single user event classification models; generating embedded events using the embedding model and electromyography (EMG) data including EMG signals corresponding to a plurality of gestures for a user; clustering the embedded events into clusters corresponding to the plurality of gestures; associating labels with the EMG data based on the clustered embedded events; and training an event classifier for the user using the EMG data and associated labels. Example approaches may include generating a user independent event classification model to label unlabeled data from an ensemble of single-user event classification models, and then generating an event classifier using the labeled data.

In some examples, a method for training an event classifier may include one or more of the following: generating, for each of a plurality of users, an event template for each of a plurality of events; determining alignment transformations between the event templates for each of the plurality of events across the plurality of users; transforming EMG data for a first user using at least one of the determined alignment transformations for a second user; associating labels with the EMG data using the transform EMG data and a single user event classification model of the second user; and training an event classifier for the user using the EMG data and associated labels. Example approaches may include using alignment transformations between users to transform data for labeling by a single user-specific event classification model, then generating an event classifier using the labeled data.

In some examples, a system for gesture detection may be configured to use an event detector to identify gestures and an event classifier to classify gestures, where the event detector may be trained using a training method (such as a training method described herein). In some examples, a system for gesture detection may include: at least one processor; and at least one non-transitory memory including instructions that, when executed by the at least one processor, cause the system for gesture detection to perform operations including: associating, using an event detector, an event label with a portion of electromyography data; in response to associating the event label with the portion of electromyography data associating, using an event classifier, a gesture label with the portion of electromyography data; and outputting an indication of at least one of the event label or the gesture lab.

Exemplary computer-implemented methods may be performed by any suitable computer-executable code and/or computing system, where one or more steps of the method may represent an algorithm whose structure may include and/or may be represented by multiple sub-steps.

In some examples, a system includes at least one physical processor, and physical memory including computer-executable instructions that, when executed by the physical processor, cause the physical processor to perform one or more methods or method steps as described herein. In some examples, a computer-implemented method may include the detection and classification of gestures, and control of an artificial reality system using detected gesture types.

In some examples, a non-transitory computer-readable medium includes one or more computer-executable instructions that, when executed by at least one processor of a computing device, cause the computing device to perform one or more method steps as described herein. In some examples, a computer-implemented method may include the detection and classification of gestures, and control of an artificial reality system using detected gesture types.

Examples include a control device including a plurality of electromyography (EMG) sensors, and/or other sensors, and at least one physical processor programmed to receive sensor data, detect sensor signals corresponding to user gestures within the sensor data, classify the sensor signals to identify gesture types, and provide control signals based on the gesture types. The control signals may trigger the head-mounted device to modify the artificial reality view.

Example Embodiments

Example 1. An example system includes: a head-mounted device configured to present an artificial reality view to a user; a control device including a plurality of electromyography (EMG) sensors including electrodes that contact the skin of the user when the control device is worn by the user; at least one physical processor; and physical memory including computer-executable instructions that, when executed by the physical processor, cause the physical processor to: process one or more EMG signals as detected by the EMG sensors; classify the processed one or more EMG signals into one or more gesture types; provide control signals based on the gesture types, where the control signals trigger the head-mounted device to modify at least one aspect of the artificial reality view.

2. The system of example 1, wherein the at least one physical processor is located within the control device.

Example 3. The system of any of examples 1-2, wherein the at least one physical processor is located within the head mounted device, or within an external computer device in communication with the control device.

Example 4. The system of any of examples 1-3, wherein the computer-executable instructions when executed by the physical processor, cause the physical processor to classify the processed EMG signals into one or more gesture types using a classifier model.

Example 5. The system of any of examples 1-4, wherein the classifier model is trained using training data including a plurality of EMG training signals for the gesture type.

Example 6. The system of any of examples 1-5, wherein the training data is obtained from a plurality of users.

Example 7. The system of any of examples 1-6, wherein the head mounted device includes a virtual reality headset or an augmented reality device.

Example 8. An example method includes obtaining one or more electromyography (EMG) signals from a user; processing the one or more EMG signals to generate associated feature data; classifying the associated feature data into one or more gesture types using a classifier model; and providing a control signal to an artificial reality (AR) device, based on the one or more gesture types, wherein the classifier model is trained using training data including a plurality of EMG training signals for the one or more gesture types.

Example 9. The method of example 8, wherein the classifier model is trained by clustering feature data determined from EMG training signals.

Example 10. The method of any of examples 8-9, wherein the classifier model is trained using EMG training signals obtained from a plurality of users.

Example 11. The method of any of examples 8-10, wherein the plurality of users does not include the user.

Example 12. The method of any of examples 8-11, further including training the classifier model by: obtaining EMG training signals corresponding to a gesture type; training the classifier model by clustering EMG training data obtained from the EMG training signals.

Example 13. The method of any of examples 8-12, where in the classifier model is further trained by: determining the time dependence of EMG training signals relative to a time of a respective EMG training signal maximum; aligning the time dependence of a plurality of EMG training signals by adding a time offset to at least one EMG training signal of the plurality of EMG training signals; obtaining a signal characteristic from the aligned plurality of EMG training signals; and training the classifier model to detect EMG signals having the signal characteristic.

Example 14. The method of any of examples 8-13, wherein the classified model is further trained by: obtaining training data including EMG training signals corresponding to a gesture type; and averaging the EMG training signals corresponding to each occurrence of the gesture type to obtain a gesture model for the gesture type, wherein the classifier model uses the gesture model to classify EMG signals.

Example 15. The method of any of examples 8-14, wherein the gesture model is a user-specific gesture model for the gesture type.

Example 16. The method of any of examples 8-14, wherein the gesture model is a multiple user gesture model based on EMG training data obtained from a plurality of users, the multiple user gesture model being a combination of a plurality of user-specific gesture models.

Example 17. The method of any of examples 8-16, wherein the artificial reality device includes a head-mounted device configured to present an artificial reality image to a user, the method further including modifying the artificial reality image based on the control signal.

Example 18. The method of any of examples 8-17, wherein modifying the artificial reality image includes selection or control of an object in the artificial reality image based on the gesture type.

Example 19. An non-transitory computer-readable medium includes one or more computer-executable instructions that, when executed by at least one processor of a computing device, cause the computing device to: receive one or more electromyography (EMG) signals as detected by EMG sensors; process the one or more EMG signals to identify one or more features corresponding to a user gesture types; use the one or more features to classify the one or more EMG signals into the gesture type; provide a control signal based on the gesture type; and transmit the control signals to a head-mounted device to trigger the modification of an artificial reality view in response to the control signals.

Example 20. The non-transitory computer-readable medium of example 19, wherein the computer device is configured to classify the EMG signals to the identify gesture type based on a gesture model determined from training data obtained from a plurality of users.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (e.g., augmented-reality system 3100 in FIG. 31) or that visually immerses a user in an artificial reality (e.g., virtual-reality system 3200 in FIG. 32). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 31, augmented-reality system 3100 may include an eyewear device 3102 with a frame 3110 configured to hold a left display device 3115(A) and a right display device 3115(B) in front of a user's eyes. Display devices 3115(A) and 3115(B) may act together or independently to present an image or series of images to a user. While augmented-reality system 3100 includes two displays, embodiments of this disclosure may be implemented in augmented-reality systems with a single NED or more than two NEDs.

In some embodiments, augmented-reality system 3100 may include one or more sensors, such as sensor 3140. Sensor 3140 may generate measurement signals in response to motion of augmented-reality system 3100 and may be located on substantially any portion of frame 3110. Sensor 3140 may represent a position sensor, an inertial measurement unit (IMU), a depth camera assembly, a structured light emitter and/or detector, or any combination thereof. In some embodiments, augmented-reality system 3100 may or may not include sensor 3140 or may include more than one sensor. In embodiments in which sensor 3140 includes an IMU, the IMU may generate calibration data based on measurement signals from sensor 3140. Examples of sensor 3140 may include, without limitation, accelerometers, gyroscopes, magnetometers, other suitable types of sensors that detect motion, sensors used for error correction of the IMU, or some combination thereof.

Augmented-reality system 3100 may also include a microphone array with a plurality of acoustic transducers 3120(A)-1320(J), referred to collectively as acoustic transducers 3120. Acoustic transducers 3120 may be transducers that detect air pressure variations induced by sound waves. Each acoustic transducer 3120 may be configured to detect sound and convert the detected sound into an electronic format (e.g., an analog or digital format). The microphone array in FIG. 2 may include, for example, ten acoustic transducers: 3120(A) and 3120(B), that may be designed to be placed inside a corresponding ear of the user, acoustic transducers 3120(C), 3120(D), 3120(E), 3120(F), 3120(G), and 3120(H), that may be positioned at various locations on frame 3110, and/or acoustic transducers 3120(I) and 3120 (J), that may be positioned on a corresponding neckband 3105.

In some embodiments, one or more of acoustic transducers 3120(A)-(F) may be used as output transducers (e.g., speakers). For example, acoustic transducers 3120(A) and/or 3120(B) may be earbuds or any other suitable type of headphone or speaker.

The configuration of acoustic transducers 3120 of the microphone array may vary. While augmented-reality system 3100 is shown in FIG. 31 as having ten acoustic transducers 3120, the number of acoustic transducers 3120 may be greater or less than ten. In some embodiments, using higher numbers of acoustic transducers 3120 may increase the amount of audio information collected and/or the sensitivity and accuracy of the audio information. In contrast, using a lower number of acoustic transducers 3120 may decrease the computing power required by an associated controller 3150 to process the collected audio information. In addition, the position of each acoustic transducer 3120 of the microphone array may vary. For example, the position of an acoustic transducer 3120 may include a defined position on the user, a defined coordinate on frame 3110, an orientation associated with each acoustic transducer 3120, or some combination thereof.

Acoustic transducers 3120(A) and 3120(B) may be positioned on different parts of the user's ear, such as behind the pinna, behind the tragus, and/or within the auricle or fossa. Or, there may be additional acoustic transducers 3120 on or surrounding the ear in addition to acoustic transducers 3120 inside the ear canal. Having an acoustic transducer 3120 positioned next to an ear canal of a user may enable the microphone array to collect information on how sounds arrive at the ear canal. By positioning at least two of acoustic transducers 3120 on either side of a user's head (e.g., as binaural microphones), augmented-reality system 3100 may simulate binaural hearing and capture a 3D stereo sound field around about a user's head. In some embodiments, acoustic transducers 3120(A) and 3120(B) may be connected to augmented-reality system 3100 using a wired connection 3130, and in other embodiments acoustic transducers 3120(A) and 3120(B) may be connected to augmented-reality system 3100 using a wireless connection (e.g., a Bluetooth connection). In still other embodiments, acoustic transducers 3120(A) and 3120(B) may not be used at all in conjunction with augmented-reality system 3100.

Acoustic transducers 3120 on frame 3110 may be positioned along the length of the temples, across the bridge, above or below display devices 3115(A) and 3115(B), or some combination thereof. Acoustic transducers 3120 may be oriented such that the microphone array is able to detect sounds in a wide range of directions surrounding the user wearing the augmented-reality system 3100. In some embodiments, an optimization process may be performed during manufacturing of augmented-reality system 3100 to determine relative positioning of each acoustic transducer 3120 in the microphone array.

In some examples, augmented-reality system 3100 may include or be connected to an external device (e.g., a paired device), such as neckband 3105. Neckband 3105 generally represents any type or form of paired device. Thus, the following discussion of neckband 3105 may also apply to various other paired devices, such as charging cases, smart watches, smart phones, wrist bands, other wearable devices, hand-held controllers, tablet computers, laptop computers, other external compute devices, etc.

As shown, neckband 3105 may be coupled to eyewear device 3102 using one or more connectors. The connectors may be wired or wireless and may include electrical and/or non-electrical (e.g., structural) components. In some cases, eyewear device 3102 and neckband 3105 may operate independently without any wired or wireless connection between them. While FIG. 31 illustrates the components of eyewear device 3102 and neckband 3105 in example locations on eyewear device 3102 and neckband 3105, the components may be located elsewhere and/or distributed differently on eyewear device 3102 and/or neckband 3105. In some embodiments, the components of eyewear device 3102 and neckband 3105 may be located on one or more additional peripheral devices paired with eyewear device 3102, neckband 3105, or some combination thereof.

Pairing external devices, such as neckband 3105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3100 may be provided by a paired device or shared between a paired device and an eyewear device, thus reducing the weight, heat profile, and form factor of the eyewear device overall while still retaining desired functionality. For example, neckband 3105 may allow components that would otherwise be included on an eyewear device to be included in neckband 3105 since users may tolerate a heavier weight load on their shoulders than they would tolerate on their heads. Neckband 3105 may also have a larger surface area over which to diffuse and disperse heat to the ambient environment. Thus, neckband 3105 may allow for greater battery and computation capacity than might otherwise have been possible on a stand-alone eyewear device. Since weight carried in neckband 3105 may be less invasive to a user than weight carried in eyewear device 3102, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 3105 may be communicatively coupled with eyewear device 3102 and/or to other devices. These other devices may provide certain functions (e.g., tracking, localizing, depth mapping, processing, storage, etc.) to augmented-reality system 3100. In the embodiment of FIG. 31, neckband 3105 may include two acoustic transducers (e.g., 3120(I) and 3120(J)) that are part of the microphone array (or potentially form their own microphone subarray). Neckband 3105 may also include a controller 3125 and a power source 3135.

Acoustic transducers 3120(I) and 3120(J) of neckband 3105 may be configured to detect sound and convert the detected sound into an electronic format (analog or digital). In the embodiment of FIG. 31, acoustic transducers 3120(I) and 3120(J) may be positioned on neckband 3105, thereby increasing the distance between the neckband acoustic transducers 3120(I) and 3120(J) and other acoustic transducers 3120 positioned on eyewear device 3102. In some cases, increasing the distance between acoustic transducers 3120 of the microphone array may improve the accuracy of beamforming performed using the microphone array. For example, if a sound is detected by acoustic transducers 3120(C) and 3120(D) and the distance between acoustic transducers 3120(C) and 3120(D) is greater than, for example, the distance between acoustic transducers 3120(D) and 3120(E), the determined source location of the detected sound may be more accurate than if the sound had been detected by acoustic transducers 3120(D) and 3120(E).

Controller 3125 of neckband 3105 may process information generated by the sensors on neckband 3105 and/or augmented-reality system 3100. For example, controller 3125 may process information from the microphone array that describes sounds detected by the microphone array. For each detected sound, controller 3125 may perform a direction-of-arrival (DOA) estimation to estimate a direction from which the detected sound arrived at the microphone array. As the microphone array detects sounds, controller 3125 may populate an audio data set with the information.

In embodiments in which augmented-reality system 3100 includes an inertial measurement unit, controller 3125 may compute all inertial and spatial calculations from the IMU located on eyewear device 3102. A connector may convey information between augmented-reality system 3100 and neckband 3105 and between augmented-reality system 3100 and controller 3125. The information may be in the form of optical data, electrical data, wireless data, or any other transmittable data form. Moving the processing of information generated by augmented-reality system 3100 to neckband 3105 may reduce weight and heat in eyewear device 3102, making it more comfortable to the user.

Power source 3135 in neckband 3105 may provide power to eyewear device 3102 and/or to neckband 3105. Power source 3135 may include, without limitation, lithium ion batteries, lithium-polymer batteries, primary lithium batteries, alkaline batteries, or any other form of power storage. In some cases, power source 3135 may be a wired power source. Including power source 3135 on neckband 3105 instead of on eyewear device 3102 may help better distribute the weight and heat generated by power source 3135.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 3200 in FIG. 32, that mostly or completely covers a user's field of view. Virtual-reality system 3200 may include a front rigid body 3202 and a band 3204 shaped to fit around a user's head. Virtual-reality system 3200 may also include output audio transducers 3206(A) and 3206(B). Furthermore, while not shown in FIG. 32, front rigid body 3202 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 3100 and/or virtual-reality system 3200 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay light (to, e.g., the viewer's eyes). These optical subsystems may be used in a non-pupil-forming architecture (such as a single lens configuration that directly collimates light but may result in so-called pincushion distortion) and/or a pupil-forming architecture (such as a multi-lens configuration that may produce barrel distortion to nullify pincushion distortion).

In addition to or instead of using display screens, some artificial reality systems may include one or more projection systems. For example, display devices in augmented-reality system 3100 and/or virtual-reality system 3200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system 3100 and/or virtual-reality system 3200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, elements 3206(A), and 3206(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some examples, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (such as data based on detected signals from a user, such as EMG data), transform the data, output a result of the transformation to perform a function (e.g., outputting control data, controlling an AR system, or other function), or otherwise use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Use of ordinal terms such as "first," "second," "third" does not, by itself, connote any priority, precedence, or order of one claim element over another or the temporal order in which acts of a method are performed. Such terms may be used merely as labels to distinguish one element from another element having an otherwise similar name.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., using other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "including."

What is claimed is:

1. A system comprising:
    a head-mounted device configured to present an artificial reality view to a user;
    a control device comprising a plurality of electromyography (EMG) sensors comprising electrodes that contact the skin of the user when the control device is worn by the user;
    at least one physical processor; and
    physical memory including computer-executable instructions that, when executed by the physical processor, cause the physical processor to:
        process one or more EMG signals as detected by the EMG sensors to generate one or more processed EMG signals, the EMG signals being detected within a specified time window surrounding an event;

classify the one or more processed EMG signals into one or more gesture types using a user-specific classifier model, the user-specific classifier model having an associated level of accuracy;

change the size of the time window to determine an optimal time window size by observing changes in the accuracy of the user-specific classifier model that occur as the size of the time window is changed; and provide control signals based on the one or more classified gesture types, where the control signals trigger the head-mounted device to modify at least one aspect of the artificial reality view, wherein:
the user-specific classifier model is trained using training data including event labels determined by a multiple-user classifier model; and
the multiple-user classifier model is trained using multiple-user data obtained from a plurality of users.

2. The system of claim 1, wherein the at least one physical processor is located within the control device.

3. The system of claim 1, wherein the at least one physical processor is located within the head-mounted device, or within an external computer device in communication with the control device.

4. The system of claim 1, wherein the computer-executable instructions, when executed by the physical processor, cause the physical processor to classify the one or more processed EMG signals into the one or more gesture types using the user-specific classifier model.

5. The system of claim 1, wherein the user-specific classifier model is trained using a plurality of EMG training signals for the gesture type.

6. The system of claim 1, wherein the multiple-user data is obtained from the plurality of users, wherein the plurality of users does not include the user.

7. The system of claim 1, wherein the head-mounted device comprises a virtual reality headset or an augmented reality device.

8. A method comprising:
obtaining one or more electromyography (EMG) signals from a user;
processing the one or more EMG signals to generate associated feature data, the EMG signals being detected within a specified time window surrounding an event;
classifying the associated feature data into one or more gesture types using a classifier model, the user-specific classifier model having an associated level of accuracy;
changing the size of the time window to determine an optimal time window size by observing changes in the accuracy of the user-specific classifier model that occur as the size of the time window is changed; and
providing a control signal to an artificial reality (AR) device, based on the one or more classified gesture types, wherein:
the classifier model is trained using training data including a plurality of EMG training signals for the one or more gesture types; and
the training data is obtained from a plurality of users.

9. The method of claim 8, wherein the classifier model is trained by clustering feature data determined from the plurality of EMG training signals.

10. The method of claim 8, wherein the classifier model is trained using the training data, and the training data includes the plurality of EMG training signals obtained from the plurality of users.

11. The method of claim 10, wherein the plurality of users does not include the user.

12. The method of claim 8, further comprising training the classifier model by:
obtaining EMG training signals within the plurality of EMG training signals corresponding to the gesture type; and
training the classifier model by clustering EMG training data obtained from the EMG training signals.

13. The method of claim 8, where in the classifier model is further trained by:
determining a time dependence of the plurality of EMG training signals relative to a time of a respective EMG training signal maximum;
aligning the time dependence of the plurality of EMG training signals by adding a time offset to at least one EMG training signal of the plurality of EMG training signals to obtain an aligned plurality of EMG training signals;
obtaining a signal characteristic from the aligned plurality of EMG training signals; and
training the classifier model to detect characteristic EMG signals of the plurality of EMG training signals the having the signal characteristic.

14. The method of claim 8, wherein the classifier model is further trained by:
obtaining training data including EMG training signals corresponding to the gesture type; and
averaging the EMG training signals corresponding to each occurrence of the gesture type to obtain a gesture model for the gesture type, wherein the classifier model uses the gesture model to classify EMG signals.

15. The method of claim 14, wherein the gesture model is a user-specific gesture model for the gesture type.

16. The method of claim 14, wherein the gesture model is a multiple user gesture model based on the training data obtained from the plurality of users,
the multiple user gesture model being a combination of a plurality of user-specific gesture models.

17. The method of claim 8, wherein the artificial reality device comprises a head-mounted device configured to present an artificial reality image to the user, the method further comprising modifying the artificial reality image based on the control signal.

18. The method of claim 17, wherein modifying the artificial reality image further comprises selection or control of an object in the artificial reality image based on the gesture type.

19. A non-transitory computer-readable medium comprising one or more computer-executable instructions that, when executed by at least one processor of a computing device, cause the computing device to:
receive one or more electromyography (EMG) signals as detected by EMG sensors;
process the one or more EMG signals to identify one or more features corresponding to a gesture type, the EMG signals being detected within a specified time window surrounding an event;
use the one or more features to classify the one or more EMG signals into the gesture type using a classifier model, the user-specific classifier model having an associated level of accuracy;
change the size of the time window to determine an optimal time window size by observing changes in the accuracy of the user-specific classifier model that occur as the size of the time window is changed;
provide a control signal based on the classified gesture type; and transmit the control signal to a head-mounted device to trigger a modification of an artificial reality view in response to the control signal, wherein:

the classifier model is trained using training data including event labels determined by a gesture model; and the gesture model is trained using multiple-user data obtained from a plurality of users.

20. The non-transitory computer-readable medium of claim 19, wherein the computer device is configured to classify the EMG signals to the gesture type based on the gesture model determined from the multiple-user data obtained from the plurality of users.

* * * * *